US012748275B2

(12) United States Patent
Claessens et al.

(10) Patent No.: US 12,748,275 B2
(45) Date of Patent: Sep. 29, 2026

(54) SUPPORT FRAME ASSEMBLIES FOR OPTICAL FIBER MANAGEMENT TRAYS

(71) Applicant: CommScope Technologies LLC, Hickory, NC (US)

(72) Inventors: Bart Mattie Claessens, Hasselt (BE); Johan Geens, Bunsbeek (BE); Peter Jozef Romain Waeterschoot, Berchem (BE); Bart Vos, Geel (BE)

(73) Assignee: CommScope Technologies LLC, Hickory, NC (US)

( * ) Notice: Subject to any disclaimer, the term of this patent is extended or adjusted under 35 U.S.C. 154(b) by 325 days.

(21) Appl. No.: 18/569,147

(22) PCT Filed: Jun. 9, 2022

(86) PCT No.: PCT/US2022/032904
§ 371 (c)(1),
(2) Date: Dec. 11, 2023

(87) PCT Pub. No.: WO2022/261370
PCT Pub. Date: Dec. 15, 2022

(65) Prior Publication Data

US 2024/0288650 A1 Aug. 29, 2024

Related U.S. Application Data

(60) Provisional application No. 63/209,584, filed on Jun. 11, 2021, provisional application No. 63/273,339, filed on Oct. 29, 2021.

(51) Int. Cl.
*G02B 6/00* (2006.01)
*G02B 6/44* (2006.01)

(52) U.S. Cl.
CPC ....... *G02B 6/4445* (2013.01); *G02B 6/44524* (2023.05); *G02B 6/44526* (2023.05);
(Continued)

(58) Field of Classification Search
CPC .............. G02B 6/4445; G02B 6/44524; G02B 6/44526; G02B 6/44528; G02B 6/4457;
(Continued)

(56) References Cited

U.S. PATENT DOCUMENTS 6,304,707 B1 10/2001 Daems et al.
6,504,987 B1 1/2003 Macken et al.
(Continued)

FOREIGN PATENT DOCUMENTS

EP 1 431 793 A2 6/2004
EP 2 290 418 B1 6/2009
(Continued)

OTHER PUBLICATIONS

International Search Report and Written Opinion for PCT/US2022/032904 mailed Sep. 29, 2022.
(Continued)

*Primary Examiner* — Jennifer Doan
(74) *Attorney, Agent, or Firm* — Merchant & Gould P.C.

(57) ABSTRACT

A support framework for modules that pivotally mount optical fiber management trays. The framework is configured to mount the modules in a simplified manner. According to certain embodiments, frame members of the framework can be connected to one another in a simple, cost effective manner that does not require rivets or other separate fasteners. According to certain embodiments, some or all of the frame members of the framework can be constructed of a polymeric material, providing for a relatively light weight and cost-effective framework. The framework can form part of a fiber organizing assembly at a distribution location of a fiber optic network.

20 Claims, 84 Drawing Sheets

(52) U.S. Cl.
CPC ....... *G02B 6/44528* (2023.05); *G02B 6/4457* (2013.01); *G02B 6/4471* (2013.01)

(58) Field of Classification Search
CPC .... G02B 6/4471; G02B 6/445; G02B 6/4455; G02B 6/00
See application file for complete search history.

(56) References Cited

U.S. PATENT DOCUMENTS

| | | | | |
|---|---|---|---|---|
| 7,889,961 | B2 * | 2/2011 | Cote | G02B 6/44526 385/135 |
| 8,625,951 | B2 | 1/2014 | Pimentel et al. | |
| 9,435,975 | B2 * | 9/2016 | Ott | G02B 6/44526 |
| 2006/0029351 | A1 | 2/2006 | Lapp | |
| 2010/0183274 | A1 | 7/2010 | Brunet et al. | |
| 2018/0003912 | A1 * | 1/2018 | Sedor | G02B 6/4453 |
| 2018/0039037 | A1 | 2/2018 | Aznag et al. | |
| 2018/0074275 | A1 | 3/2018 | Thompson et al. | |
| 2021/0080666 | A1 * | 3/2021 | Barnes | G02B 6/4442 |
| 2021/0157078 | A1 | 5/2021 | Claessens et al. | |

FOREIGN PATENT DOCUMENTS

| | | | |
|---|---|---|---|
| EP | 2 418 525 | A1 | 2/2012 |
| EP | 2 439 570 | A1 | 4/2012 |
| EP | 2605052 | A2 | 12/2012 |
| JP | 6031061 | B2 | 11/2016 |
| WO | 2013/131788 | A2 | 9/2013 |
| WO | 2013/149846 | A1 | 10/2013 |
| WO | 2014/122103 | A1 | 8/2014 |
| WO | 2019/123496 | A1 | 6/2019 |
| WO | 2020/223473 | A1 | 11/2020 |
| WO | 2022/261373 | A1 | 12/2022 |

OTHER PUBLICATIONS

Third Party Observation for PCT/US2022/032904 mailed Oct. 6, 2023.

Extended European Search Report for Application No. 22821061.3 mailed Apr. 4, 2025.

* cited by examiner

FIG. 61
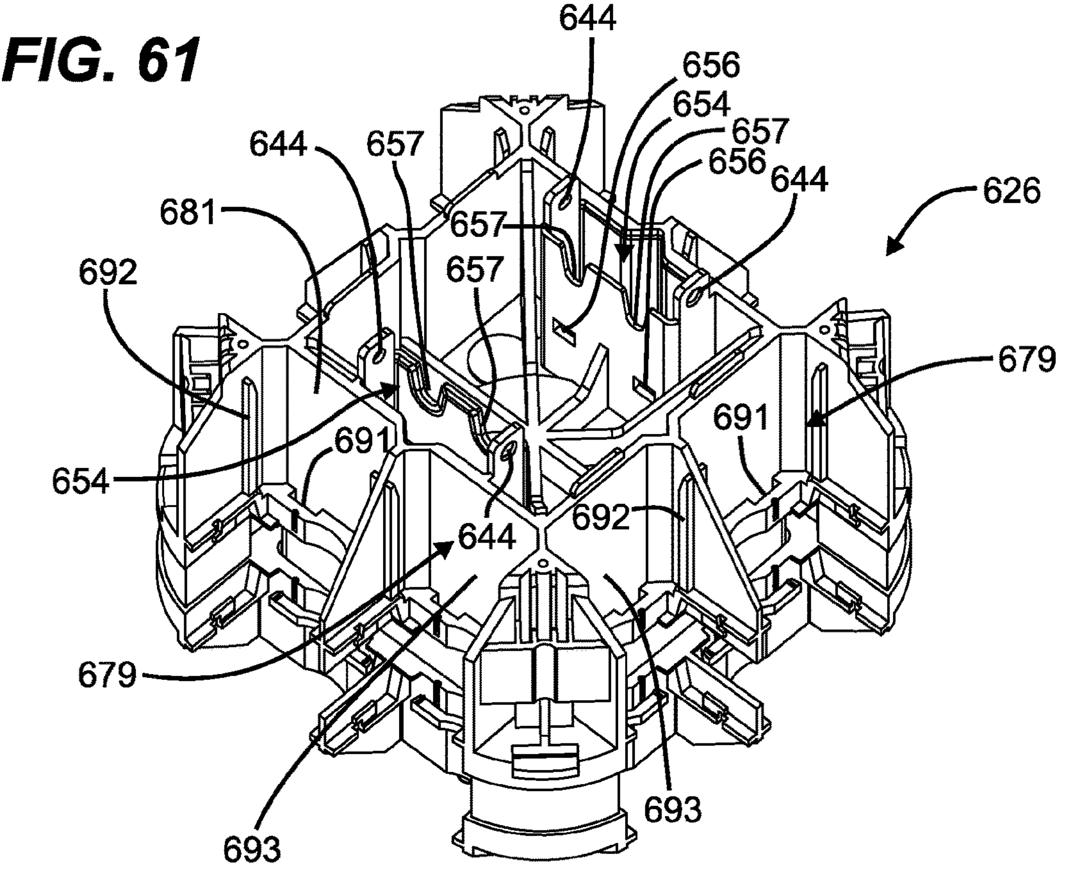
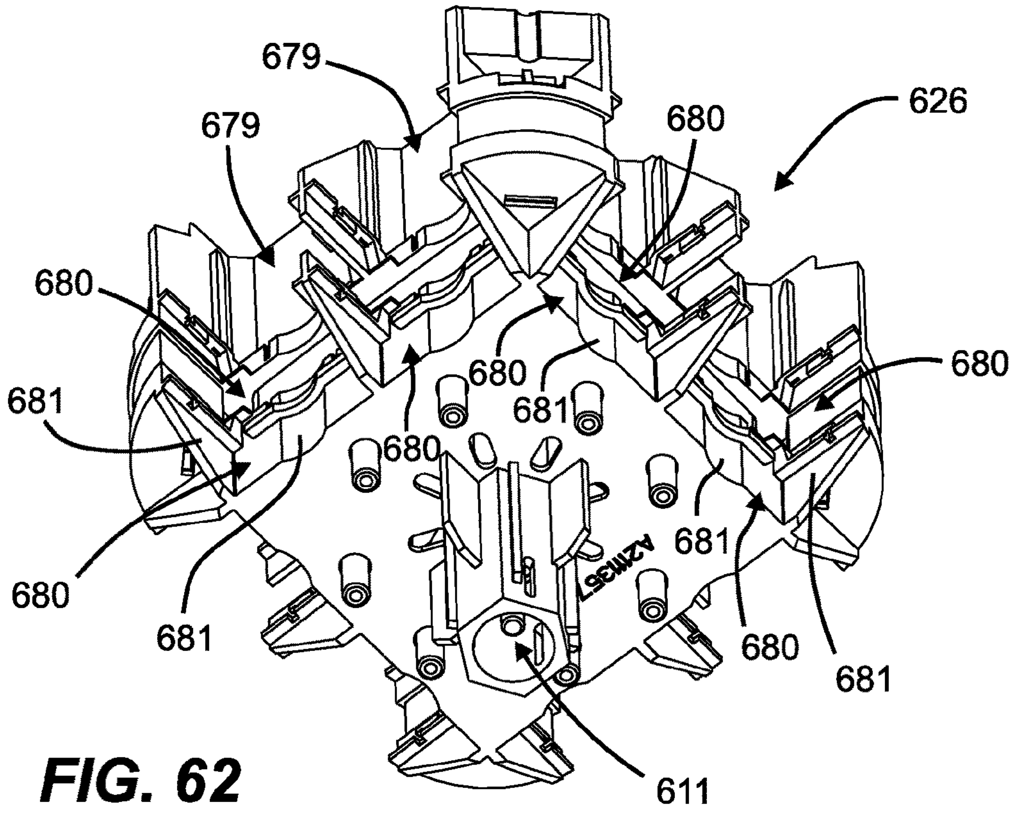
FIG. 62

FIG. 63
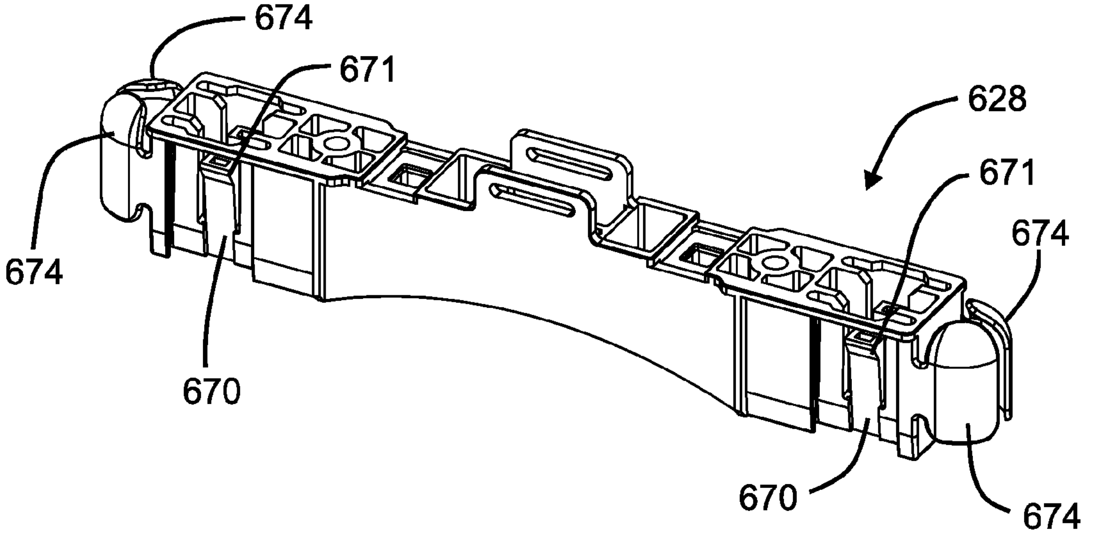
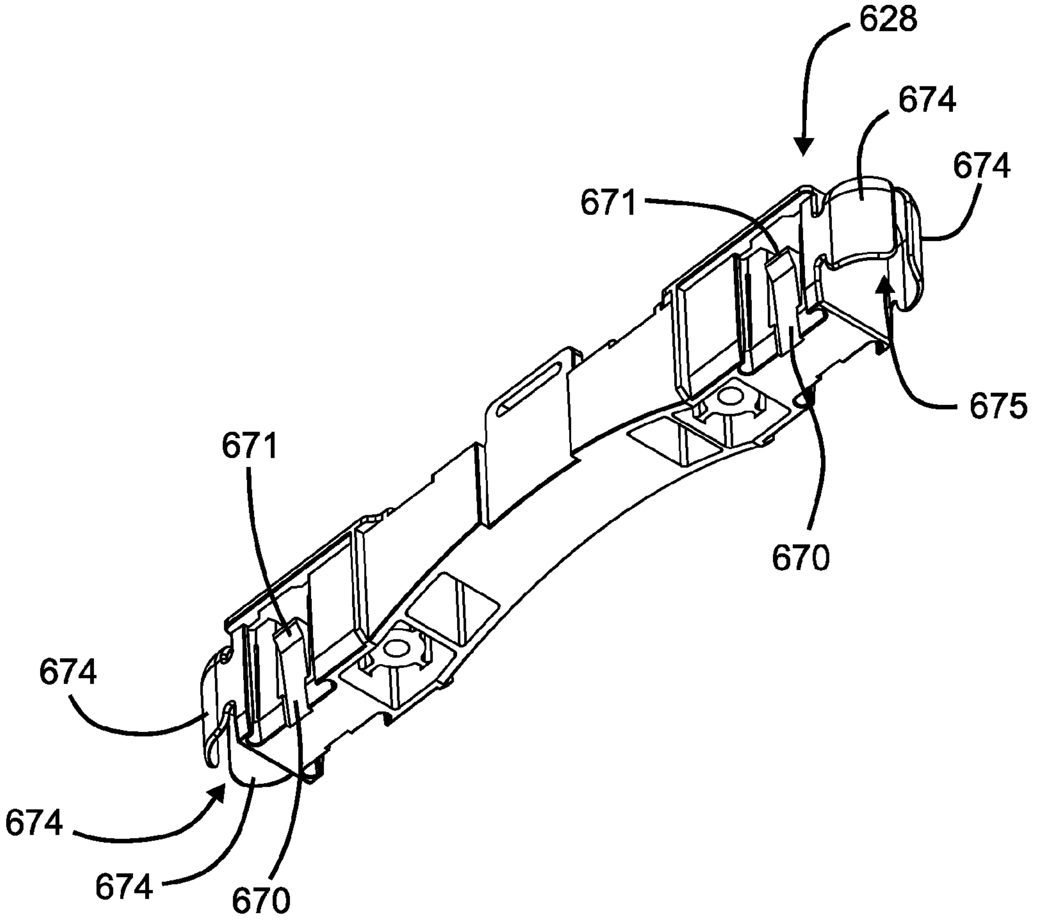
FIG. 64

FIG. 65
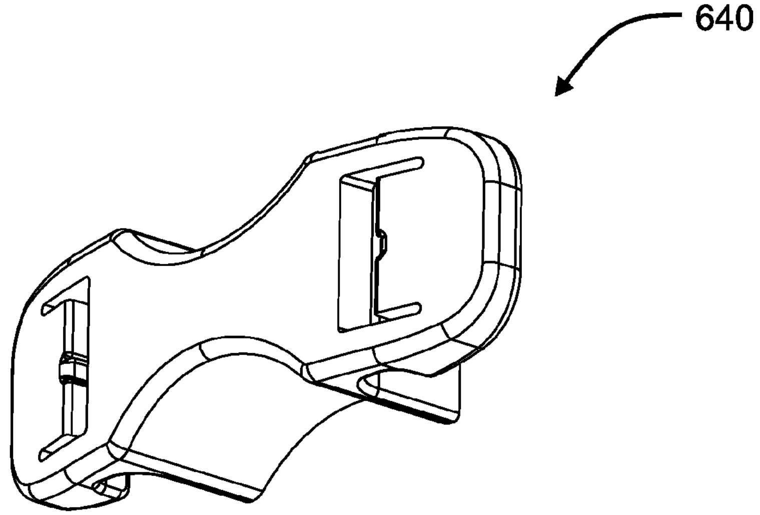
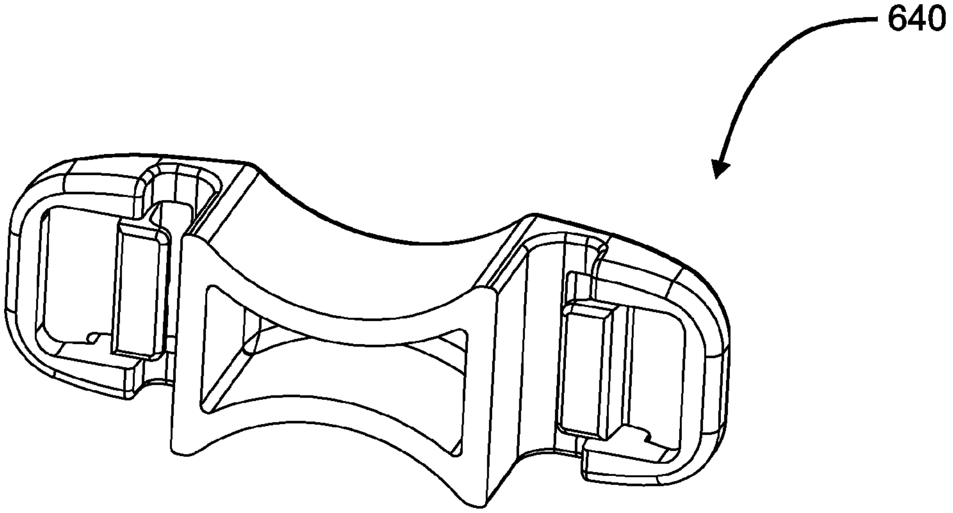
FIG. 66

FIG. 67
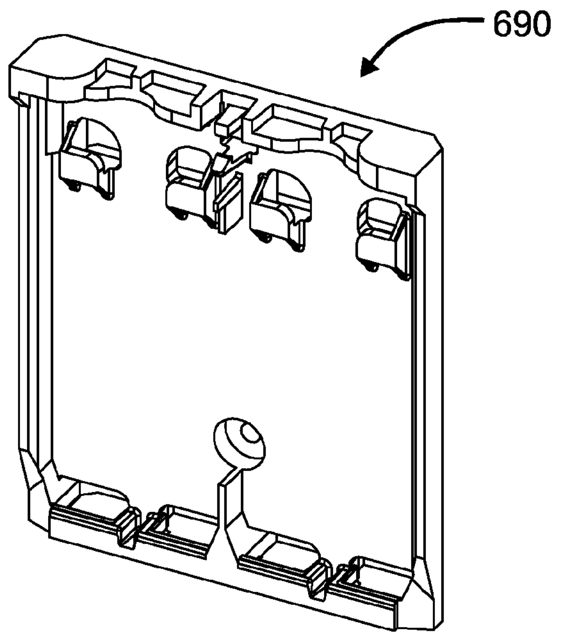
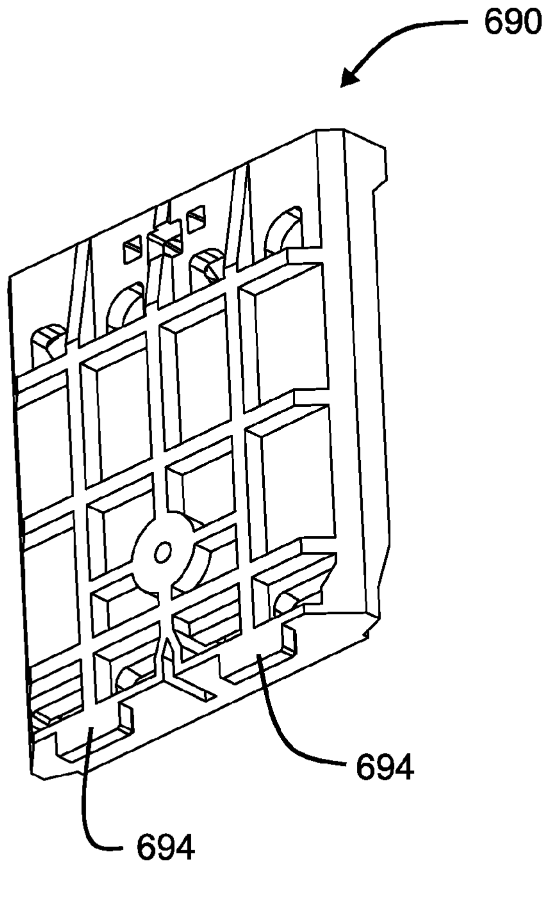
FIG. 68

FIG. 69
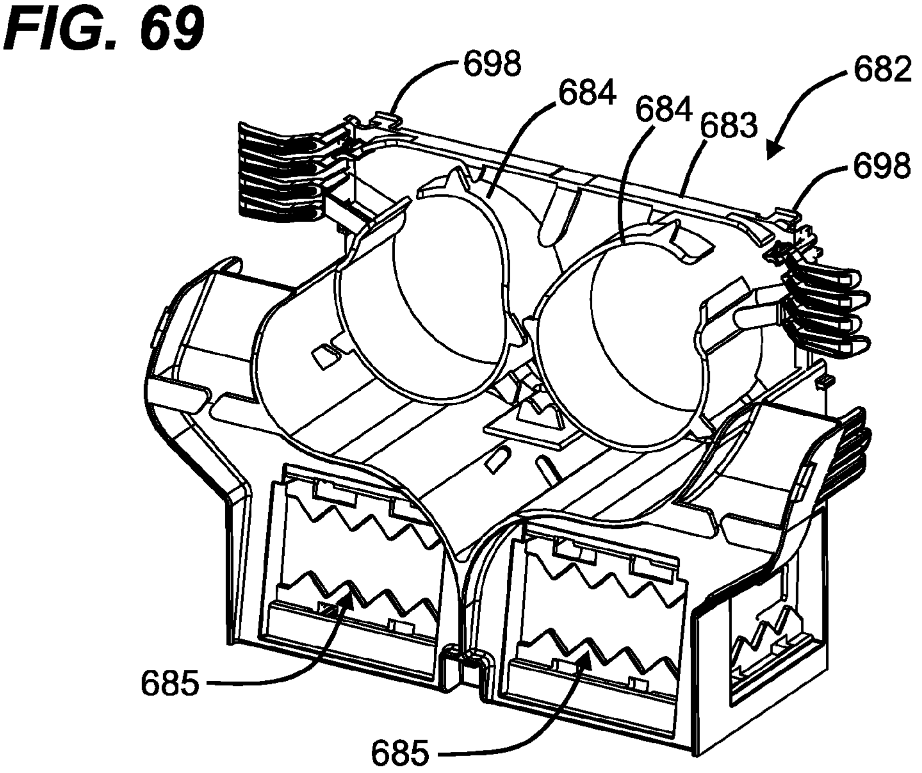
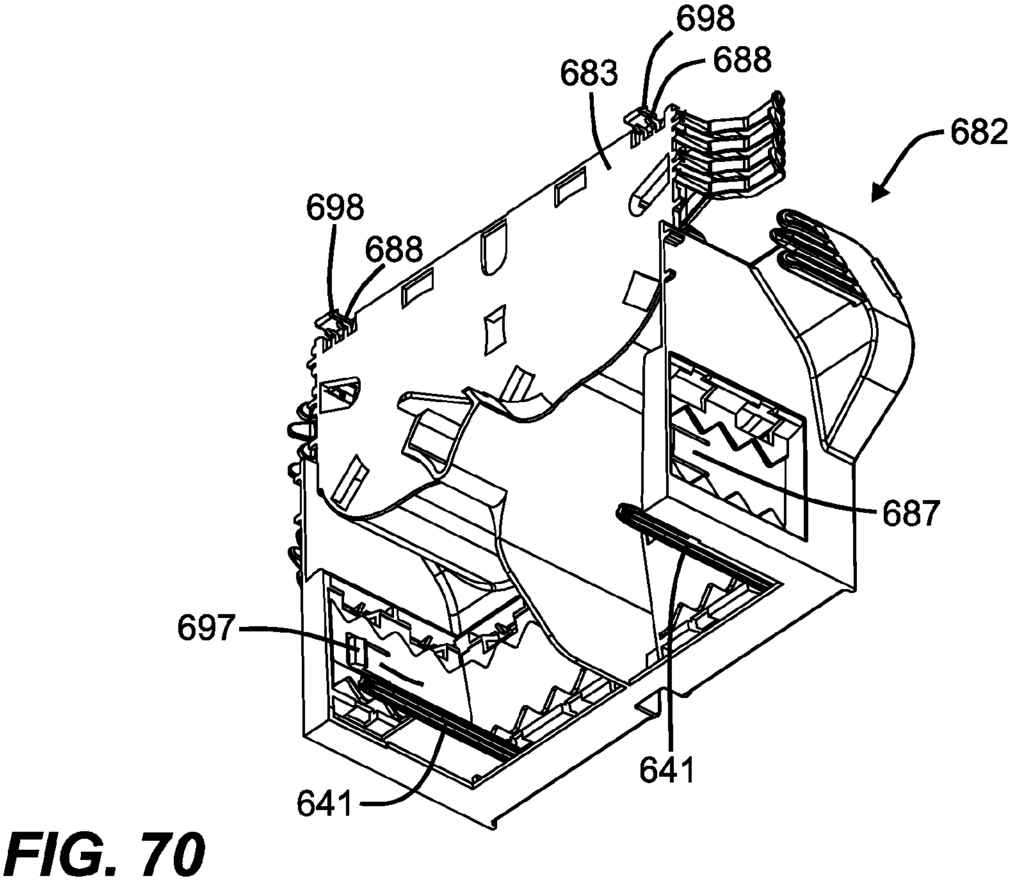
FIG. 70

FIG. 86
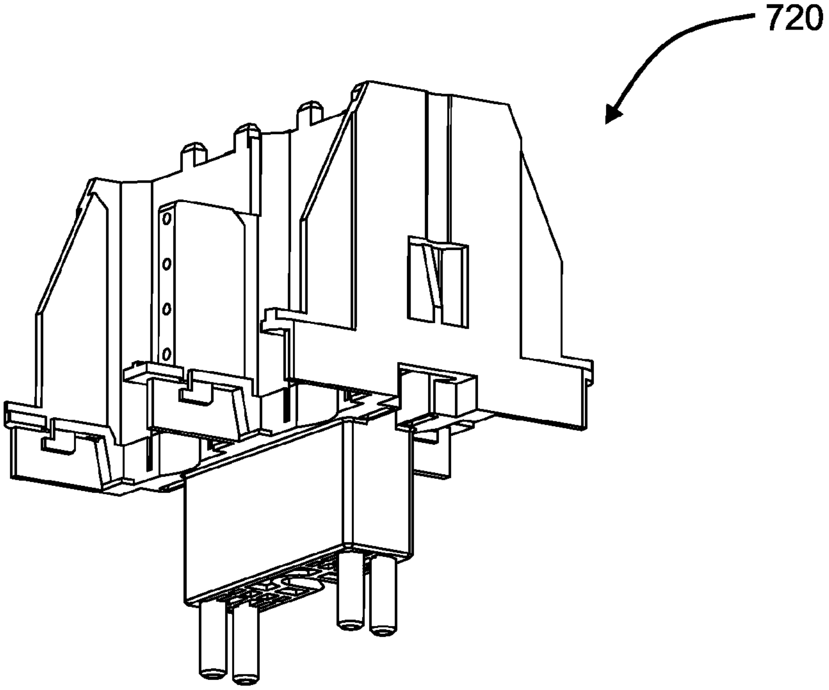
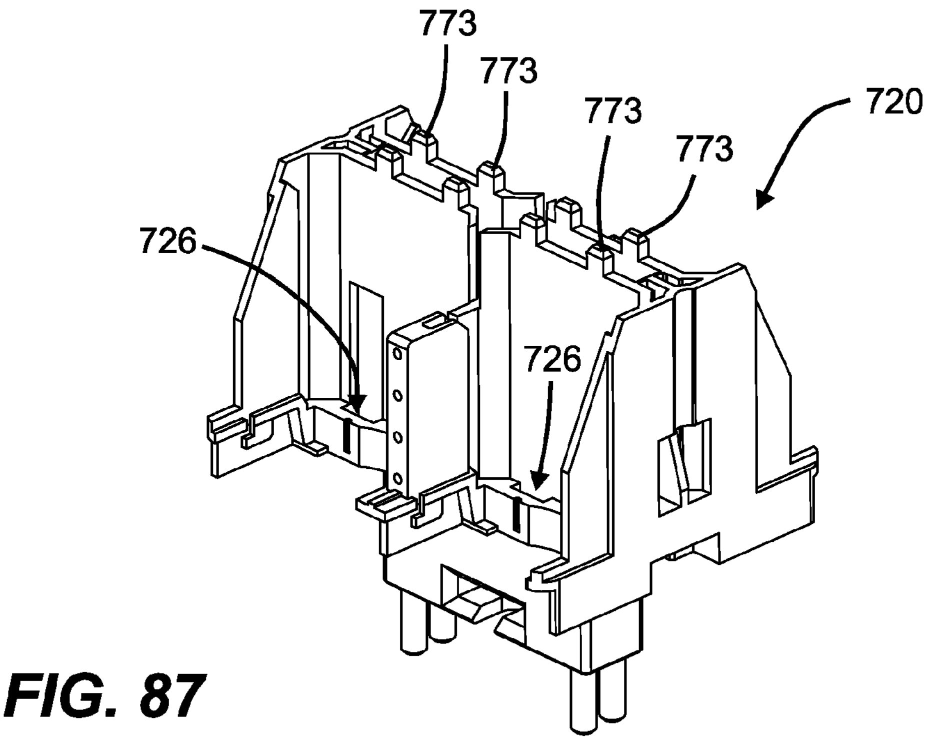
FIG. 87

FIG. 88
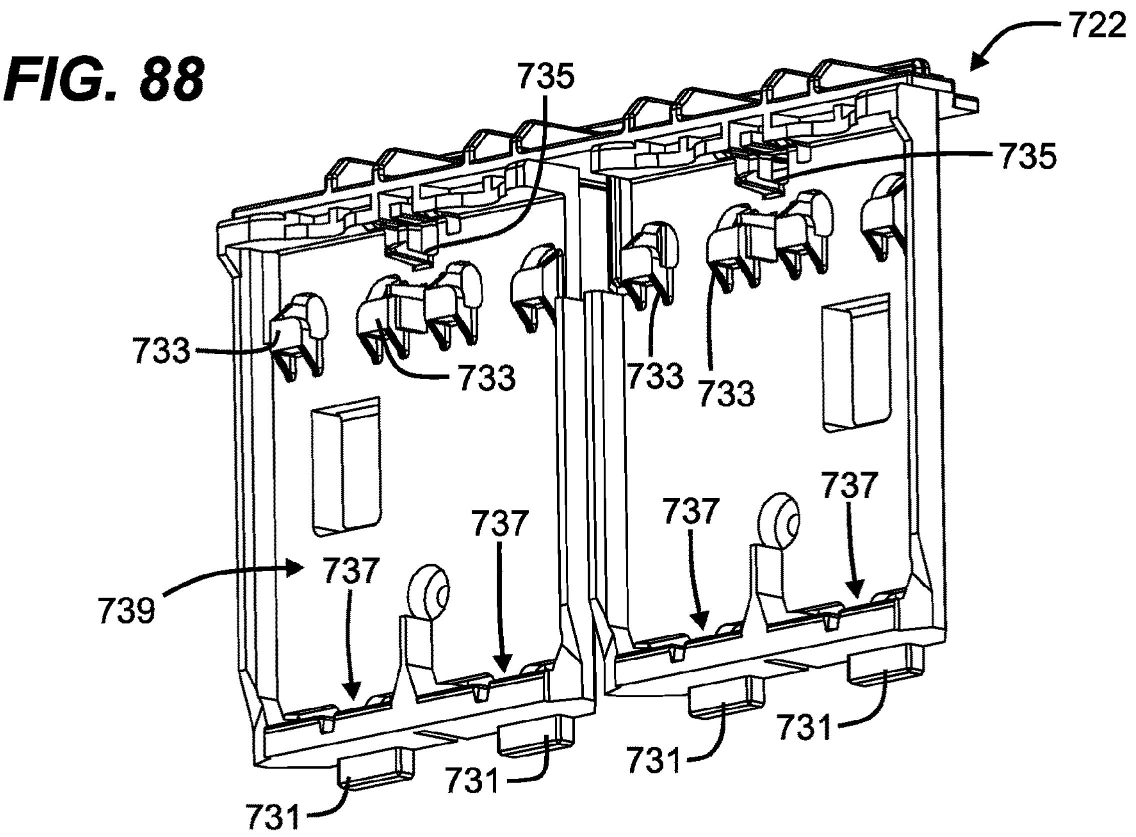
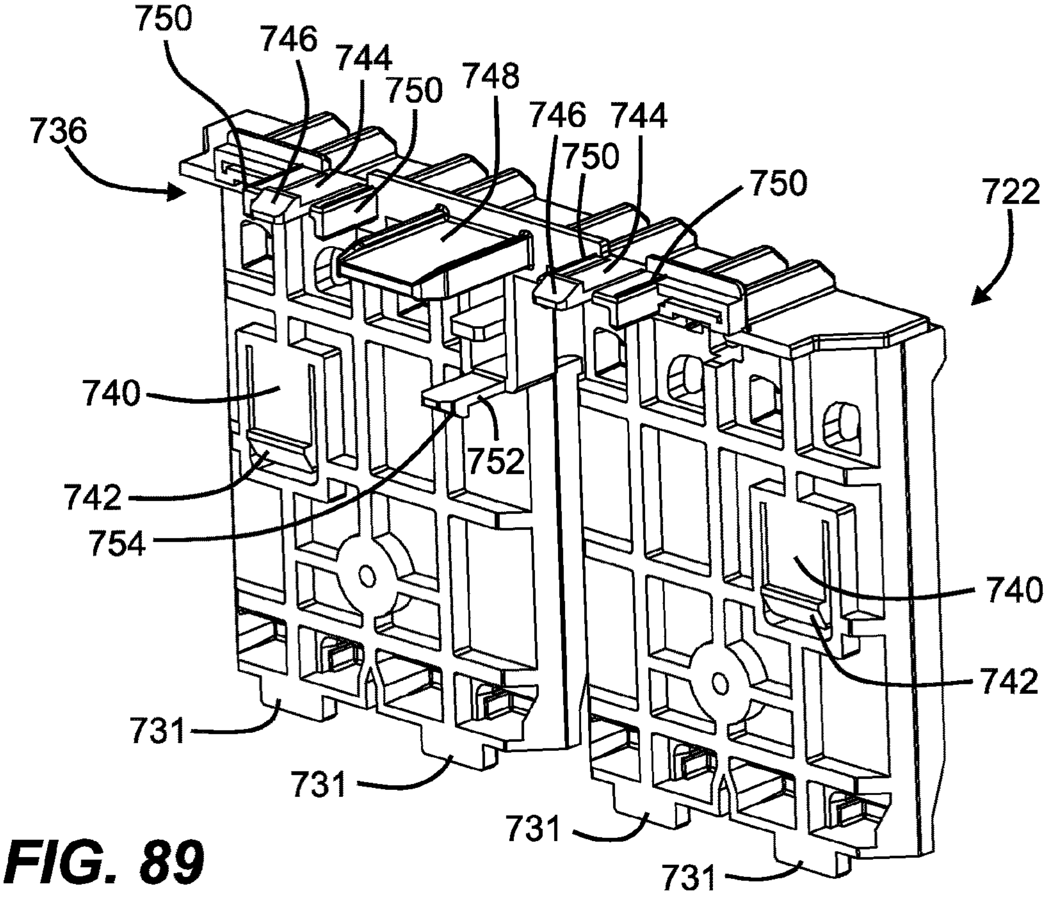
FIG. 89

SUPPORT FRAME ASSEMBLIES FOR OPTICAL FIBER MANAGEMENT TRAYS

CROSS-REFERENCE TO RELATED APPLICATIONS

This application is a National Stage Application of PCT/US2022/032904, filed on Jun. 9, 2022, which claims the benefit of U.S. Patent Application Ser. No. 63/209,584, filed on Jun. 11, 2021 and claims the benefit of U.S. Patent Application Ser. No. 63/273,339, filed on Oct. 29, 2021, the disclosures of which are incorporated herein by reference in their entireties. To the extent appropriate, a claim of priority is made to each of the above disclosed applications.

TECHNICAL FIELD

The present disclosure relates to improvements in assemblies for supporting fiber optical fiber management trays.

BACKGROUND

Optical fibers of telecommunications networks are managed at telecommunications equipment located at different network distribution locations. Such telecommunications equipment can include closures, cabinets, shelves, panels and so forth. The equipment typically includes management assemblies to organize, store, route and connect optical fibers within the network. For example, optical fibers from provider side cables can be routed and optically connected to optical fibers of subscriber side cables using such assemblies. The assemblies can include features for supporting optical fiber splices, ferrules, connectors, adapters, splitters, wave division-multiplexers and so forth. In addition, the assemblies can include features for storing and protecting optical fibers.

The assemblies can include fiber management trays, which can be used to, e.g., support splices and other fiber management components between incoming and outgoing optical fibers that are routed onto the trays. A typical fiber management assembly can include a support structure to which multiple fiber management trays are pivotally mounted in a stack. The pivoting permits access to a desired one of the stack of trays.

SUMMARY

In general terms, the present disclosure relates to improvements in support structures and assemblies for optical fiber management trays.

In further general terms, the present disclosure relates to improvements in fiber optic closures and other fiber optic distribution equipment.

In one aspect, the present disclosure relates to a support framework for supporting modules that pivotally mount optical fiber management trays.

In another aspect, the present disclosure relates to improvements in how such frameworks are assembled.

In another aspect, the present disclosure relates to improvements in features of such frameworks that lockingly mount the modules.

According to certain aspects of the present disclosure, an assembly for a telecommunications closure, includes: frame members fastenable to one another to form a framework defining a first axis, a second axis, and a third axis that are mutually perpendicular to one another, the framework being configured to mount a stack of modules extending along a stacking axis that is parallel to the first axis, each module including a module body configured to pivotally mount optical fiber management trays at hinge locations defined by the module body, the hinge locations defining pivot axes when the trays are pivotally mounted thereto, the pivot axes being parallel to the second axis, the framework including first engagement structures allowing each module to be fully mounted and locked to the framework without movably engaging the framework and the module body parallel to the second axis.

According to further aspects of the present disclosure, a method includes: providing frame members, each frame member having a seamless, unitarily formed construction; and connecting the frame members together to form a framework configured to mount modules for pivotally mounting fiber management trays, the connecting including staking a pair of the frame members to each other.

According to further aspects of the present disclosure, a method includes: providing frame members, each frame member having a seamless, unitarily formed construction; and connecting the frame members together to form a framework configured to mount modules for pivotally mounting fiber management trays, the framework including pairs of connected ones of the frame members, the connecting of every one of the pairs including snappingly engaging one of the pair of frame members to the other of the pair of frame members.

According to further aspects of the present disclosure, a method includes: providing a framework configured to mount a stack of modules extending along a stacking axis, each module being configured to pivotally mount optical fiber management trays, each module including a module body: engaging the module body of one of the modules to the framework: and while the module body and the framework are engaged to each other, sliding the module body along the stacking axis to lock the module body to the framework.

According to further aspects of the present disclosure, and assembly for a telecommunications closure, includes: frame members snappingly fastenable to one another to form a framework defining a first axis, a second axis, and a third axis that are mutually perpendicular to one another, the frame members including: a frame base, the base defining a first pocket and second pockets configured differently from the first pocket, the first pocket being configured to receive a seal block for sealing around a cable entering the closure, the second pockets including couplers: and frame module members configured to mount a stack of modules extending along a stacking axis that is parallel to the first axis, each module including a module body configured to pivotally mount optical fiber management trays at hinge locations defined by the module, the frame module members being configured to snappingly connect to the couplers when the frame module members are inserted into the second pockets.

According to further aspects of the present disclosure, a method of assembling a framework for pivotally supporting optical fiber management trays in a telecommunications closure, includes: snappingly connecting first and second frame members to provide a frame subassembly: and snappingly connecting the frame subassembly to a base by inserting the subassembly into a second pocket of the base, the base including a first pocket configured differently from the second pocket, the first pocket being configured to receive a seal block for sealing around a cable entering the closure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

FIG. 61 is a perspective view of the base of the framework of FIG. 60.

FIG. 62 is a further perspective view of the base of FIG. 61.

FIG. 63 is a perspective view of the top member of the framework of FIG. 60.

FIG. 64 is a further perspective view of the top member of FIG. 63.

FIG. 65 is a perspective view of a spacer member of the framework of FIG. 60.

FIG. 66 is a further perspective view of the spacer member of FIG. 65.

FIG. 67 is a perspective view of a cable termination unit baseplate of the assembly of FIG. 53.

FIG. 68 is a further perspective view of the baseplate of FIG. 67.

FIG. 69 is a perspective view a fiber routing module of the framework of FIG. 60.

FIG. 70 is a further perspective view of the fiber routing module of FIG. 69.

FIG. 86 is a perspective view of the base of the portion of the assembly of FIG. 84.

FIG. 87 is a further perspective view of the base of FIG. 86.

FIG. 88 is a perspective view of a frame member of the portion of the assembly of FIG. 84.

FIG. 89 is a further perspective view of the frame member of FIG. 84.

DETAILED DESCRIPTION

Figure 1:
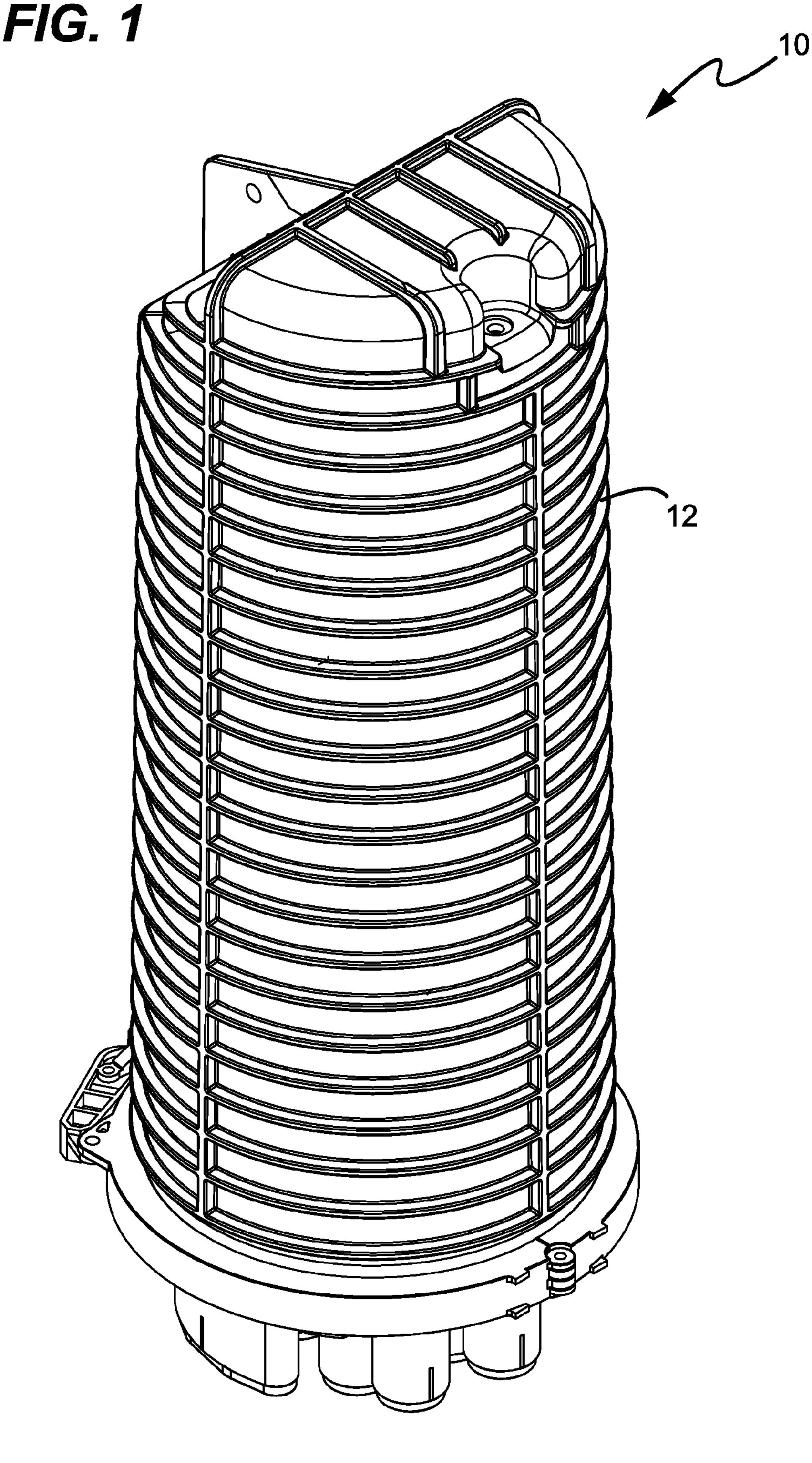
FIG. 1 is a perspective view of example telecommunications equipment that can support an optical fiber management assembly according to the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Any examples set forth in this specification are not intended to be limiting and merely set forth some of the many possible embodiments for the claimed invention.

Figure 2:
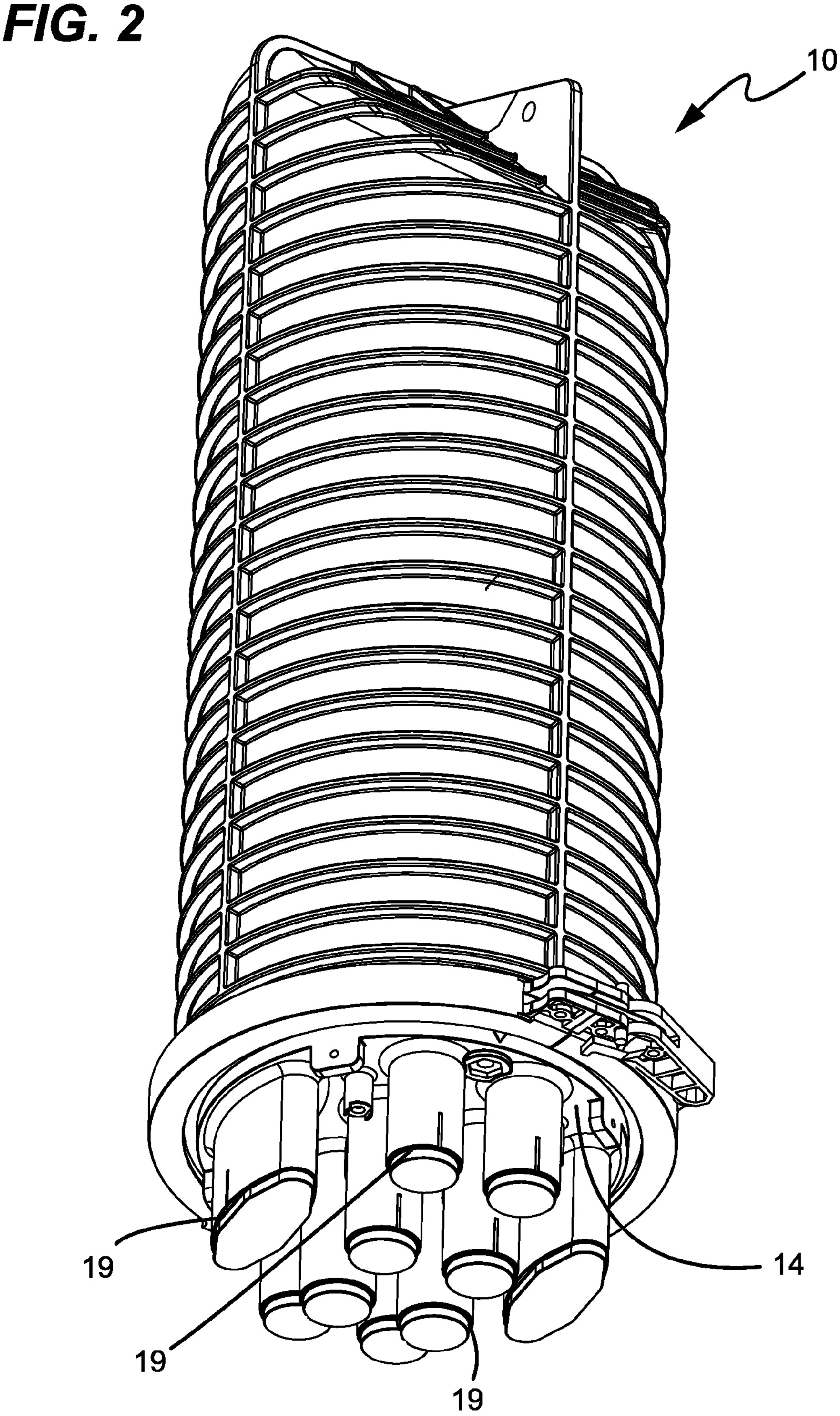
FIG. 2 is a further perspective view of the equipment of FIG. 1.
Figure 3:
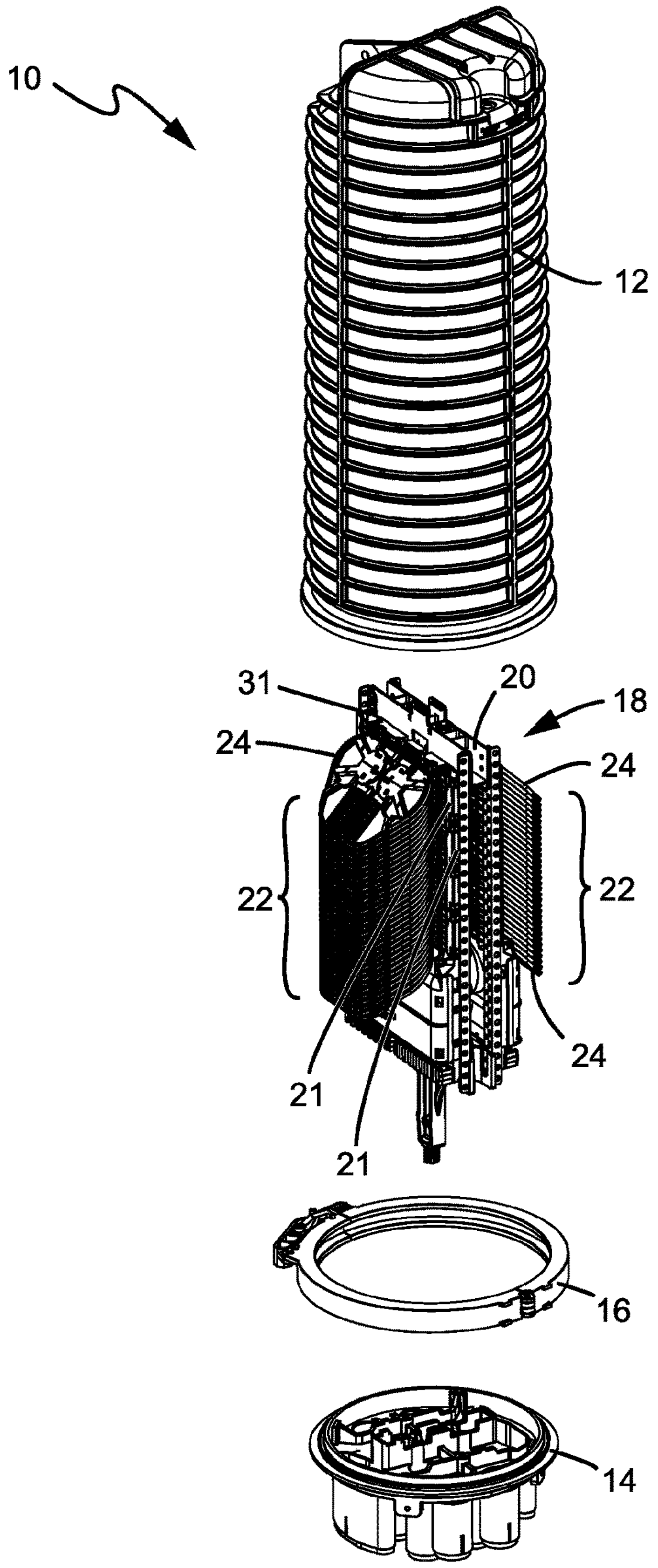
FIG. 3 is a partially exploded view of the equipment of FIG. 1, and showing an example fiber management assembly that can be housed in the equipment of FIG. 1.

Referring to FIGS. 1-3, example telecommunications equipment 10 is shown. In the depicted example, the equipment 10 includes a sealable and re-enterable closure. In other examples, the equipment can include other components at a distribution location of an optical fiber network. Such equipment can include, for example, a cabinet, a drawer, a shelf, or a panel for organizing and routing optical fibers.

The closure 10 includes a first housing piece 12 (in this case, a dome), and a second housing piece 14 configured to cooperate with the first housing piece to define a sealable and re-enterable telecommunications closure for managing optical fibers. The first and second housing pieces 12, 14 define an interior closure volume in which other fiber managing equipment, including an optical fiber management assembly according to the present disclosure, can be mounted.

A clamp ring 16 having a clamp can be used to clamp and seal together the housing pieces 12 and 14.

Cables carrying optical fibers can enter the closure volume via sealable ports 19 defined by the second housing piece 14. Such cables can include trunk cables, feeder cables, branch cables, and distribution cables (also known as drop cables). Typically, optical fibers from one cable entering the closure are spliced to optical fibers of one or more other cables entering the closure to establish an optical signal path at the closure 10 (or other signal distribution equipment) from a provider side cable to one or more customer side cables, or an optical signal between a branch cable and any of: another branch cable, a trunk cable, a feeder cable, or a distribution cable. Branch cables can be used to route optical signals from one telecommunications closure to another telecommunications closure.

In addition to splicing, other fiber management activities can be performed with telecommunications equipment housed within the closure volume. Such activities can include, without limitation, indexing fibers, storing fibers (typically in one or more loops) and splitting fibers.

Splices, such as mechanical splices or fusion splices, can be performed at the factory or in the field, e.g., at the closure 10 positioned in the field.

The cables entering the closure can include fibers of different configurations such as loose fibers and fiber ribbons. The fiber ribbons can be flat ribbons or rollable ribbons. The loose fibers can be individual fibers or bundled loose fibers protected by a common protective sheath or tube. For fiber ribbons, the fibers of the entire ribbon can be spliced to the fibers of a corresponding fiber ribbon at the same time, e.g., using a mass fusion splicing procedure.

Splice bodies protect the splices both in the case of individual fiber splices and mass fiber splices, such as mass fusion splices. The splice bodies are held in splice holders also known as splice chips. Fiber management trays 24 can support such splice holders (or chips). The fiber management trays 24 can be stacked in stacks 22 back to back on back-to-back stacks of tray support modules 21. The support modules 21 are mounted to a framework 20. The trays 24 are pivotal relative to the support modules 21 such that a desired tray 24 in the stack can be accessed by pivoting one or more of the trays away from the desired tray. Supports can be provided to hold trays in a desired pivot position to allow another tray to be freely worked with. The stacks 22 of trays 24, the support modules 21, and the framework 20 form part of an optical fiber management assembly 18 that is configured to be sealingly stored within the interior closure volume and re-accessed when needed to service the assembly 18, such as to route or splice additional fibers between incoming and outgoing cables.

As used herein, positioning and orientational terms such as up, down, upper, lower, above, below, front, back, rear, forward, backward, rearward, horizontal, vertical, and so forth, may be used to refer to relative positioning of components in an assembly or portions of a component relative to each other when positioned in an assembly. Such terminology is provided as a descriptive aid and does not limit how components or portions of components may be positioned or oriented in practice.

Referring now to FIGS. 4-16, an assembly 100 in accordance with the present disclosure, and that can be housed in the closure 10 of FIG. 1, will be described. In addition, components of the assembly 100 can be installed on or in other telecommunications equipment that are not sealable closures, such as cabinets, panels, drawers, racks, shelves, and so forth.

The assembly 100, as well as individual components of the assembly 100 and various combinations of the components of the assembly 100, can provide one or more advantages in manufacturing cost and efficiency, weight reduction, assembly cost and efficiency, and versatility in using the components of the assembly across different network applications. Additional advantages will be borne out by the following disclosure.

The assembly 100 defines a first axis, or vertical axis 102, a second axis 104, and a third axis 106. The first axis 102, the second axis 104, and the third axis 106 are mutually perpendicular. The second axis 104 and the third axis 106 define a horizontal plane. The assembly 100 extends from a top 108 to a bottom 110 along the first axis 102. The assembly 100 extends from a first side 112 to a second side 114 along the second axis 104. The assembly 100 extends from a front 116 to a back 118 along the third axis 106.

The assembly 100 includes a framework (or frame) 120 consisting of a number of frame members.

The assembly 100 also includes front and back stacks 123 of fiber management tray support modules 122. The stacks 123 are back-to-back mounted to the framework 120. Each stack 123 includes a selectable number of modules 122 stacked along a stacking axis 125 of the stack 123 when mounted to the framework 120. In the example shown, each stack 123 includes four modules 122. In other examples, 0, 1, 2, 3, 4 or more than 4 modules can be in any stack 123, depending on the vertical height of the framework 120 and the number of fiber management trays desired to manage fibers at the assembly 100.

In some examples, the framework can be added to along the vertical axis 102 to accommodate additional modules 122. For example, additional frame members can be added to the framework 120 to grow the framework 120 along the vertical axis 102.

The framework 120 includes a bottom member 126, a top assembly 127 including two top members 128 and two corner members 130, two side members (or uprights) 132 having a first upright configuration, and two side members (or uprights) 134 having a second upright configuration.

When assembled in the framework 120, each stack 123 of modules 122 is mounted to a pair of uprights, including one of the uprights 132 and one of the uprights 134. In particular, there is a front pair 135 of uprights 132 and 134, and a back pair 137 of uprights 132 and 134. In the assembled framework configuration, in each such pair of uprights, the upright 132 is a mirror image of the upright 134 about a vertical plane defined by the axes 102 and 106.

The framework 120 includes spacer members 140. Each spacer member 140 is configured to couple to one of the uprights of the first pair 135 and, on the same side of the assembly, to one of the uprights of the second pair 137. Thus, each spacer member 140 is configured to couple to an upright 132 and an upright 134, and thereby couple those two uprights to each other. The spacer members 140 can help to maintain a spacing between the pairs 135 and 137 of uprights, while providing additional structural support to the framework 120.

Each of the members of the framework 120 just described can be constructed from a suitably strong and rigid material. For example, one or more of the members can be constructed from a polymeric material and/or one or more of the components can be constructed from a metal material, such as aluminum or steel.

In some examples, each frame member described in this disclosure is of seamless unitary constructed.

In one example, the bottom member 126 and the two top members 128 are constructed of a metal material (e.g., aluminum), and the corner members 130, the uprights 132, 134 and the spacer members 140 are constructed (e.g., molded parts) of a polymeric material. Constructing those components of a polymeric material can provide for a lighter weight framework that is easier to assemble and handle, while constructing the bottom member 126 and the top members 128 from metal can impart additional strength and structural integrity to the framework 120. Alternatively, the top members 128 can be constructed of a polymeric material, such that only the bottom member 126 is constructed from metal.

For example, plastic parts can be molded to include convenient snapping connector features. The spacer members 140, for instance, are configured to snappingly mount to the uprights 132 and 134. In addition, each corner member 130 is configured to snappingly connect to an upright 132 and an upright 134 on the same side.

Meanwhile, for improved structural integrity and strength, to attach the bottom member 126 and top members 128 to the uprights 132, 134, in this example, fasteners (such as rivets) can be used. Specifically rivets or other fasteners can be driven into holes 142 defined by the uprights 132, 134 and corresponding holes 146 defined by the bottom member 126 to thereby securely (e.g., permanently) fasten the bottom member 126 to the uprights 132 and 134. Similarly, rivets or other fasteners can be driven into holes 144 defined by the uprights 132, 134 and corresponding holes 148 defined by the top members 128 to thereby securely (e.g., permanently) fasten the top members 128 to the uprights 132 and 134.

For additional stability between the uprights and the bottom member, integrally molded posts 159 of the uprights 132, 134 can be inserted into holes 157 of flanges 158 of the bottom member 126.

Each corner member 130 includes two flexibly resilient latch arms 150. Each latch arm 150 includes a catch 152. Each catch 152 includes a ramp 154 to ease insertion of the corner member 130 between an upright 132 and an upright 134, causing the latch arms 150 to flex inward (toward each other) until the catches 152 find the recesses 156 defined by the uprights 132, 134, at which point the latch arms 150 resiliently return to their unflexed configuration and the catches 152 snappingly engage the recesses 156, thereby locking the corner member 130 to the uprights 132 and 134.

To unlock and remove a corner member 130 from the uprights 132 and 134, the latch arms can be flexed toward each other parallel to the axis 106 (e.g., manually with fingers, or a tool) to release the catches 152 from the recesses 156.

The corner members 130 can be selectively removed to, e.g., grow the framework 120 along the axis 102. For example, four additional uprights can be connected to the uprights 132 and 134 at their top ends. The additional uprights can be shorter, longer, or the same height as the uprights 132 and 134, depending on the desired vertical height of the completed assembly, which can depend on the type of application (e.g., the size of the closure that will be housing the assembly). Such additional uprights can be connected to the uprights 132 and 134 using, e.g., spacer members 140 in a manner such that their latches span four uprights, including an upright 132, an upright 134, and the two additional uprights that are thereby connected to the uprights 132 and 134 using the spacer member 140. In addition, or alternatively, other configurations of frame members, clips, or locking mechanisms can be used to secure the additional frame members to the uprights 132, 134.

The removably lockable corner members 130 can be selectively removed to provide corner access to the storage volume 160 defined between the front pair 135 and the back pair 137 of uprights 132, 134.

The top members 128 are spaced apart from each other parallel to the axis 106 to provide an access slot 199 to the storage volume 160 through which fibers can pass from above the top members 128 when the framework 120 is grown as just described.

The storage volume 160 can be used to store loops of optical fibers and/or portions of such loops. For instance, lengths of optical fibers that are routed to the assembly 100 but are not presently routed to a fiber management tray 124 can be stored in one or more loops in the storage volume 160. In some examples, such looped fibers can be grouped together and housed in protective sheaths (e.g., tubes), and the looped sheaths are stored in the storage volume 160. In addition, excess fiber slack of optical fibers that are routed to fiber management trays 124 can be stored in the storage volume 160. Removing one of the corner members 130 can allow improved access to the storage volume to manage stored lengths of fiber therein, as well as facilitate routing of optical fibers to the storage volume 160. Once access is no longer required, the corner member 130 can then be snapped back into place between uprights 132 and 134.

The spacer members 140 ensure that the shape and size of the storage volume 160 is maintained by providing additional connectivity at fixed spacing between front and back uprights. Each spacer member connects one of the front uprights 132, 134 to the other of the back uprights 134, 132. Locking and unlocking a spacer member 140 to uprights 132, 134 is similar to the locking and unlocking of the corner members 130 described above. Each spacer member 140 includes two flexibly resilient latch arms 162. Each latch arm 162 includes a catch 164. Each catch 164 includes a ramp 166 to ease insertion of the spacer member 140 between an upright 132 and an upright 134, causing the latch arms 162 to flex inward (toward each other) until the catches 164 find the recesses 168 defined by the uprights 132, 134, at which point the latch arms 162 resiliently return to their unflexed configured and the catches 164 snap over shoulders 169 defined by the uprights 132, 134 and snappingly engage the recesses 168, thereby locking the spacer member 140 to the uprights 132 and 134.

To unlock and remove a spacer member 140 from the uprights 132 and 134, the latch arms 162 can be flexed toward each other (e.g., by hand using fingers, or with a tool) to release the catches 164 from recesses 168, allowing the catches 164 to clear the shoulders 169. Detents 170 can be provided in the spacer member 140 to more easily access the latch arms to flex them toward each other within a cavity 171 defined by a body of the spacer member 140.

Each tray support module 122 includes a module body 172. The module 122 can be described as a module piece of a larger module that consists of the module piece 122 and one or more other module pieces. For example, a complete module can be formed by mounting the module 122 to the front pair 135 or the back pair 137 of uprights 132, 134.

Figure 4:
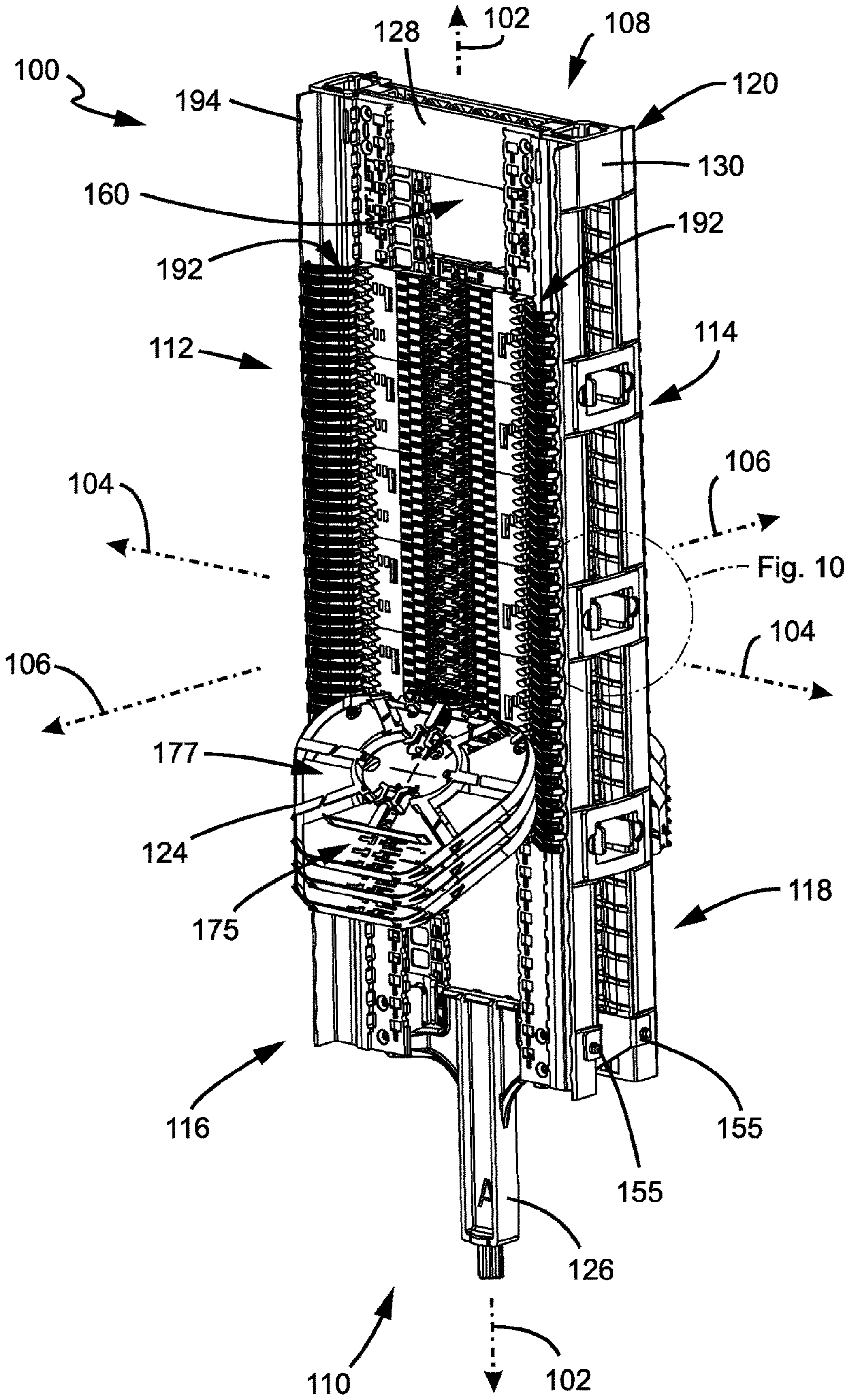
FIG. 4 is a perspective view of an example fiber management assembly according to the present disclosure.
Figure 5:
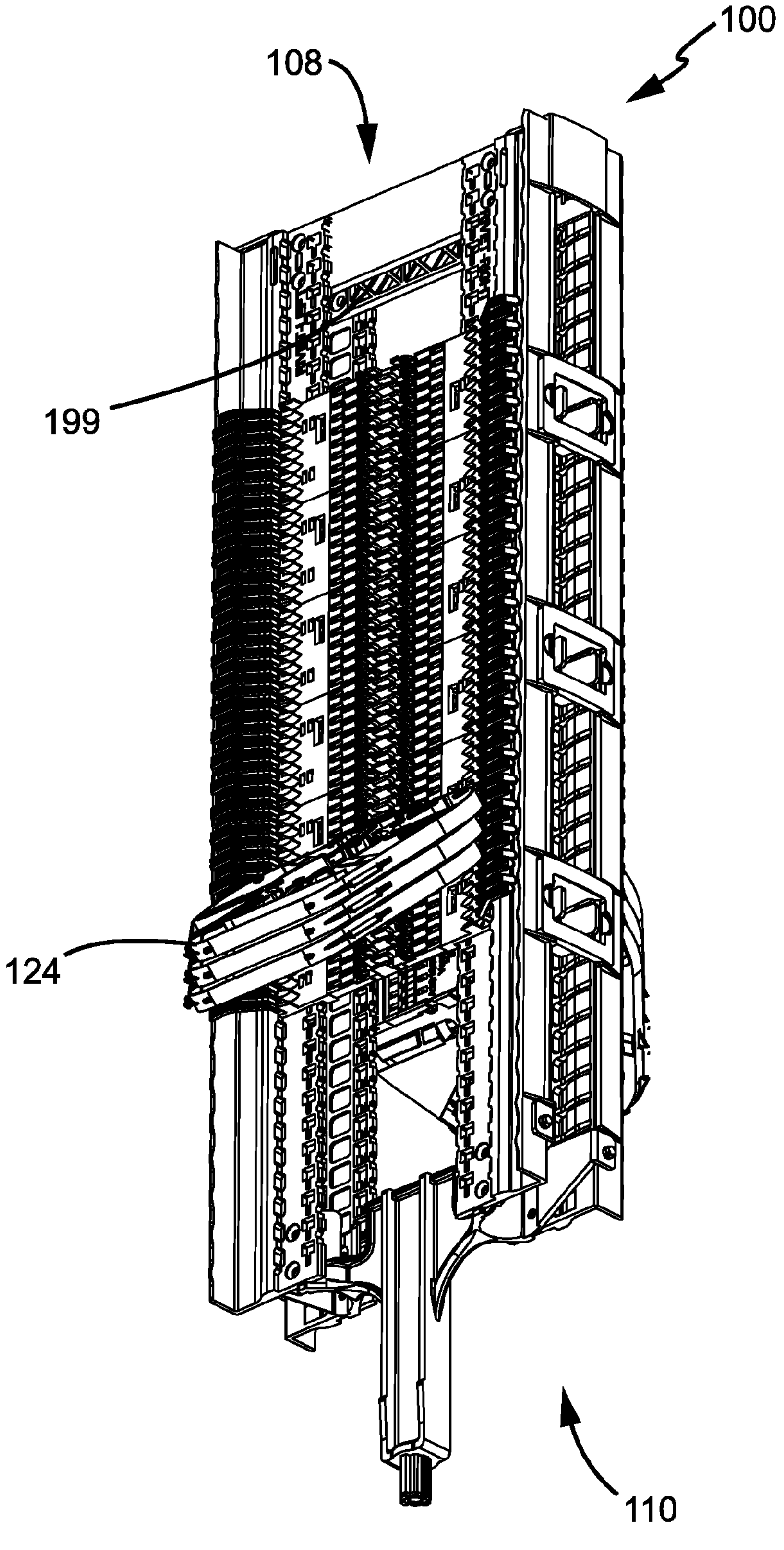
FIG. 5 is a further perspective view of the assembly of FIG. 4.
Figure 6:
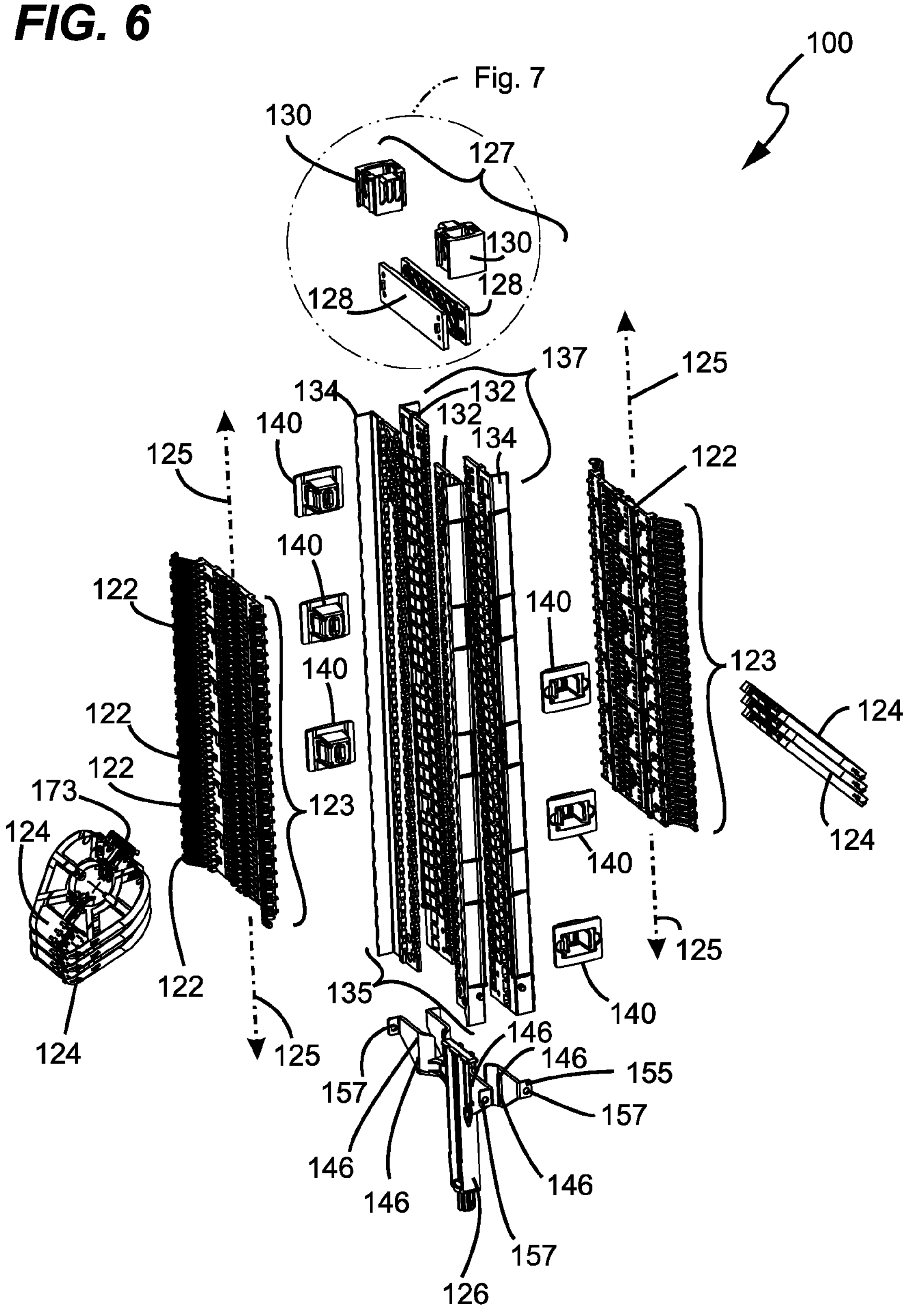
FIG. 6 is a partially exploded view of the assembly of FIG. 4.
Figure 7:
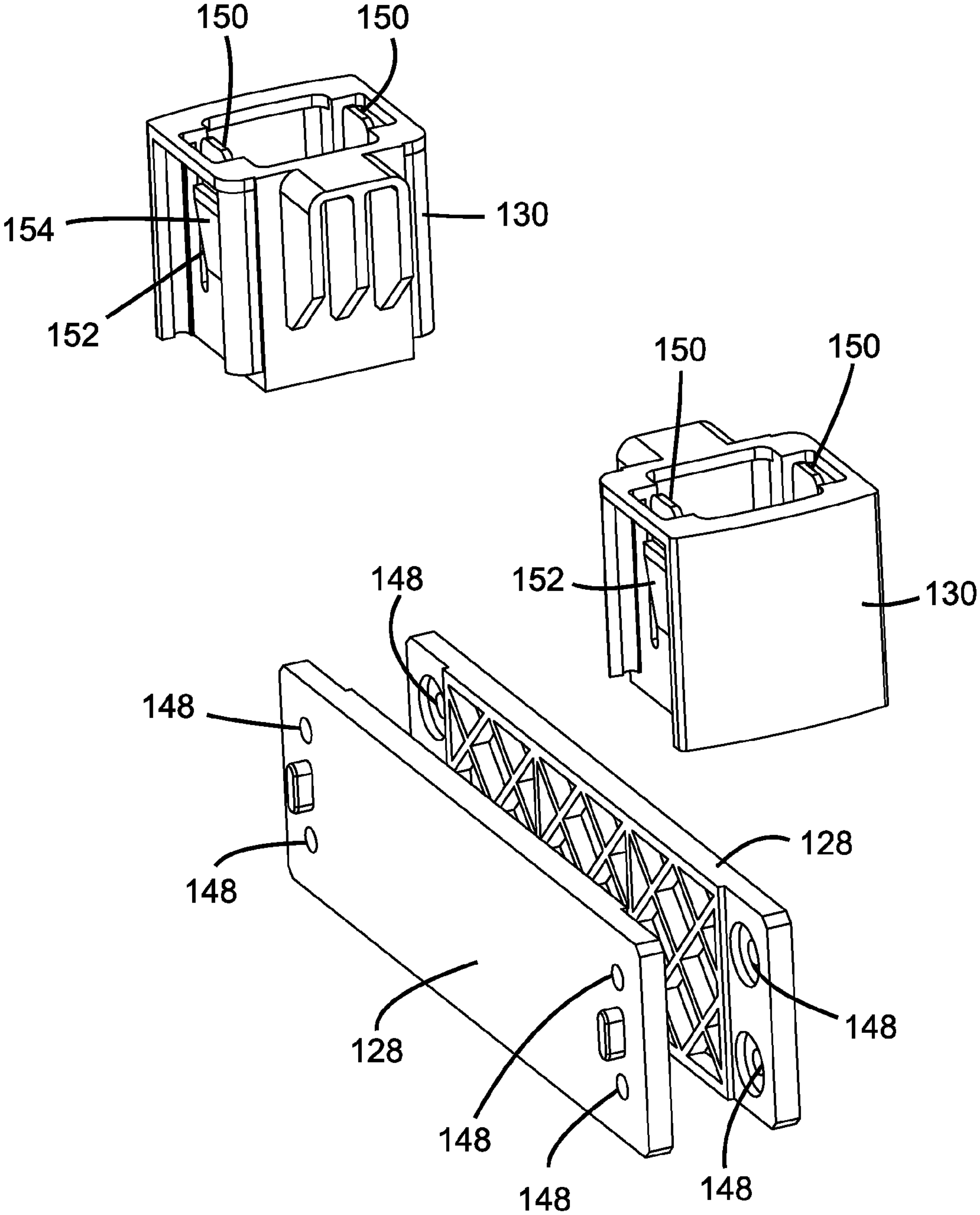
FIG. 7 is an enlarged view of the called-out components of the assembly in FIG. 6.
Figure 8:
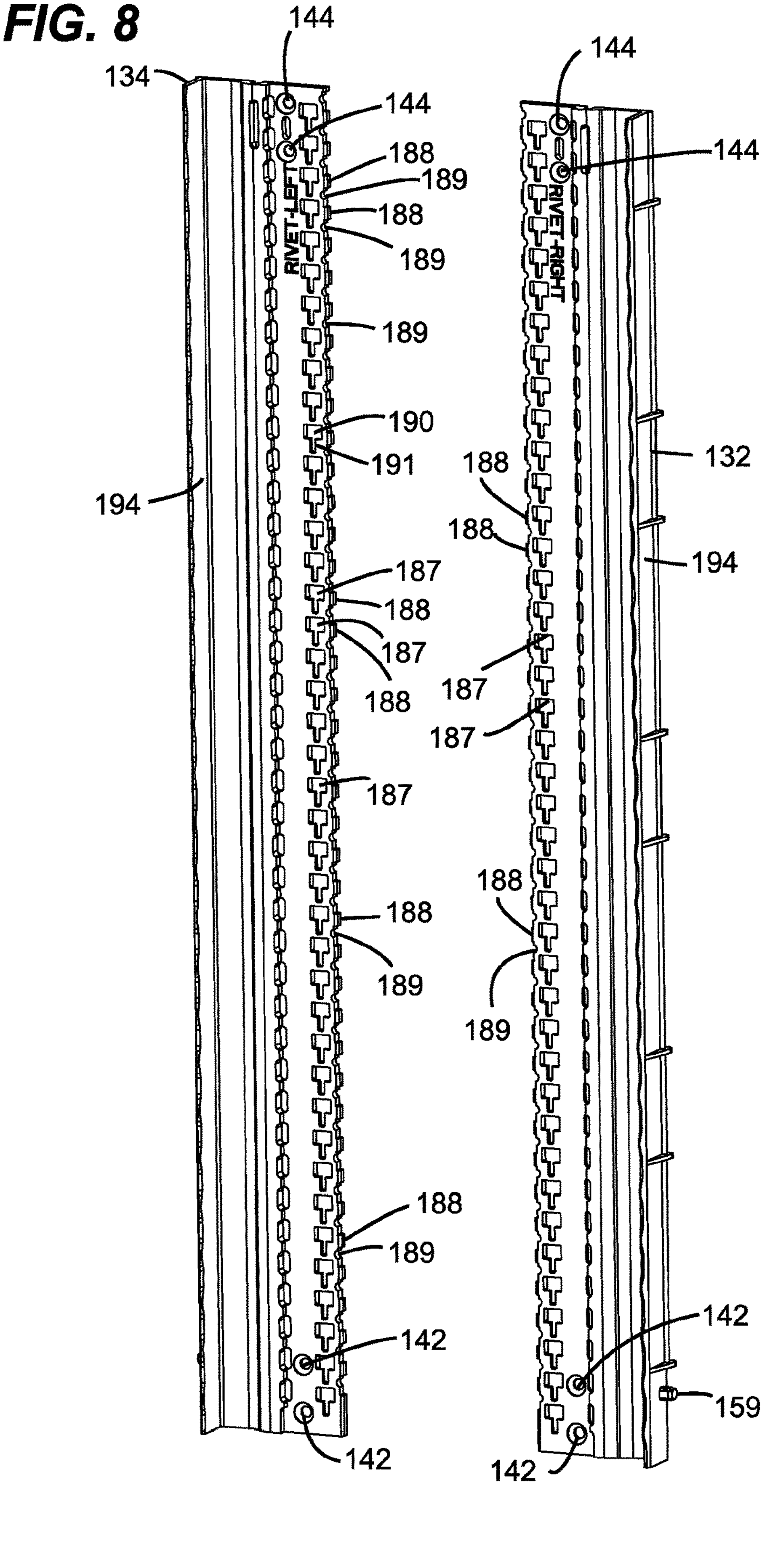
FIG. 8 is perspective view of two of the frame members of the assembly of FIG. 4.
Figure 9:
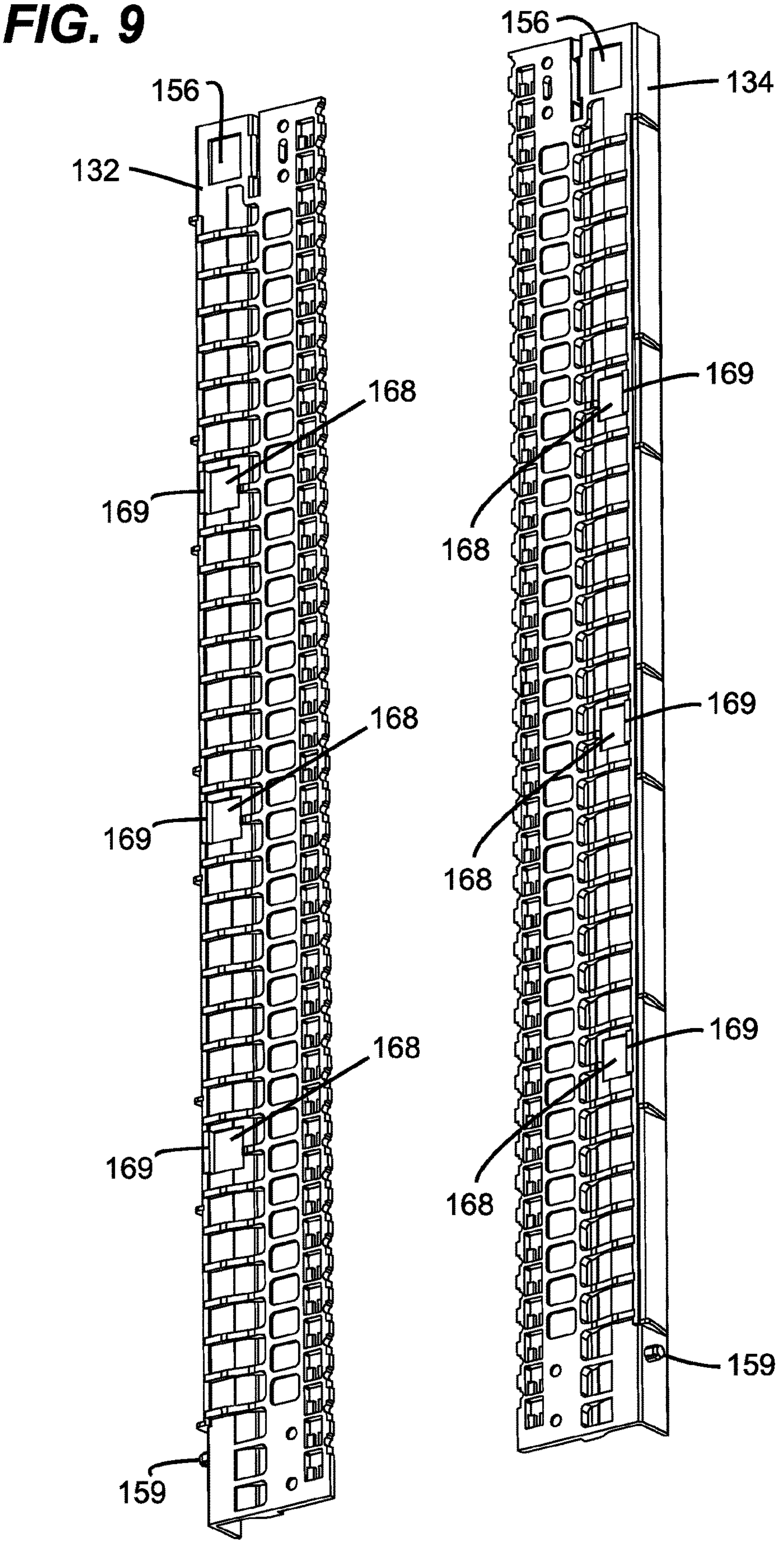
FIG. 9 is a further perspective view of the frame members of FIG. 8.
Figure 10:
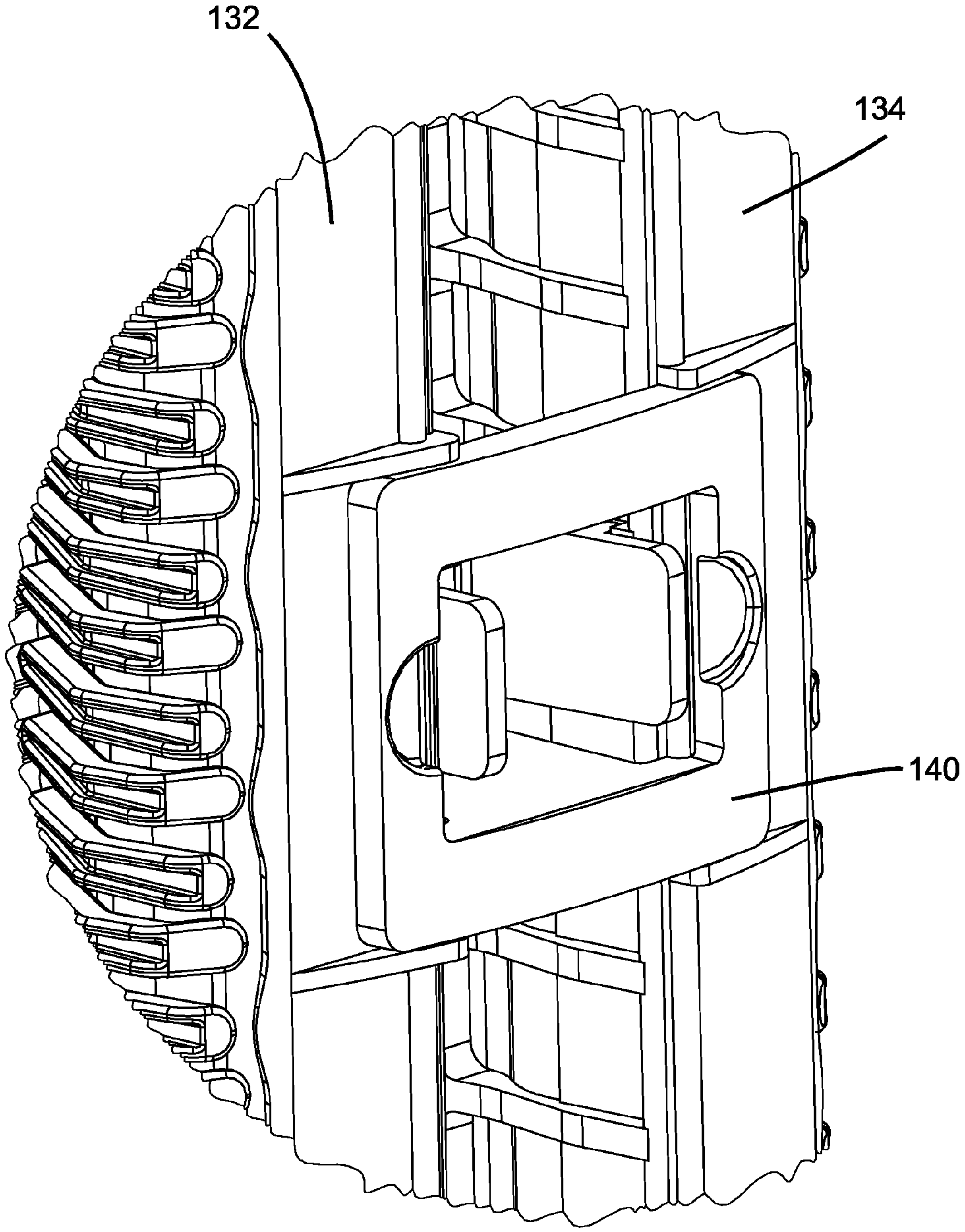
FIG. 10 is an enlarged view of the called-out portion of FIG. 4.
Figure 11:
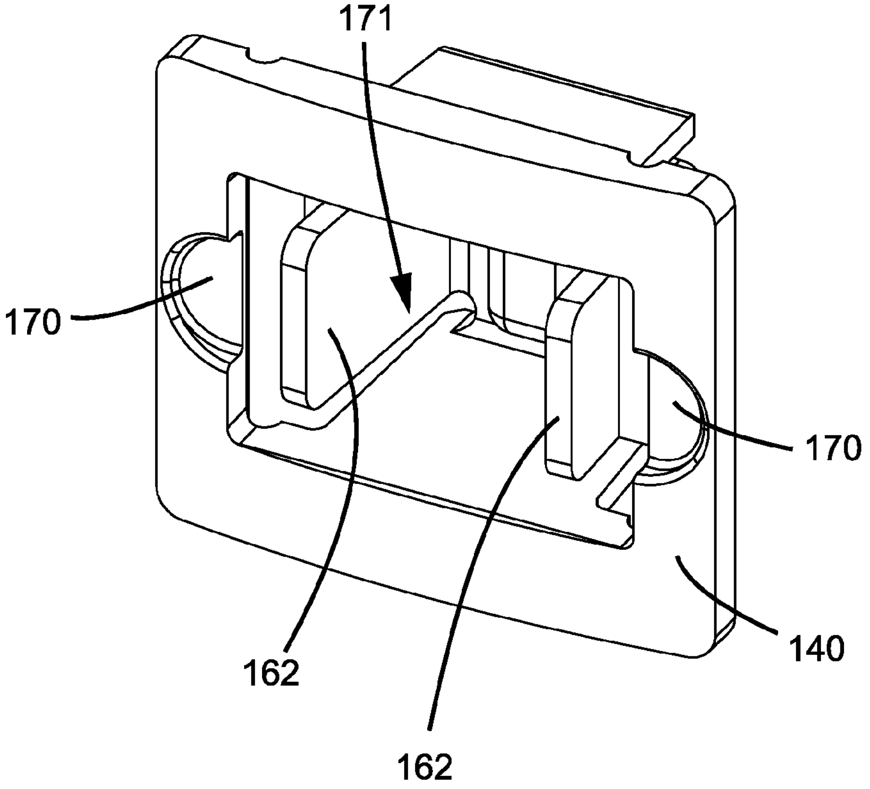
FIG. 11 is a perspective view of one of the spacer members of the framework of the assembly of FIG. 4.
Figure 12:
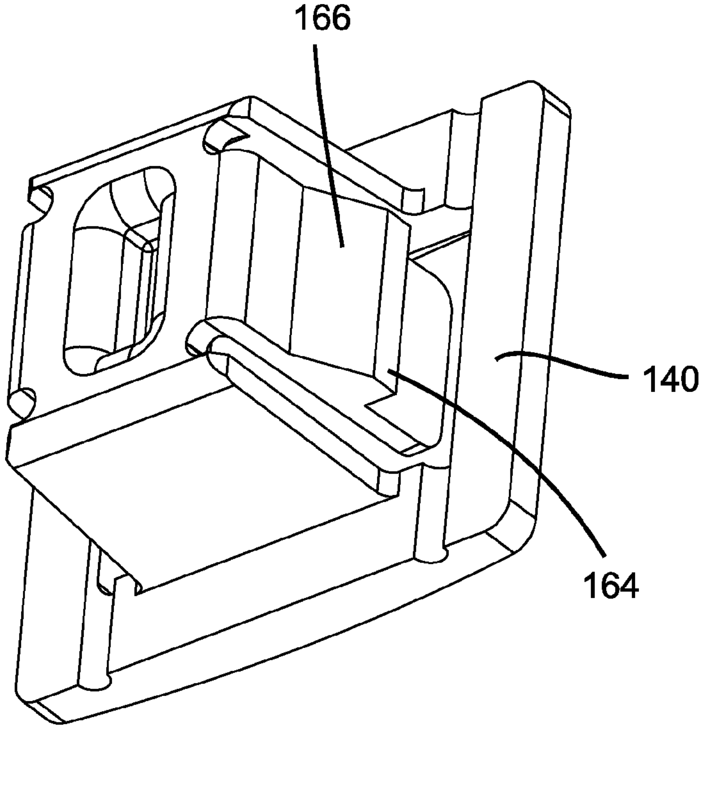
FIG. 12 is a further perspective view of the spacer member of FIG. 11.
Figure 13:
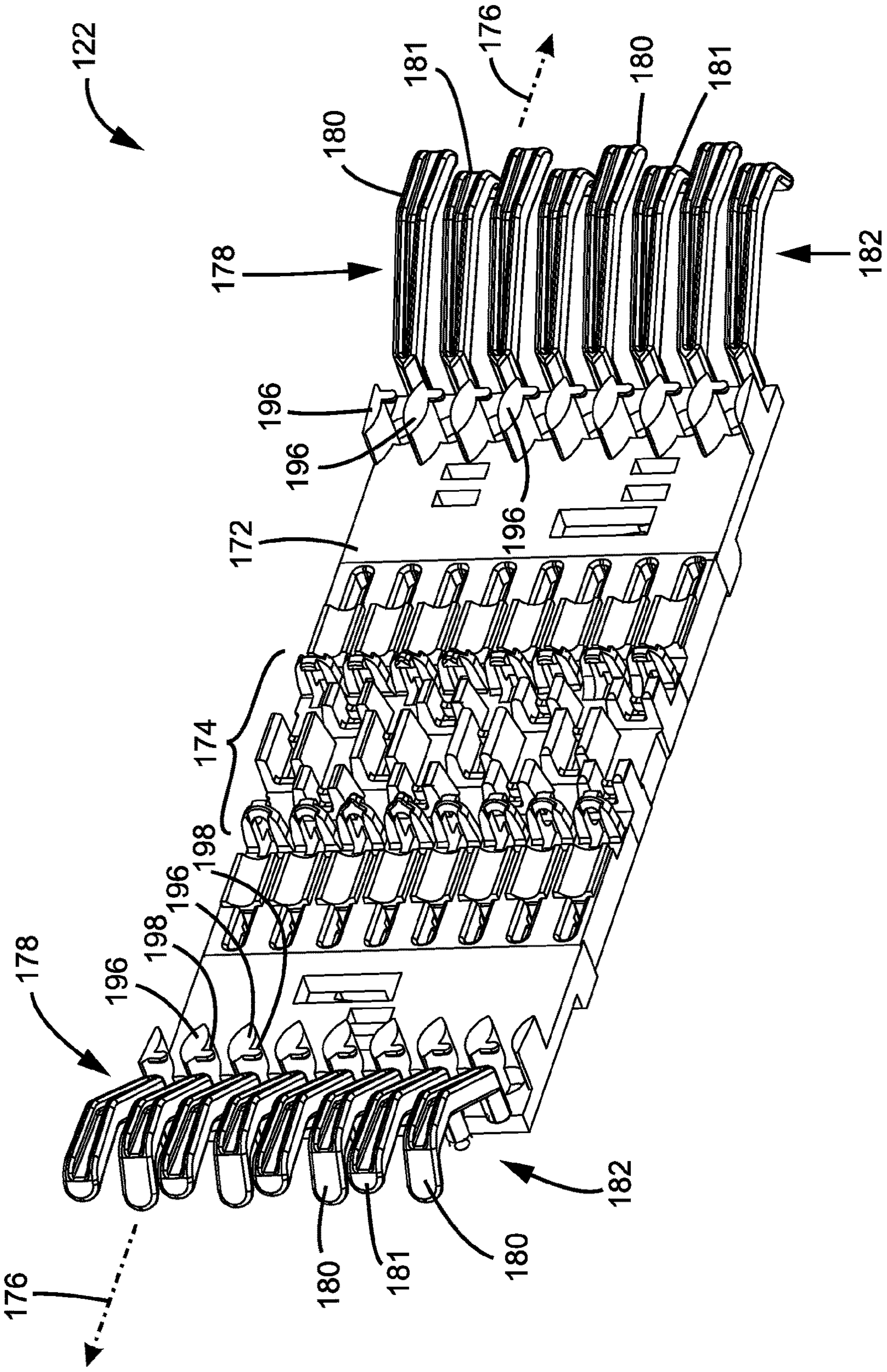
FIG. 13 is a perspective view of one of the tray support modules of the framework of the assembly of FIG. 4.
Figure 14:
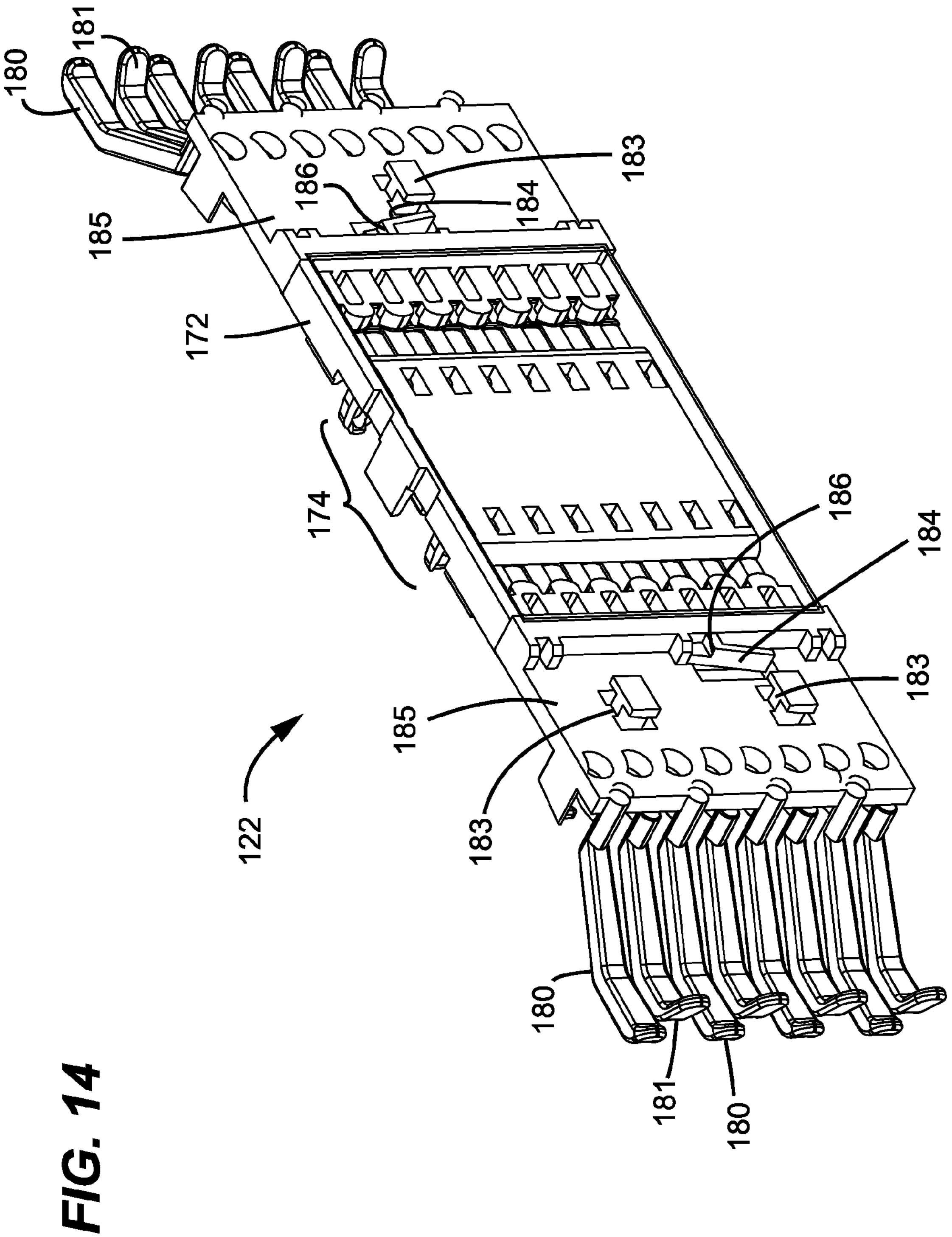
FIG. 14 is a further perspective view of the tray support module of FIG. 13.
Figure 15:
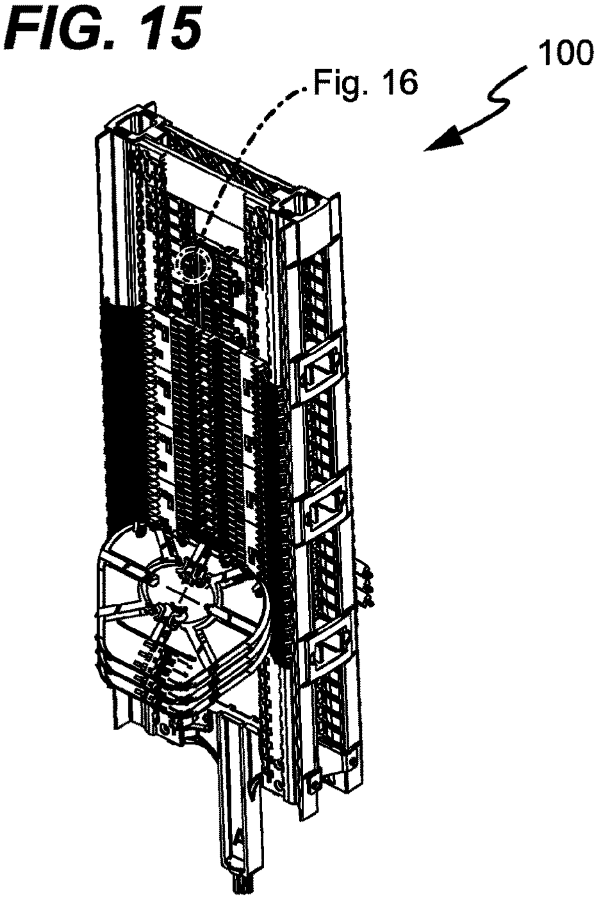
FIG. 15 is a perspective view of the assembly of FIG. 4.
Figure 16:
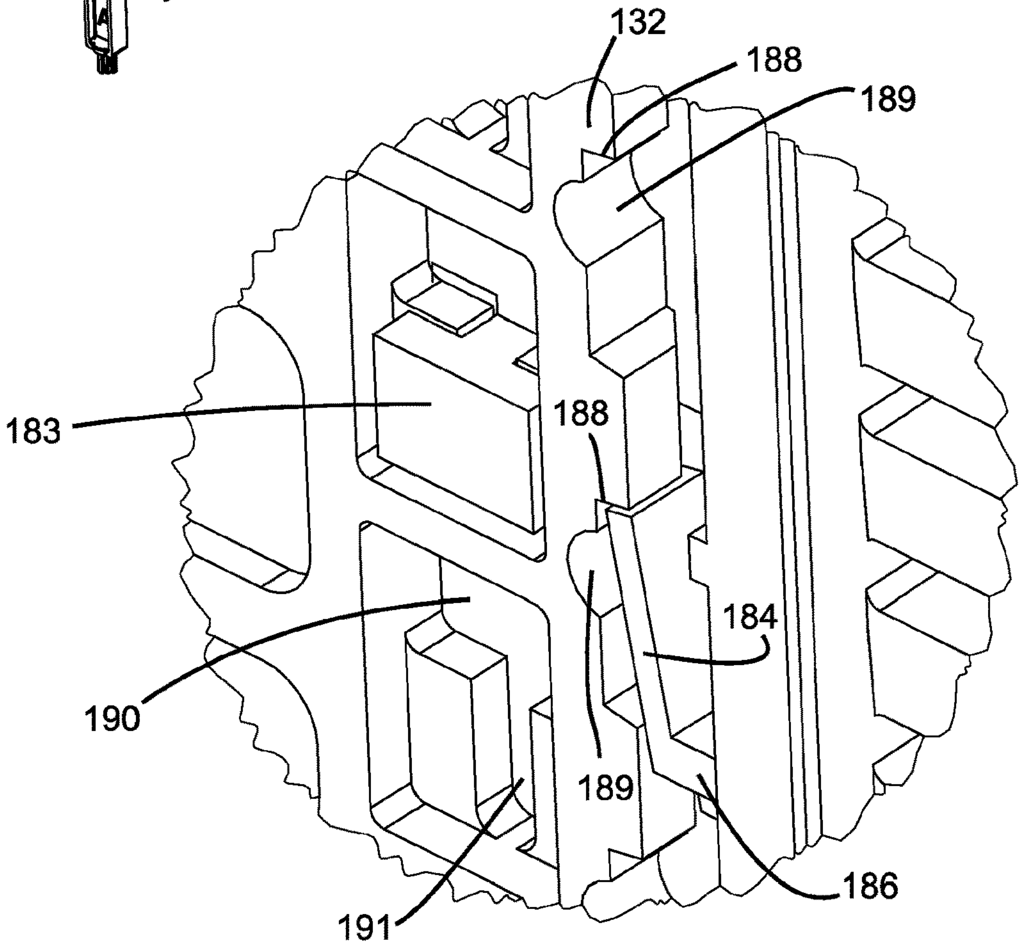
FIG. 16 is an enlarged view of the called-out portion of FIG. 15.
Figure 17:
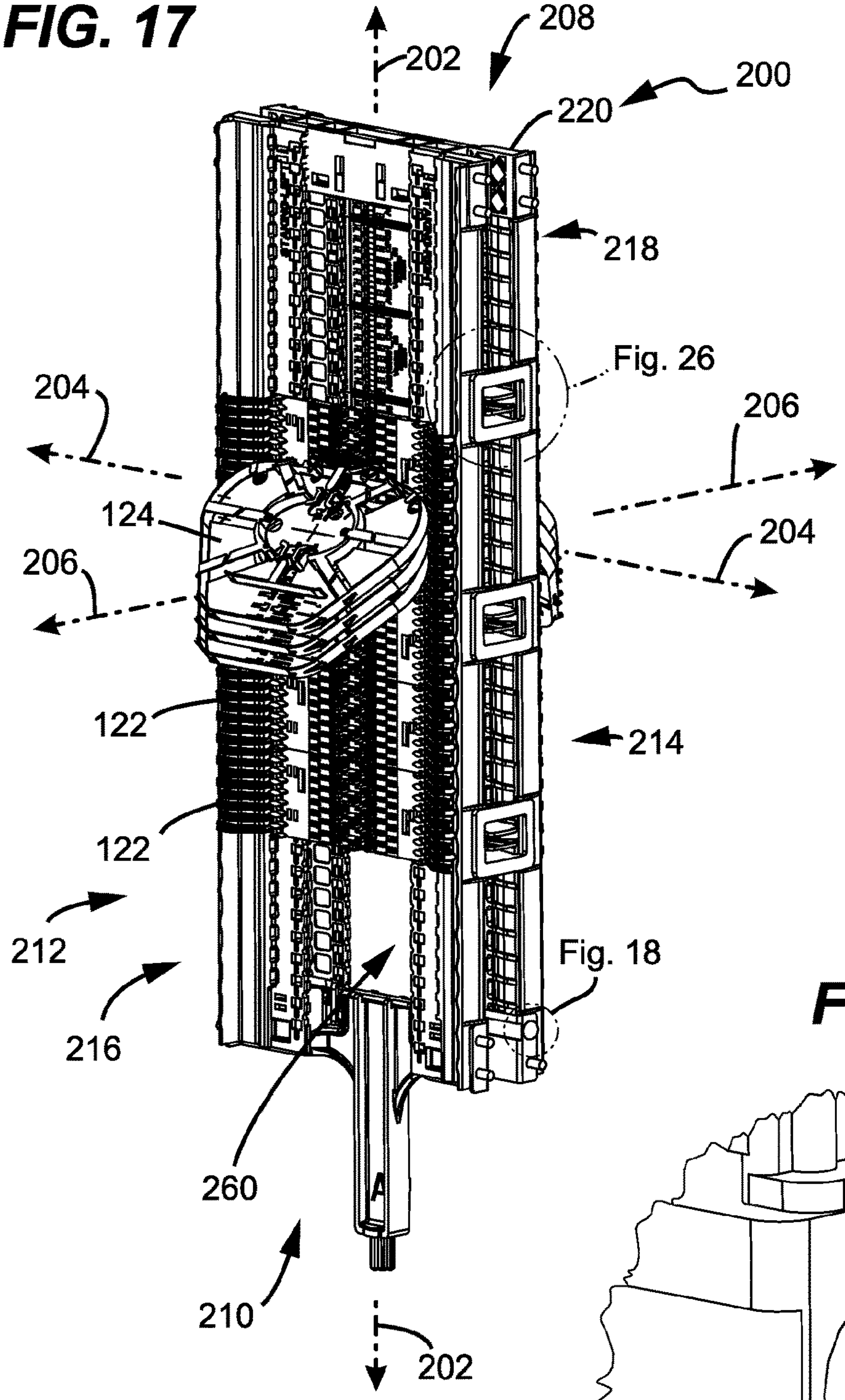
FIG. 17 is a perspective view of a further example fiber management assembly according to the present disclosure.
Figure 18:
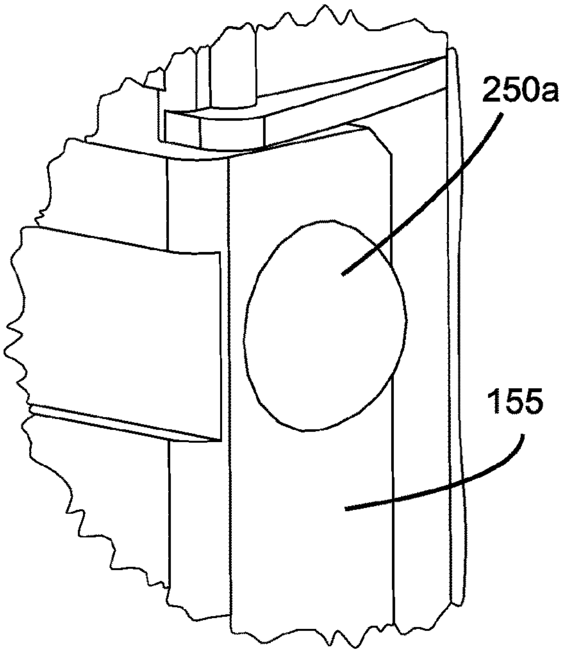
FIG. 18 is an enlarged view of a called-out portion of FIG. 17.
Figure 19:
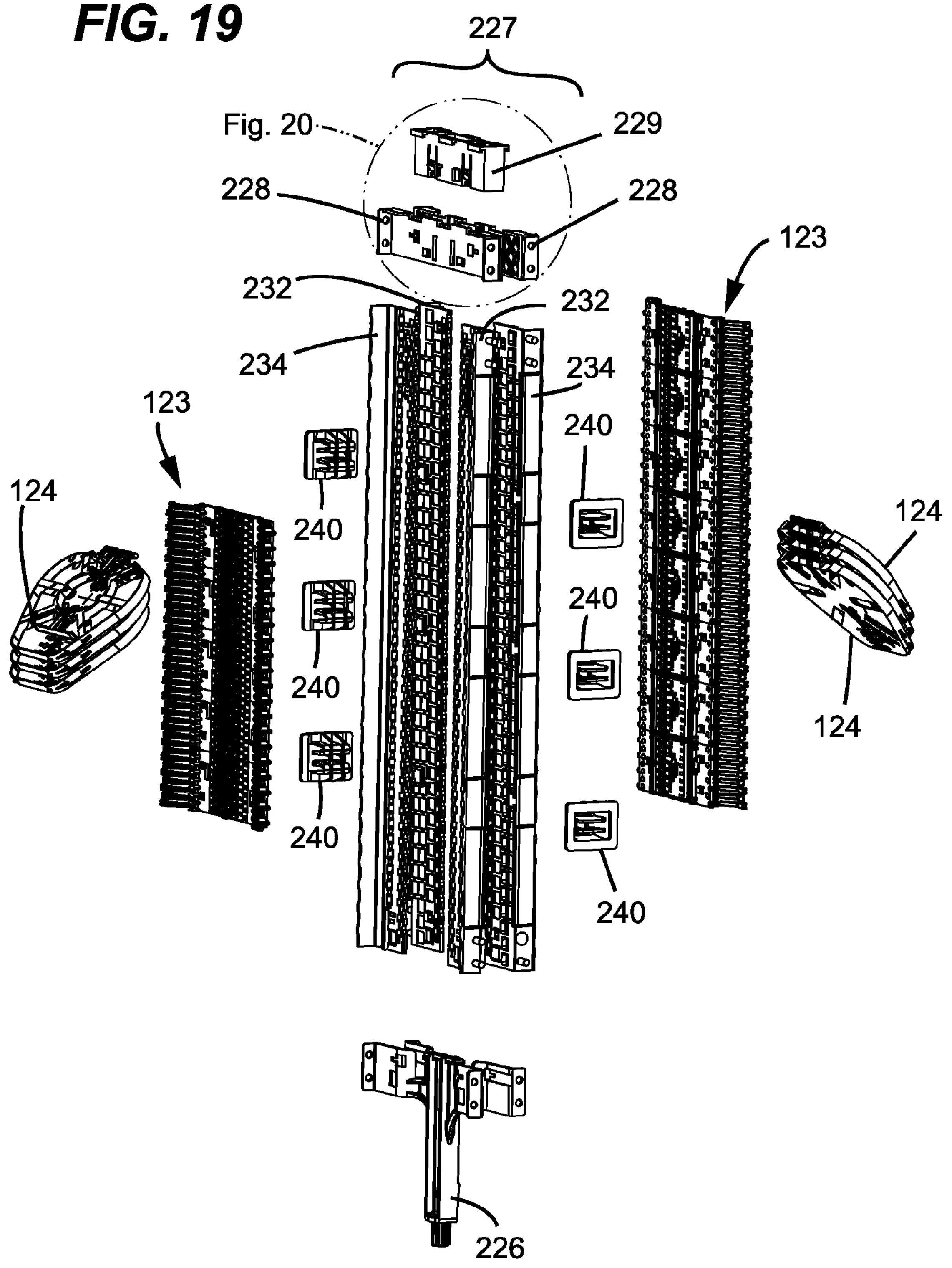
FIG. 19 is a partially exploded view of the assembly of FIG. 17.
Figure 20:
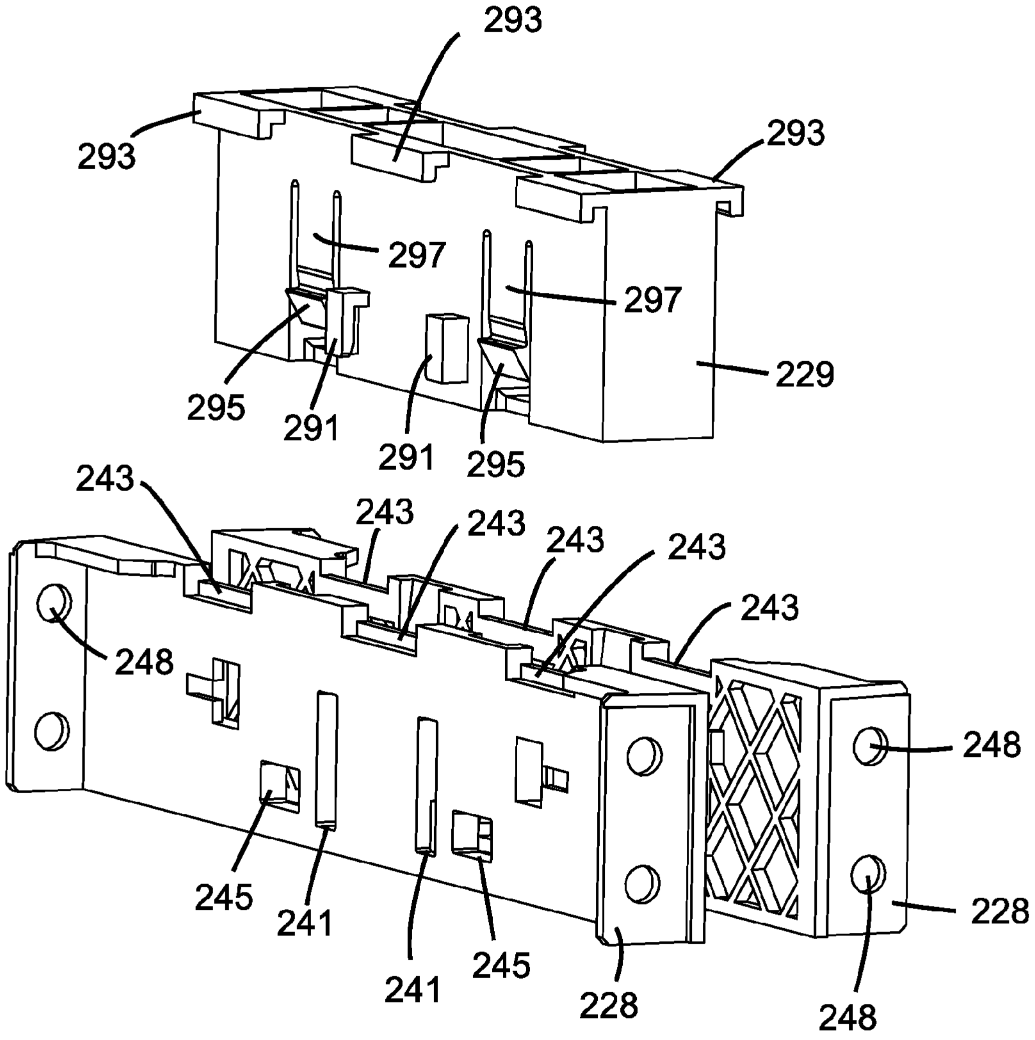
FIG. 20 is a perspective view of the called-out portion of FIG. 19.
Figure 21:
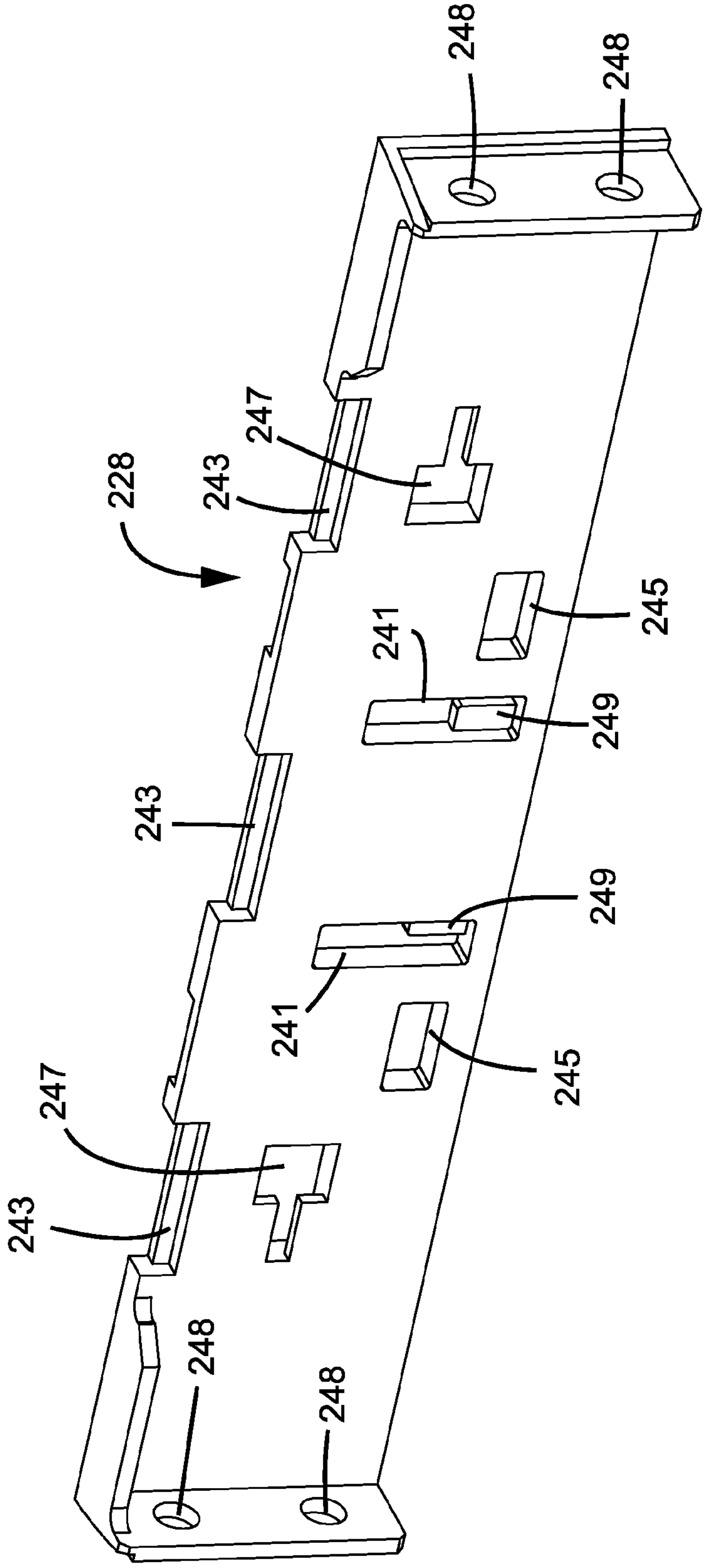
FIG. 21 is a perspective view of one of the frame members of FIG. 20.
Figure 22:
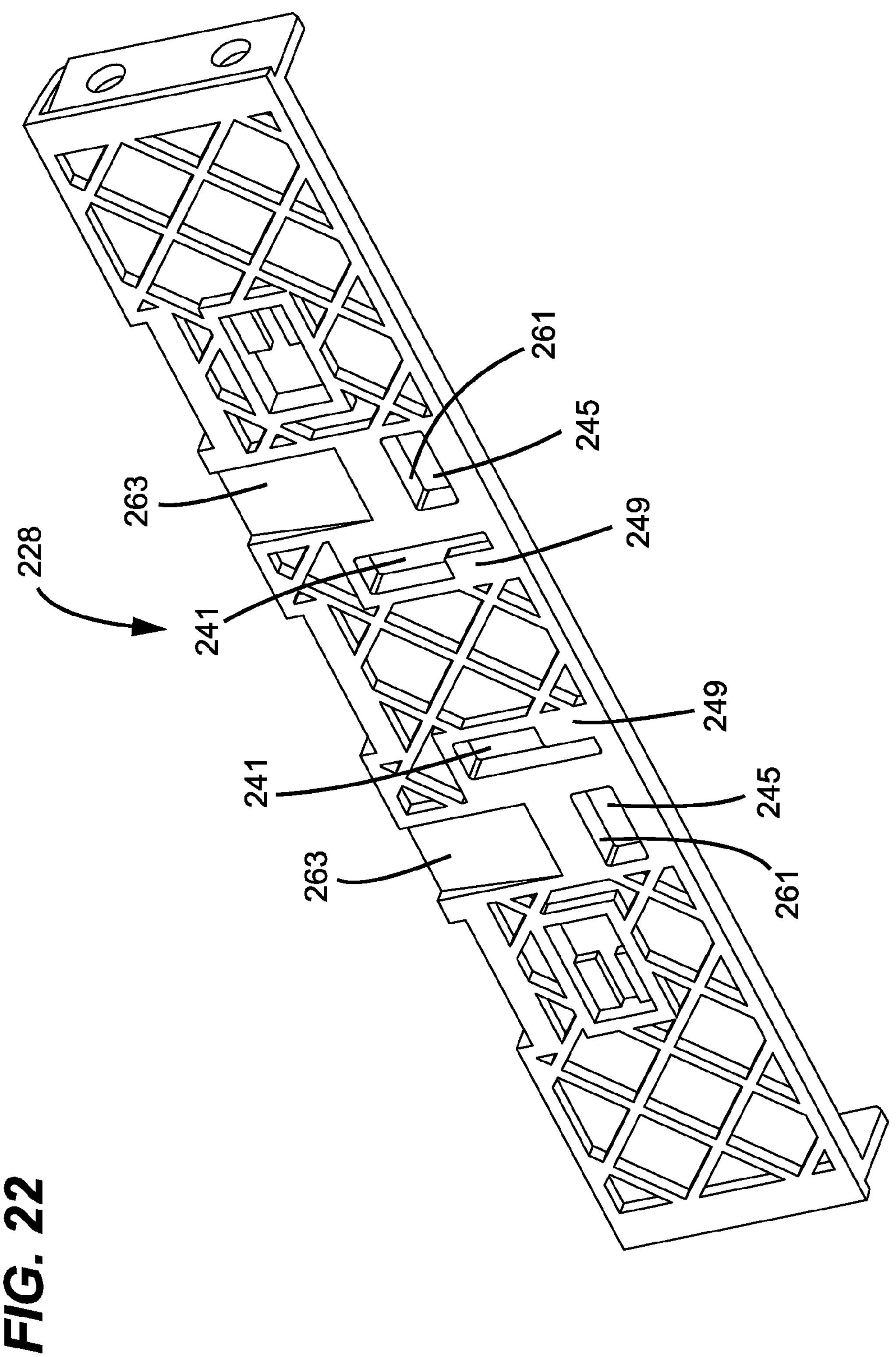
FIG. 22 is a further perspective view of the frame member of FIG. 21.
Figure 23:
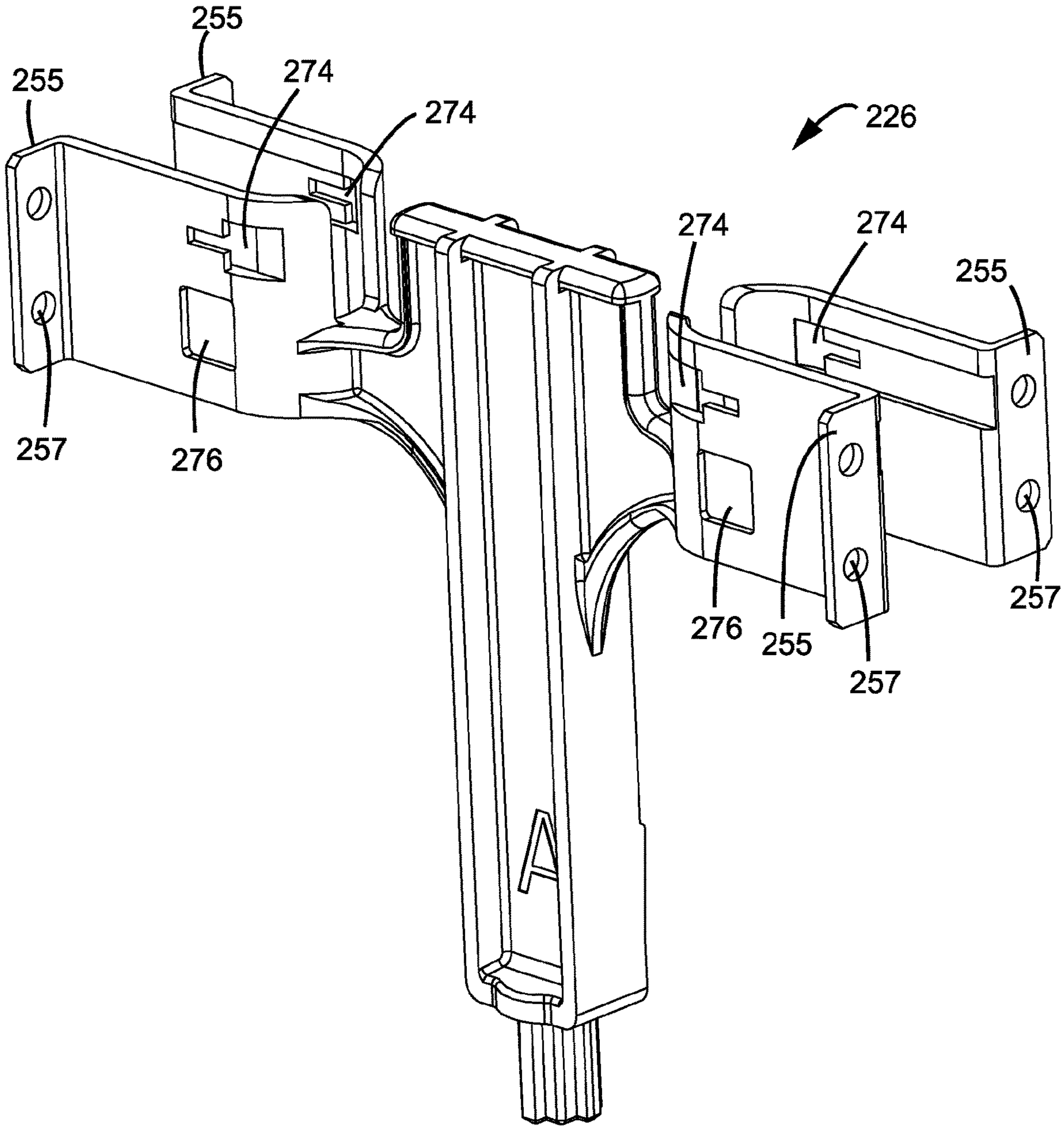
FIG. 23 is a perspective view of a further frame member of the framework of the assembly of FIG. 17.
Figure 24:
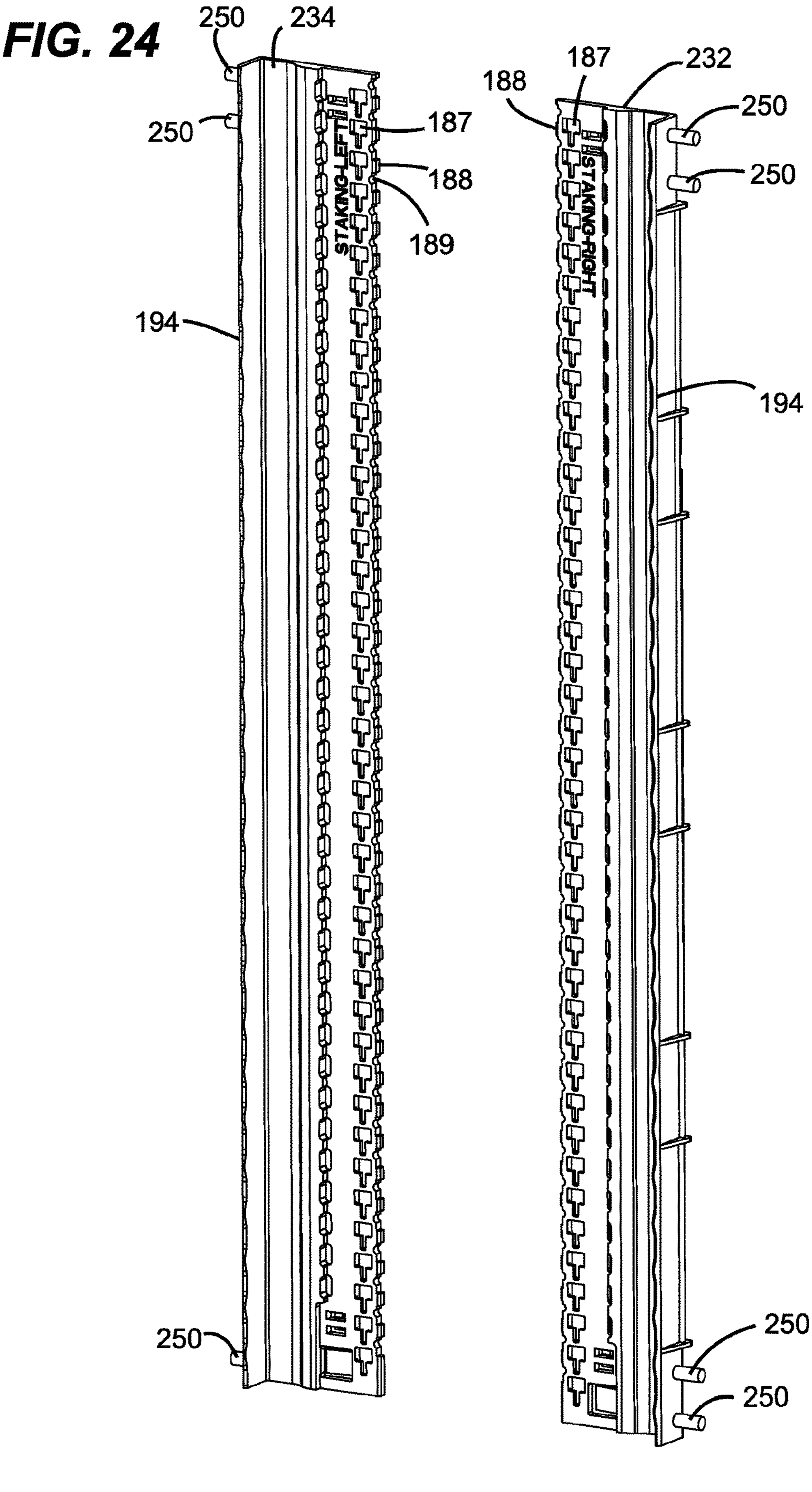
FIG. 24 is a perspective view of two others of the frame members of the assembly of FIG. 17.
Figure 25:
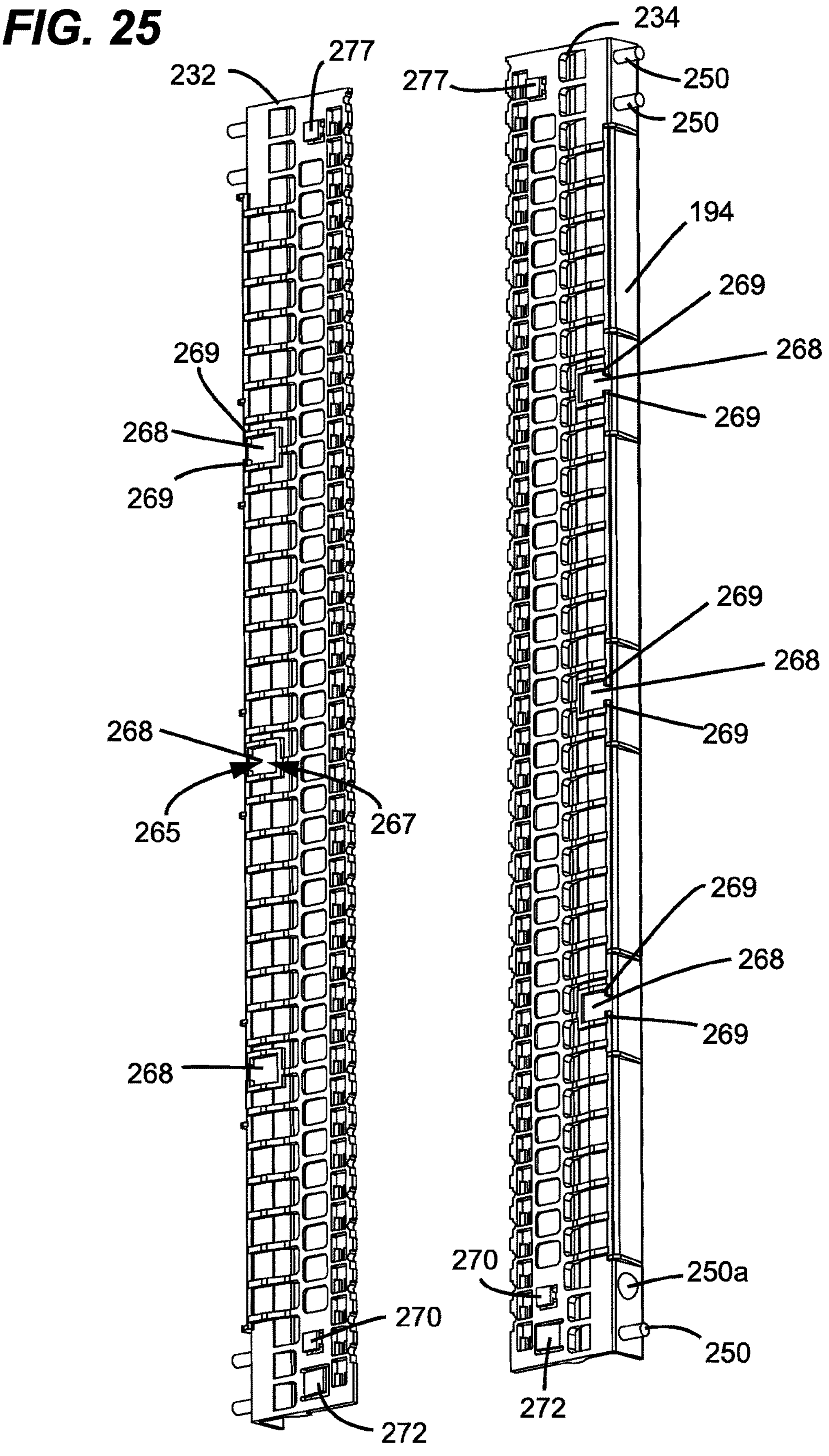
FIG. 25 is a further perspective view of the frame members of FIG. 24.
Figure 26:
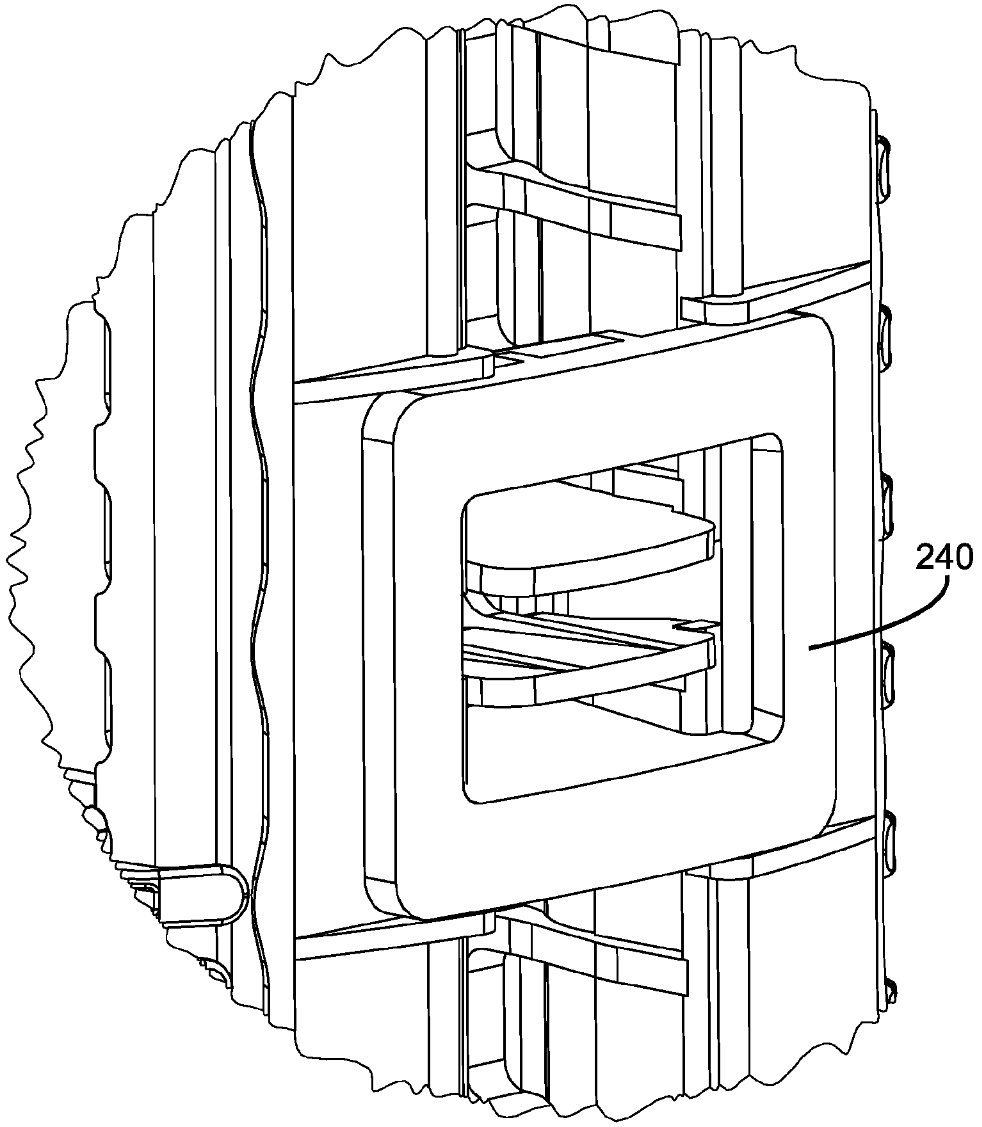
FIG. 26 is an enlarged view of a called-out portion of FIG. 17.
Figure 27:
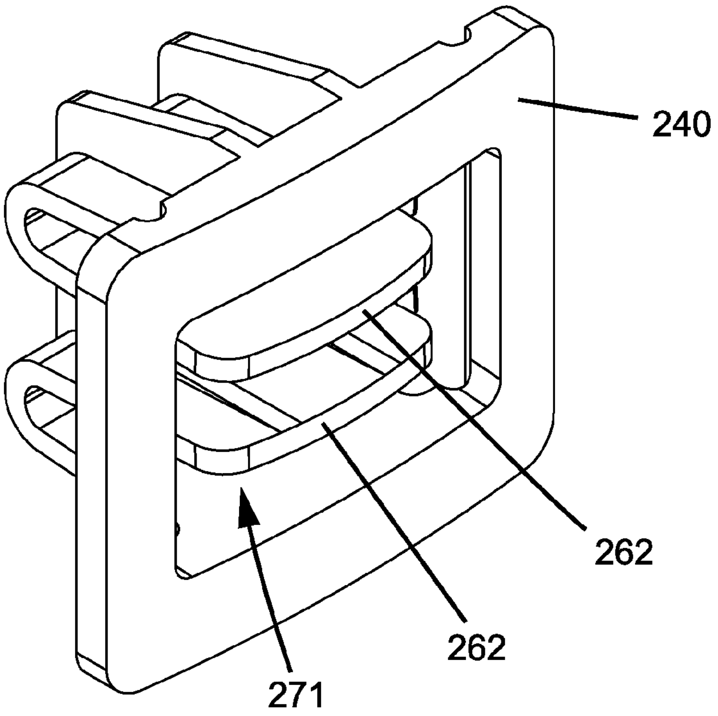
FIG. 27 is a perspective view of one of the spacer members of the framework of the assembly of FIG. 17.
Figure 28:
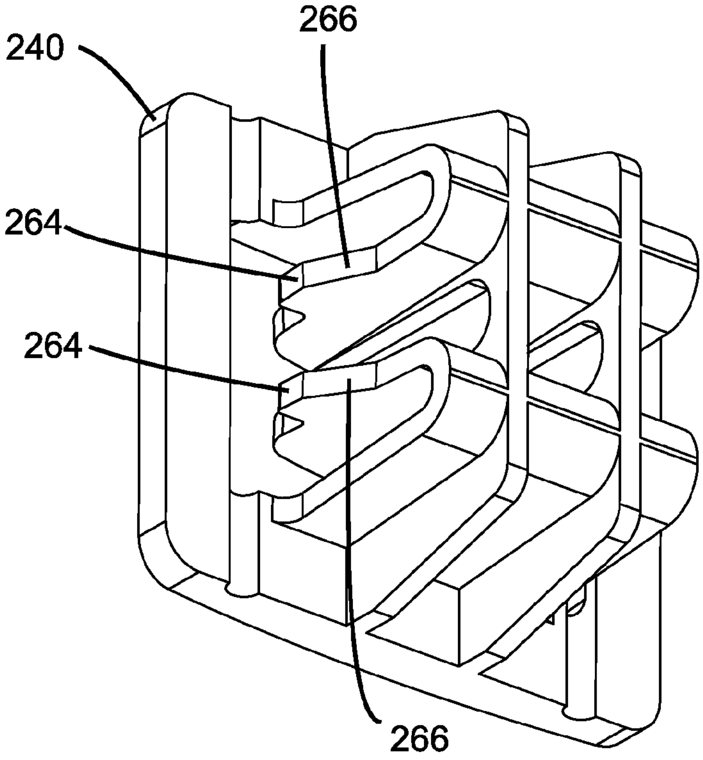
FIG. 28 is a further perspective view of the spacer member of FIG. 27.
Figure 29:
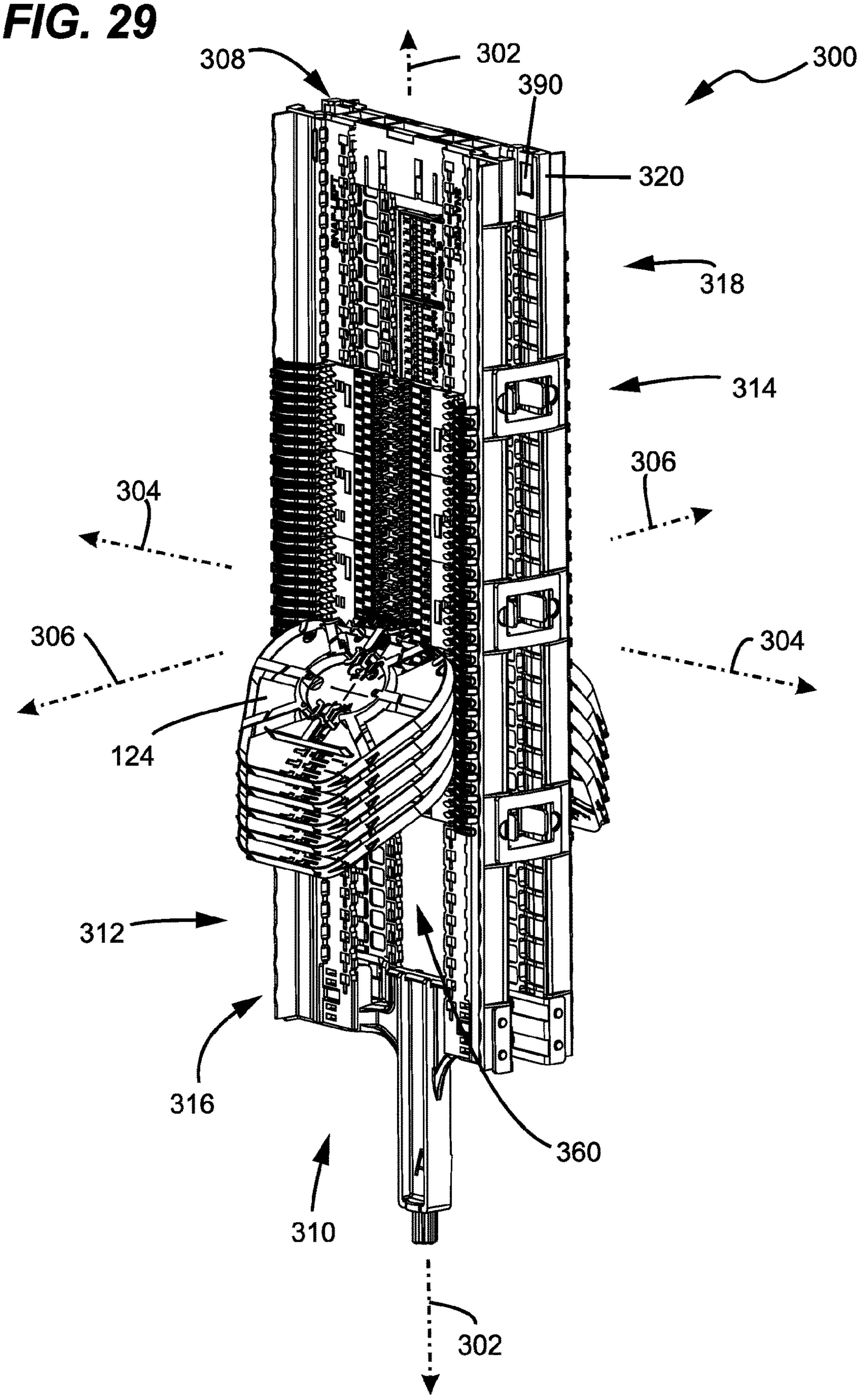
FIG. 29 is a perspective view of a further example fiber management assembly according to the present disclosure.
Figure 30:
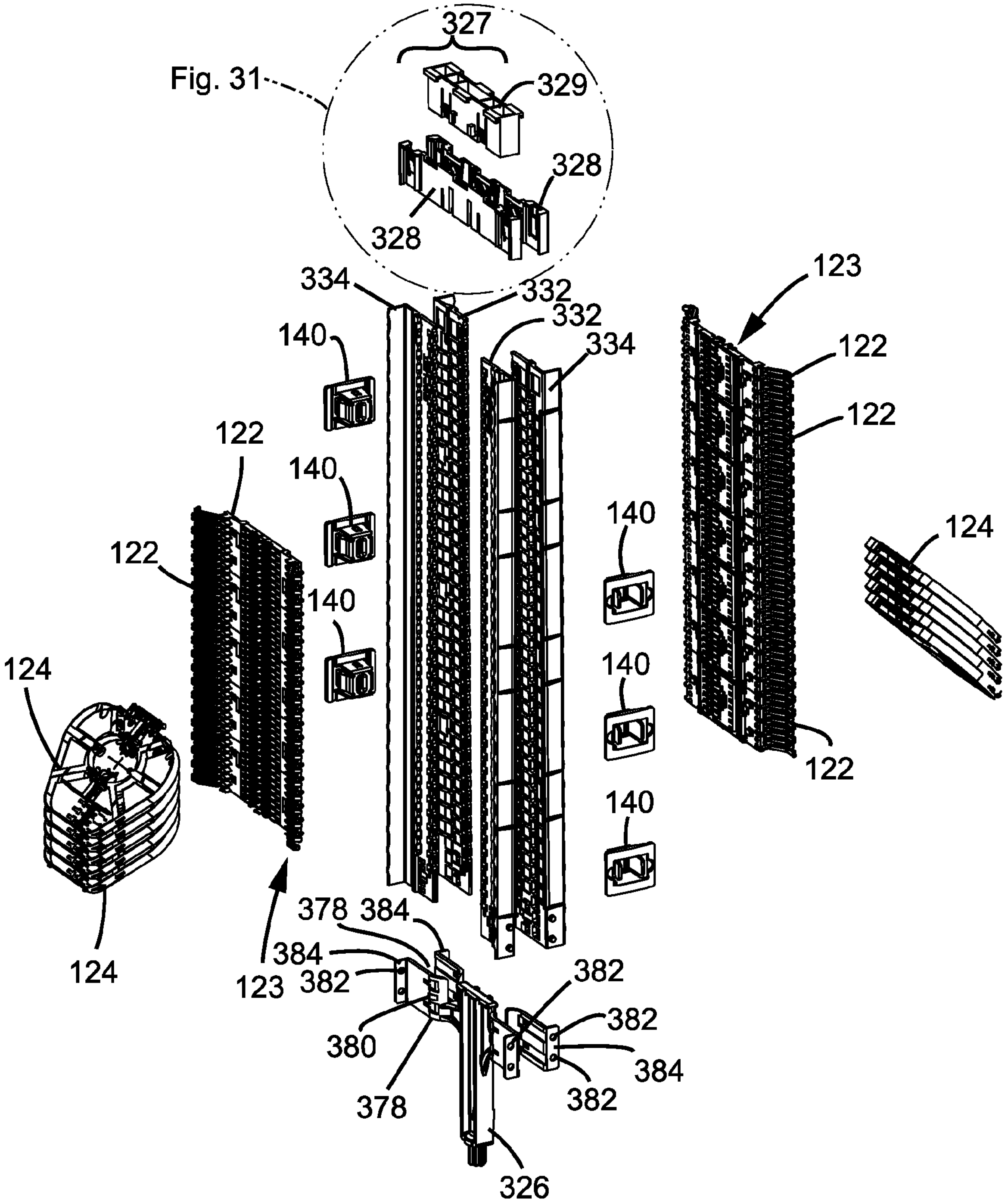
FIG. 30 is a partially exploded view of the assembly of FIG. 29.
Figure 31:
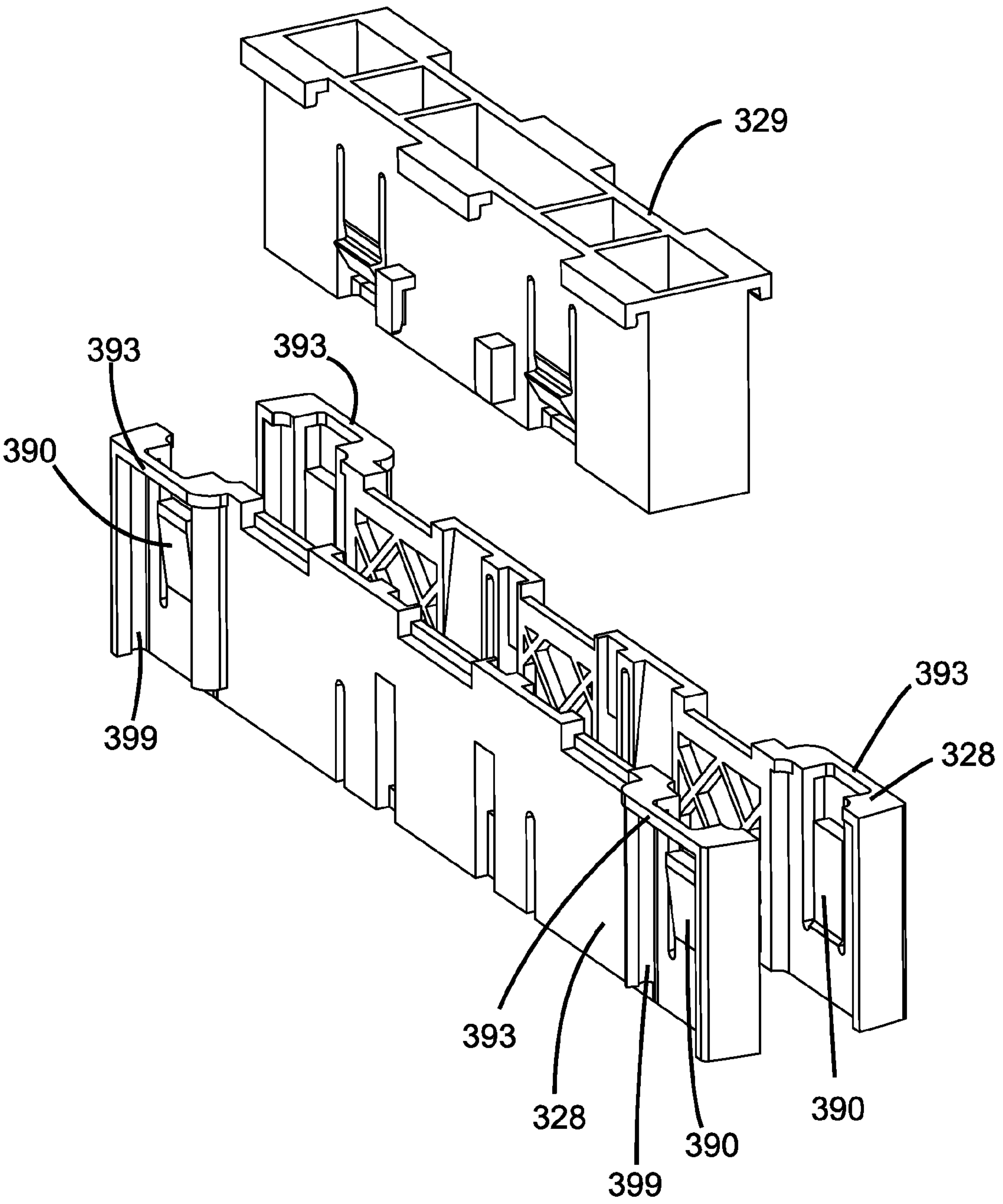
FIG. 31 is an enlarged view of the components of the framework of the assembly of FIG. 29 shown in the called-out portion of FIG. 30.
Figure 32:
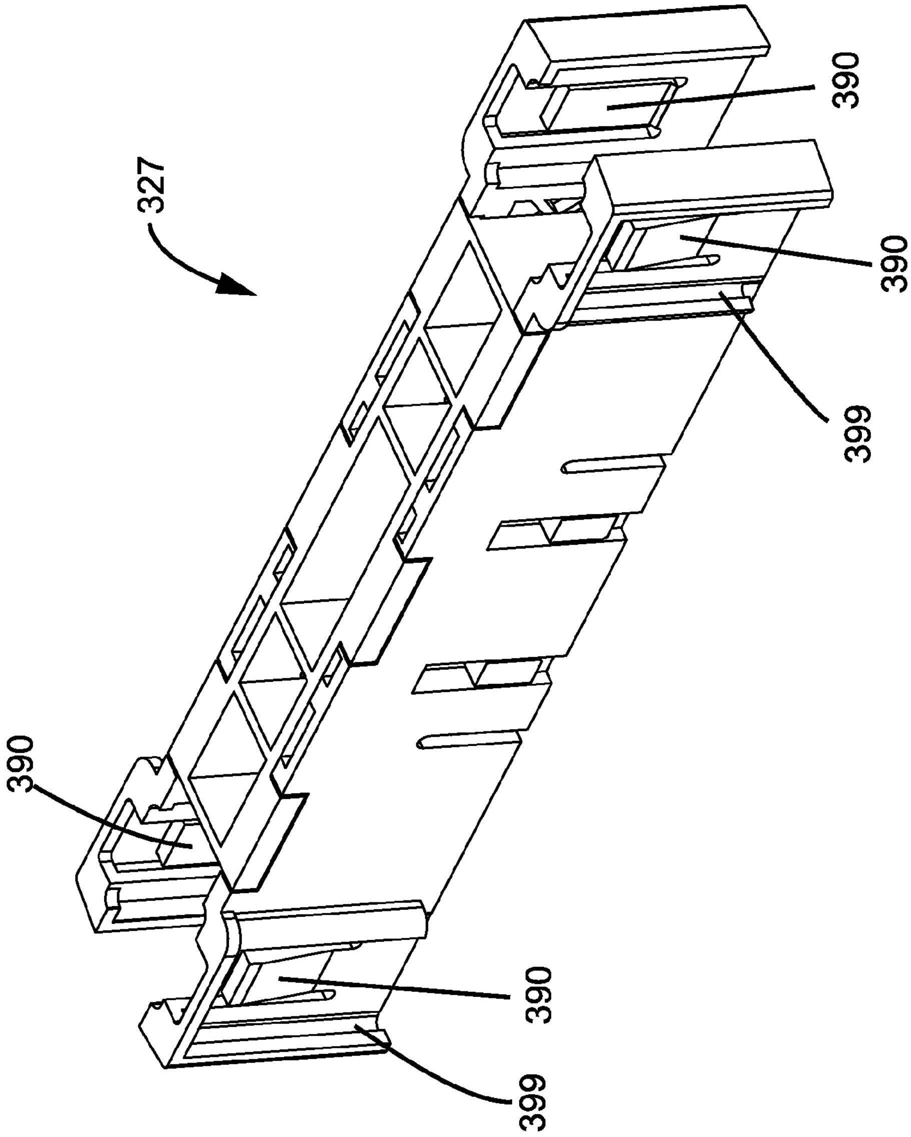
FIG. 32 is a perspective view of the components of FIG. 31 in an assembled configuration.
Figure 33:
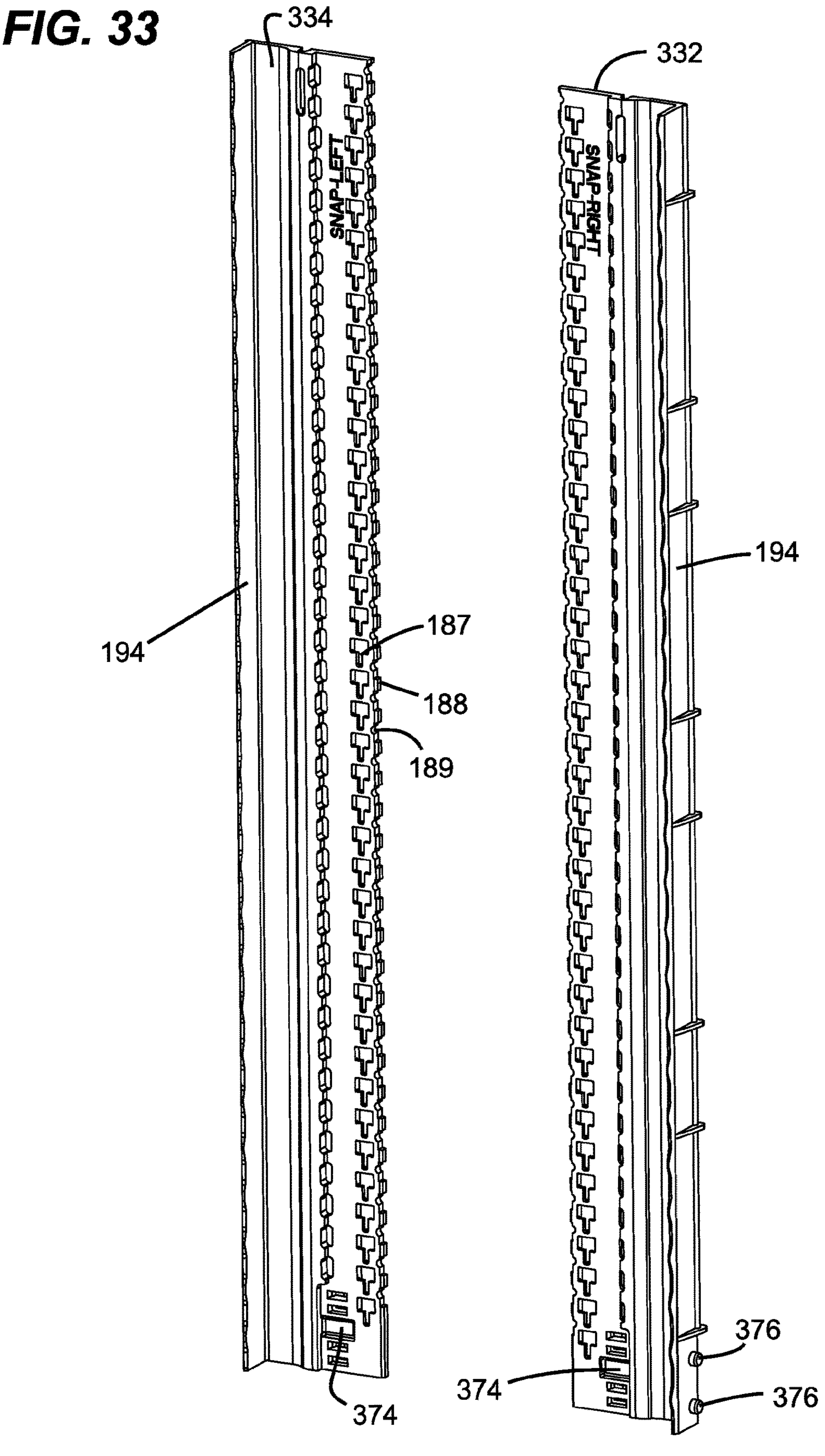
FIG. 33 is a perspective view of two others of the frame members of the assembly of FIG. 29.
Figure 34:
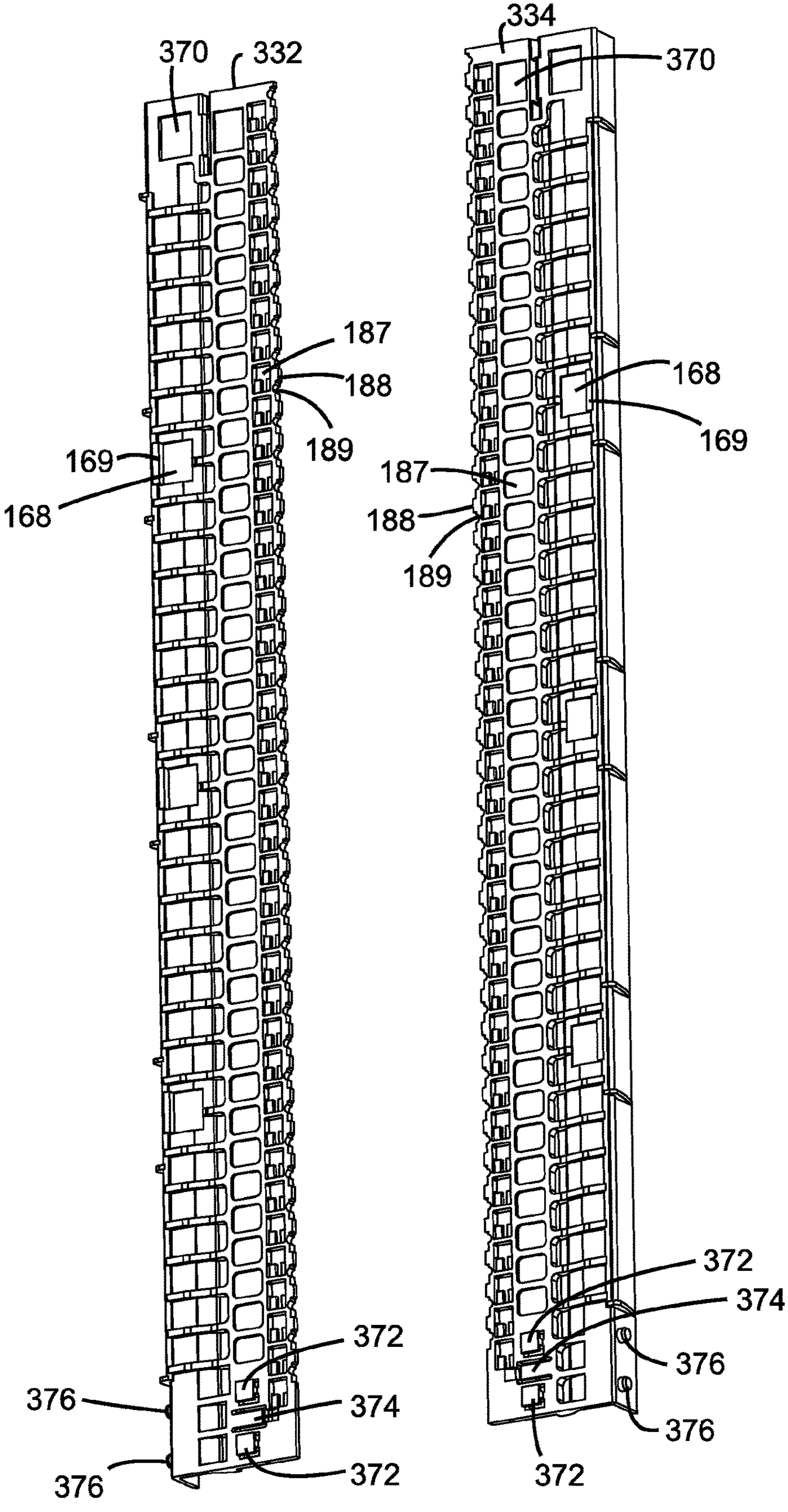
FIG. 34 is a further perspective view of the frame members of FIG. 33.
Figure 35:
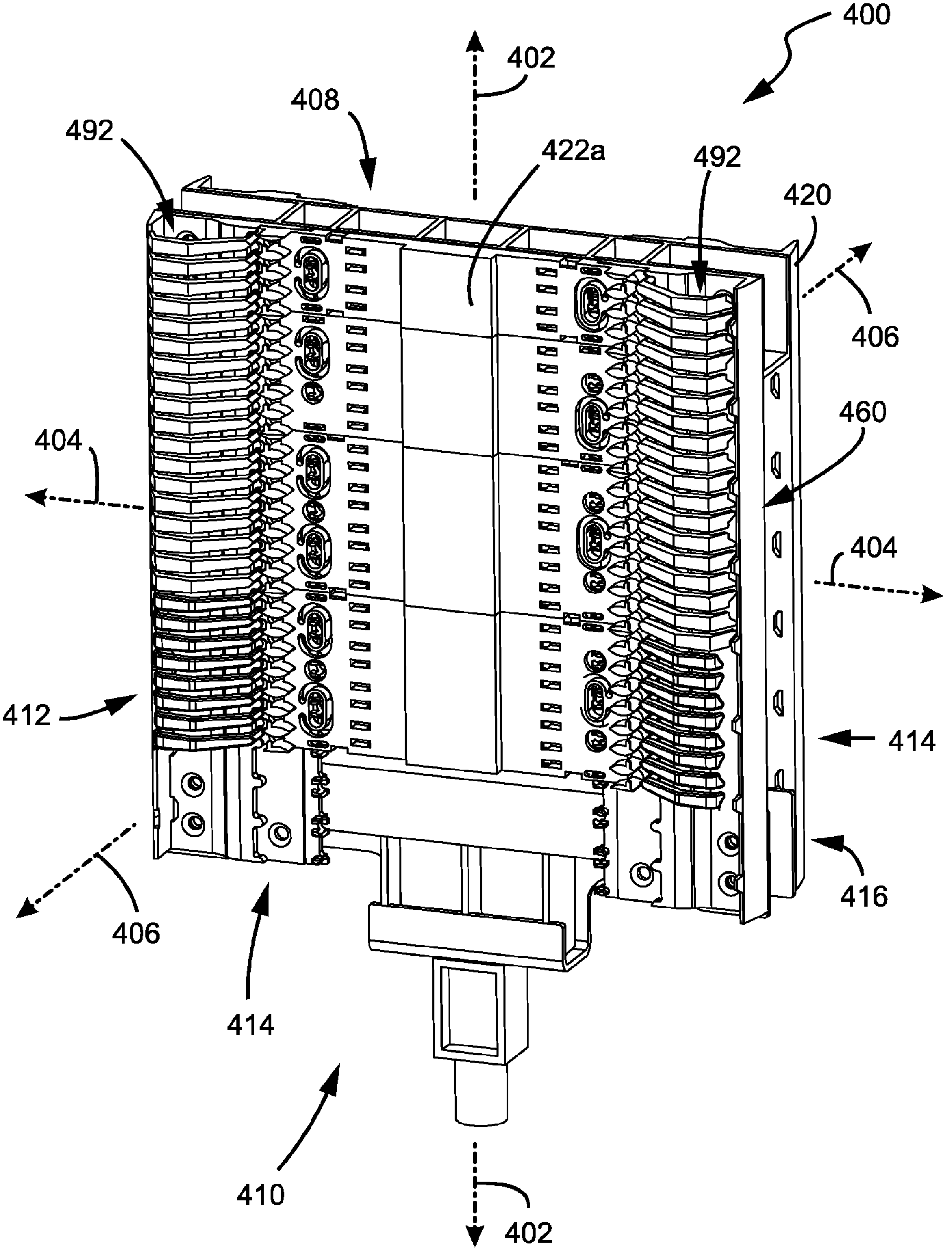
FIG. 35 is a perspective view of a further example fiber management assembly according to the present disclosure.
Figure 36:
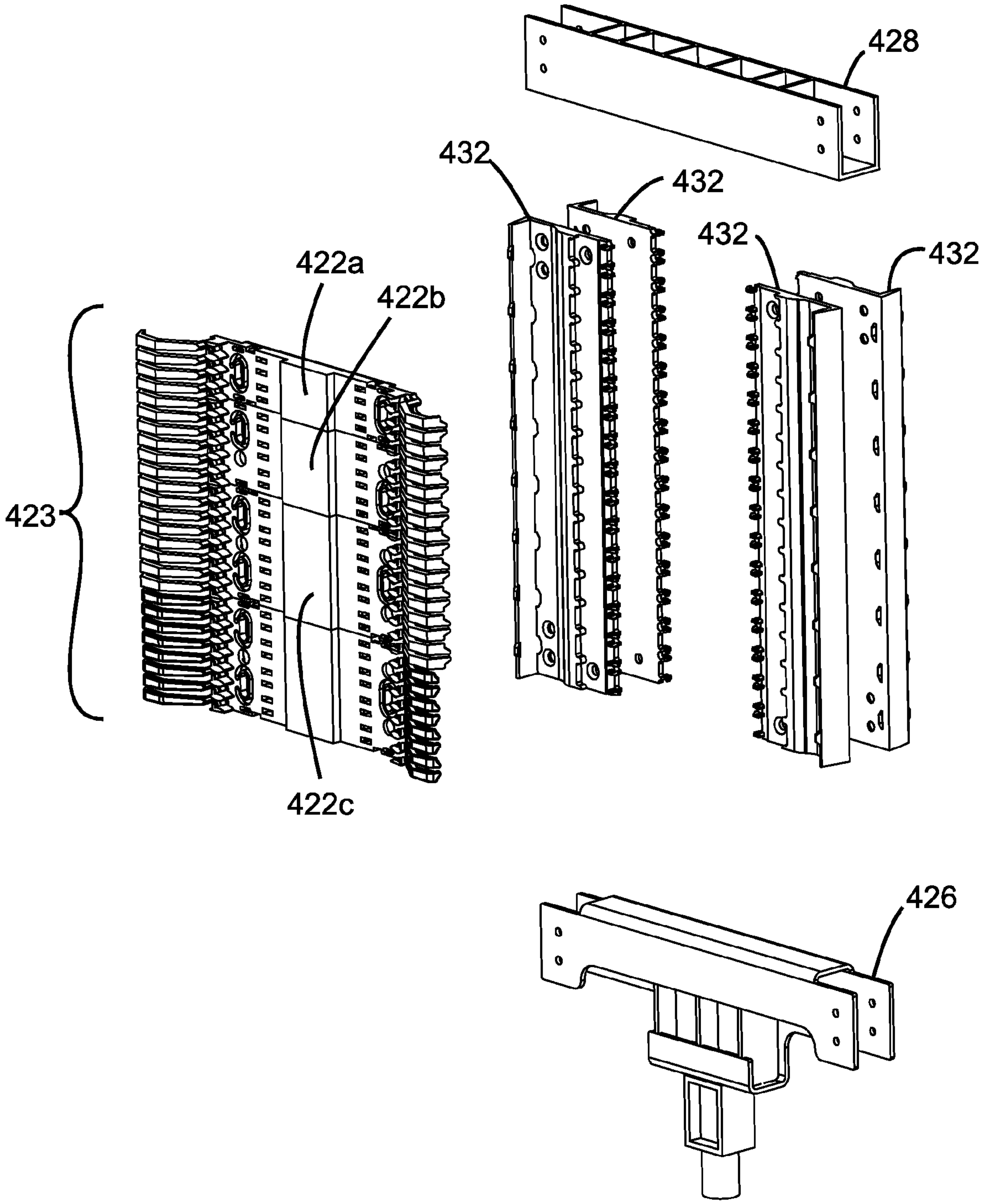
FIG. 36 is a partially exploded view of the assembly of FIG. 35.
Figure 37:
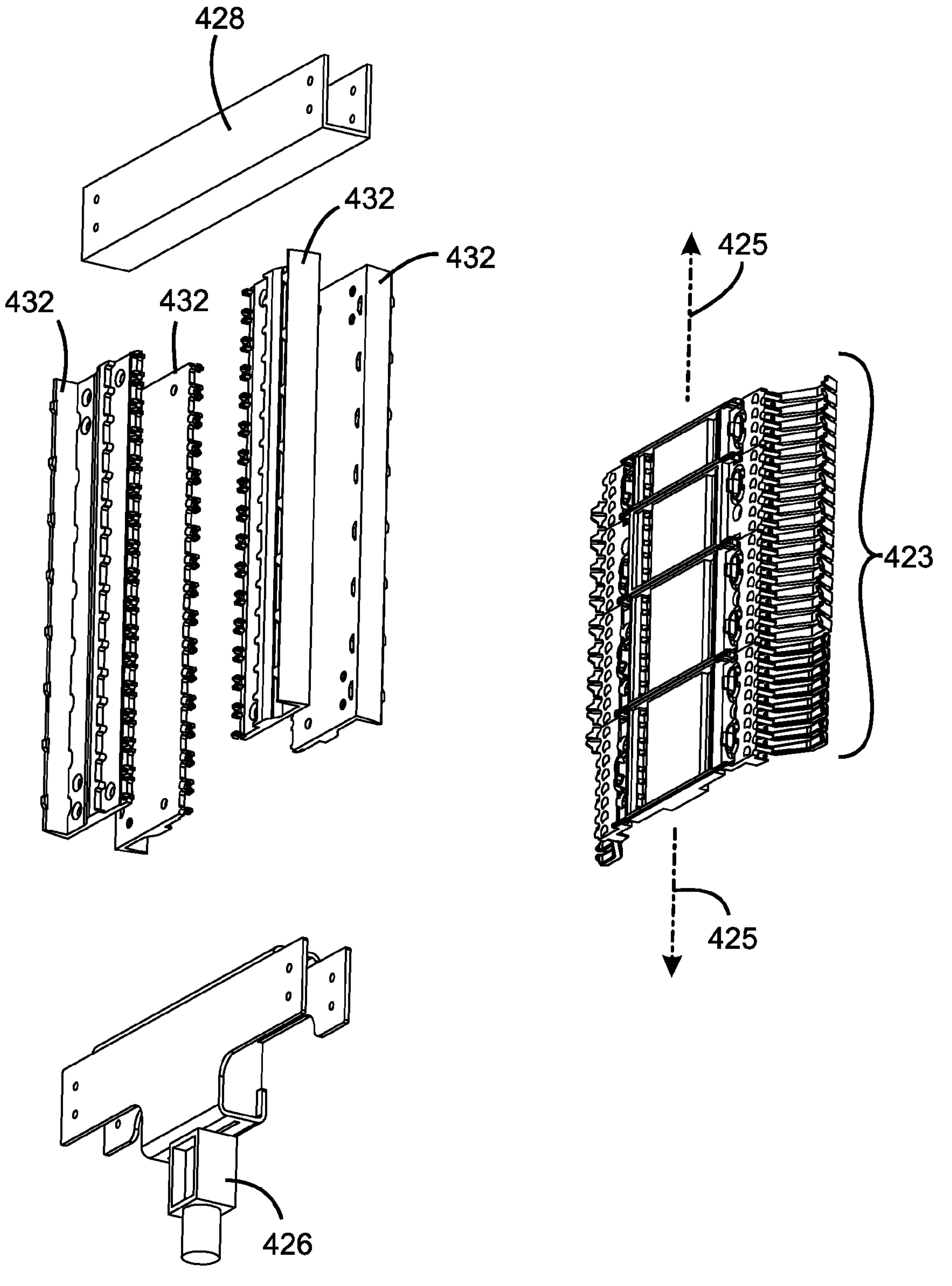
FIG. 37 is a further partially exploded view of the assembly of FIG. 35.
Figure 38:
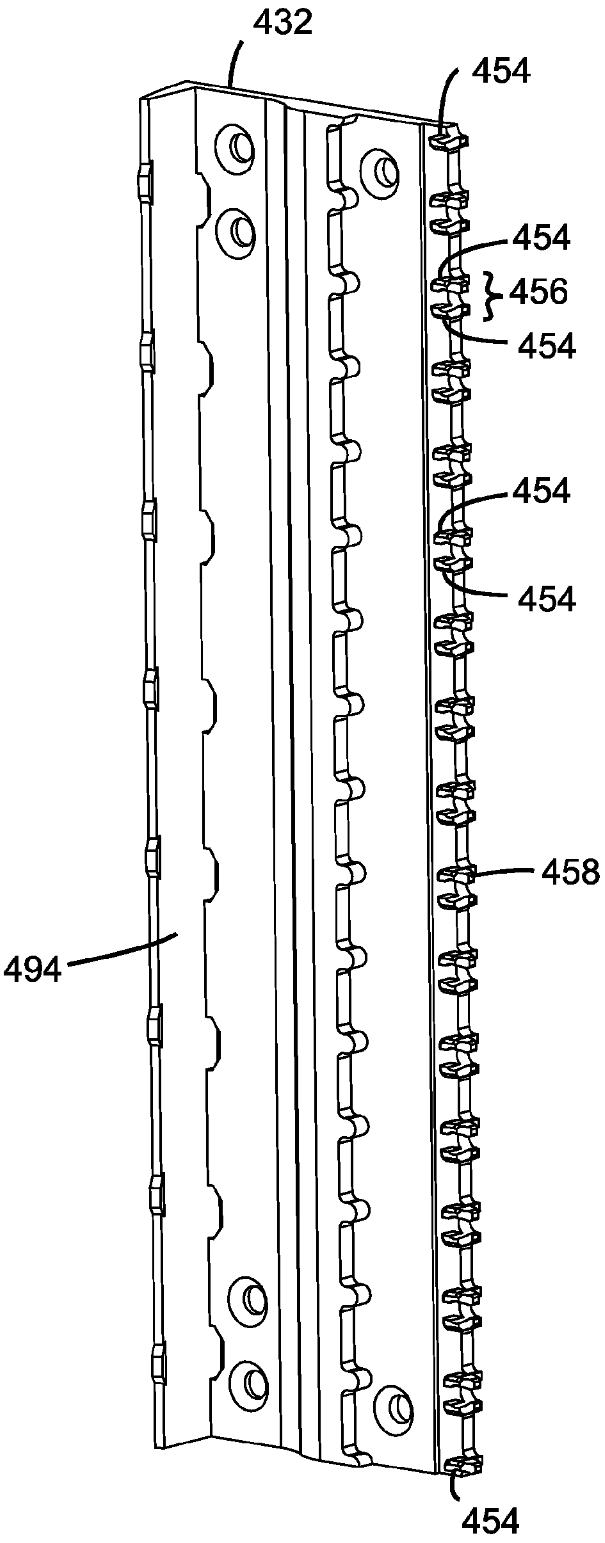
FIG. 38 is a perspective view of one of the frame members of the framework of the assembly of FIG. 35.
Figure 39:
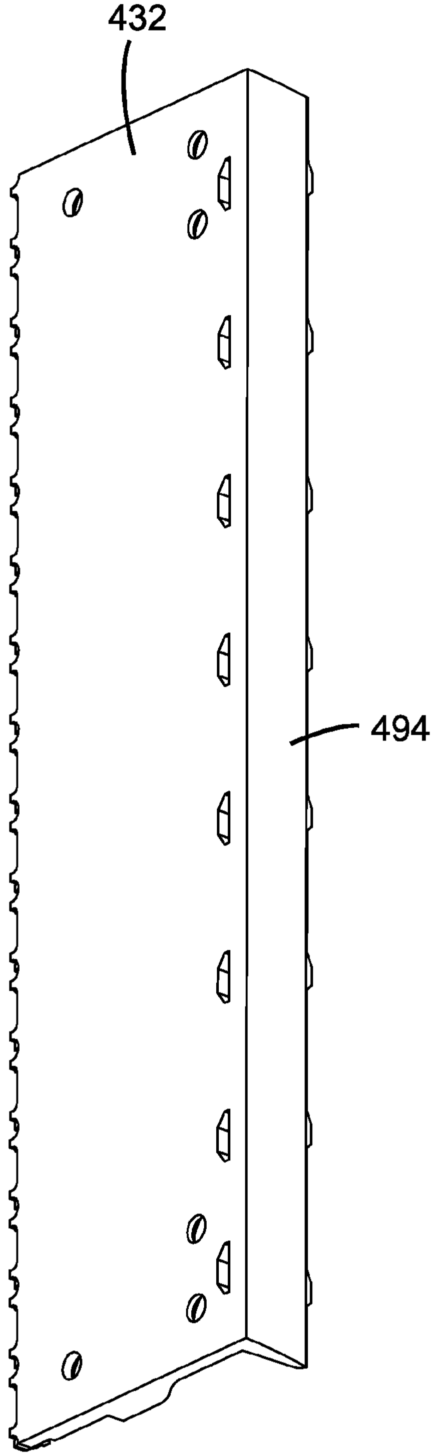
FIG. 39 is a further perspective view of the frame member of FIG. 38.
Figure 40:
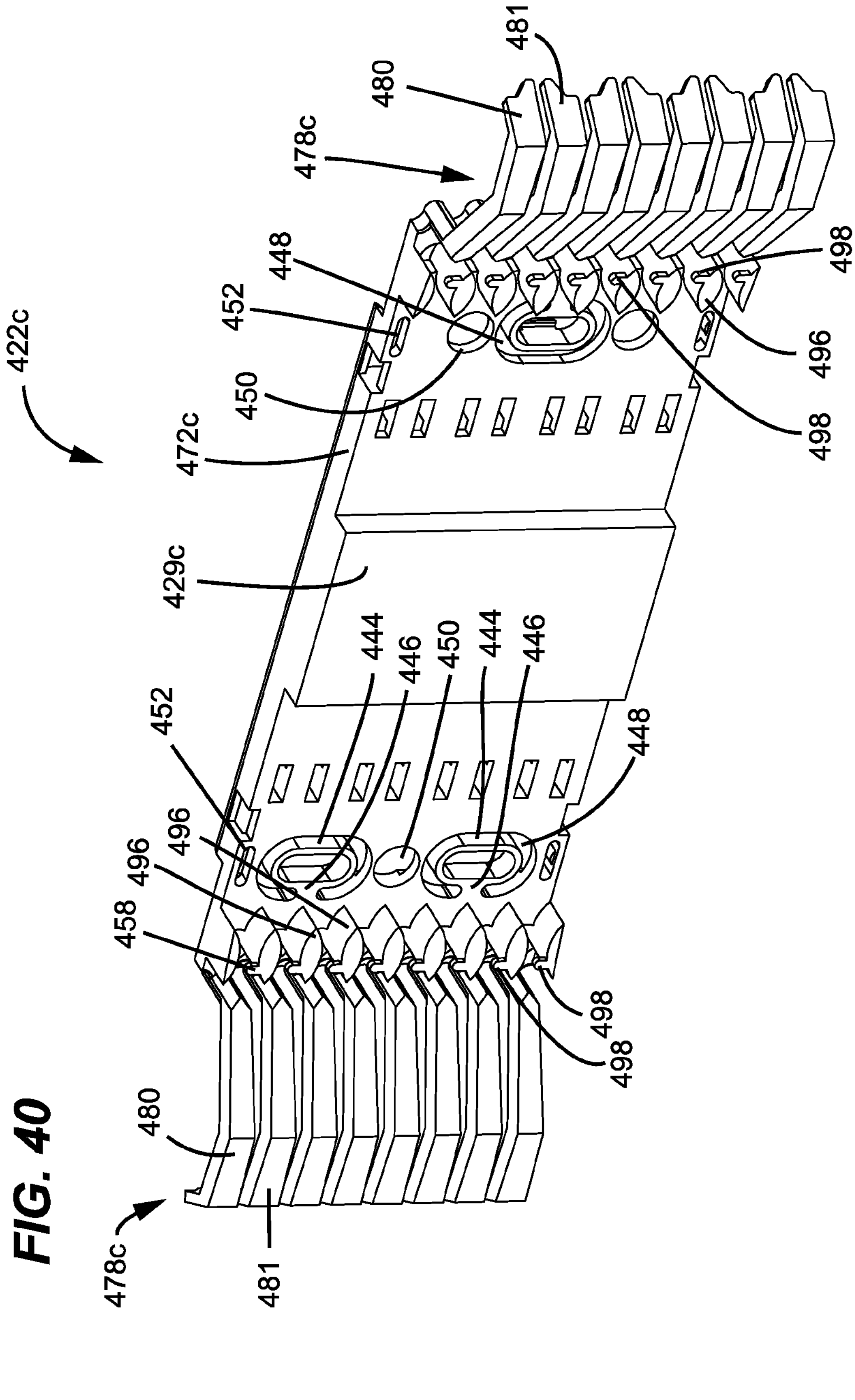
FIG. 40 is a perspective view of one of the tray support modules of the assembly of FIG. 35.
Figure 41:
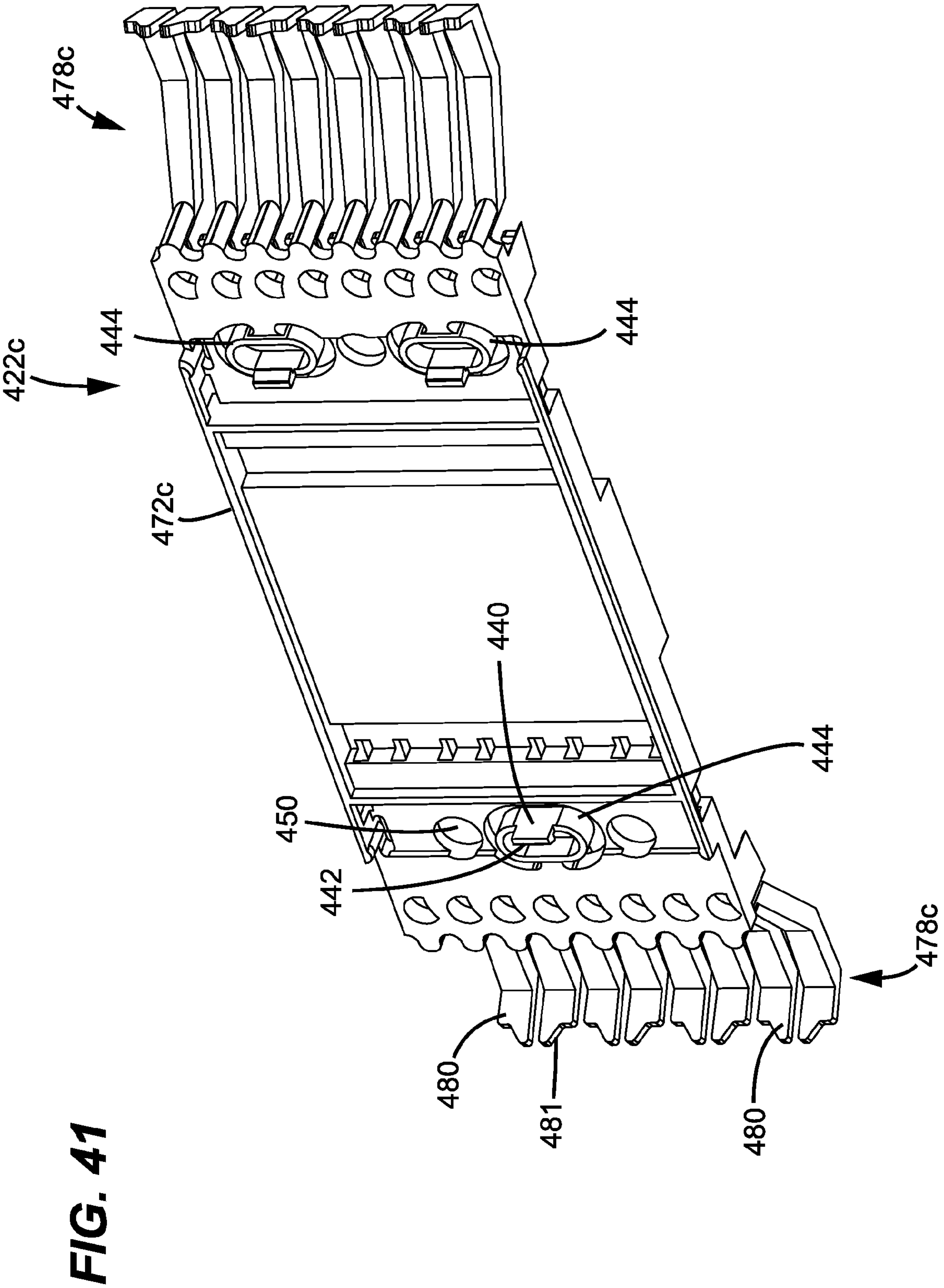
FIG. 41 is a further perspective view of the tray support module of FIG. 40.
Figure 42:
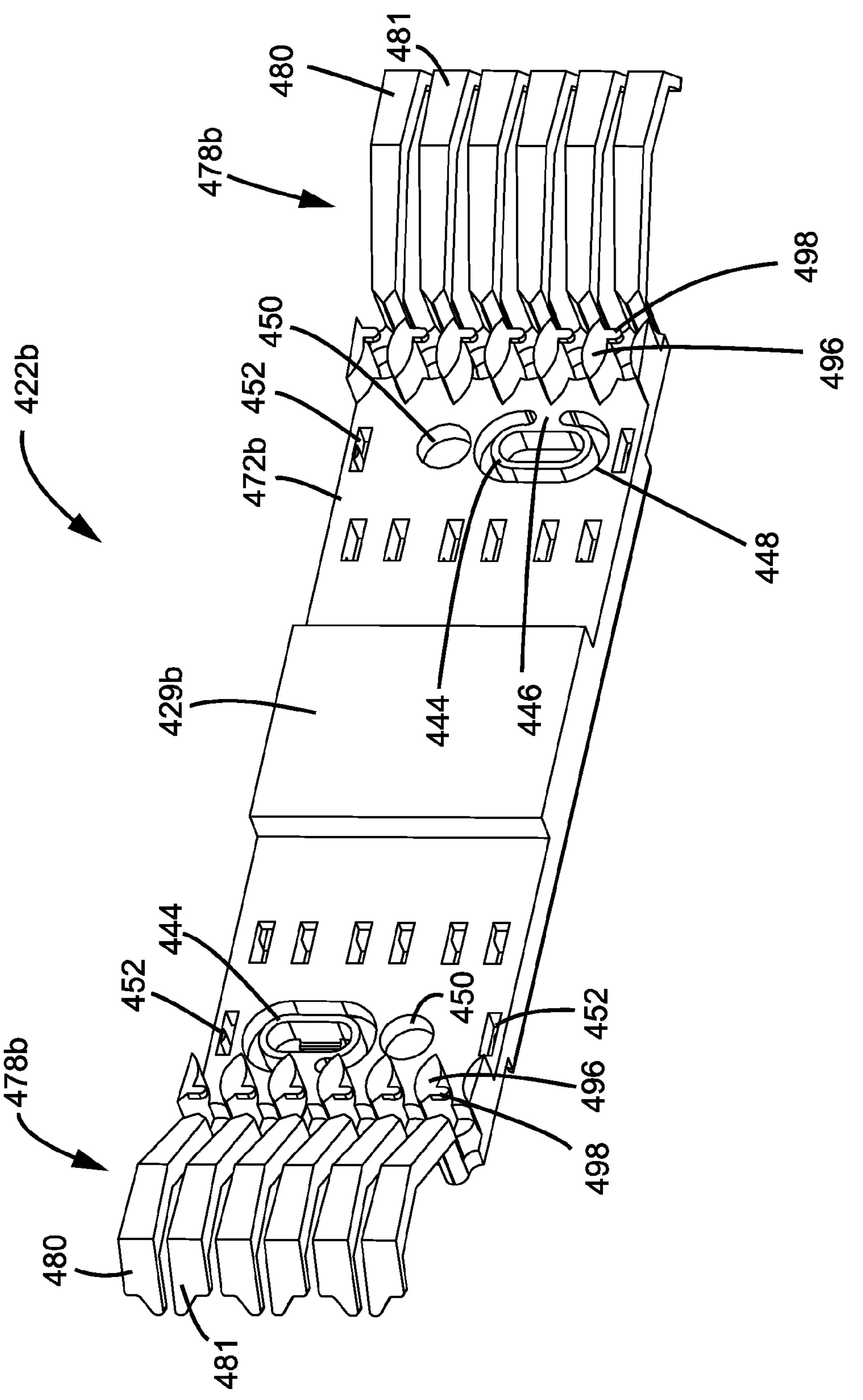
FIG. 42 is a perspective view of another of the tray support modules of the assembly of FIG. 35.
Figure 43:
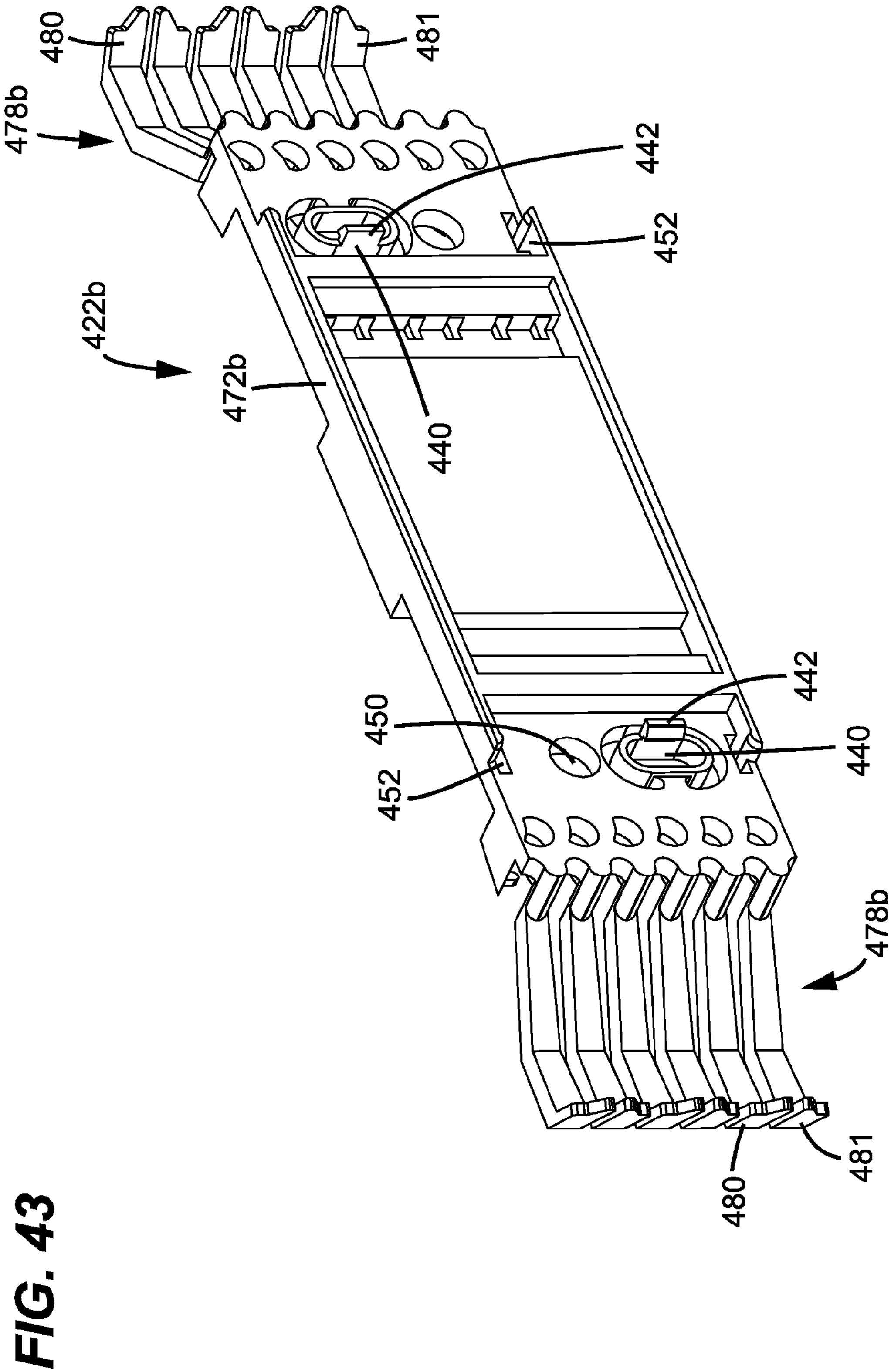
FIG. 43 is a further perspective view of the module of FIG. 42.
Figure 44:
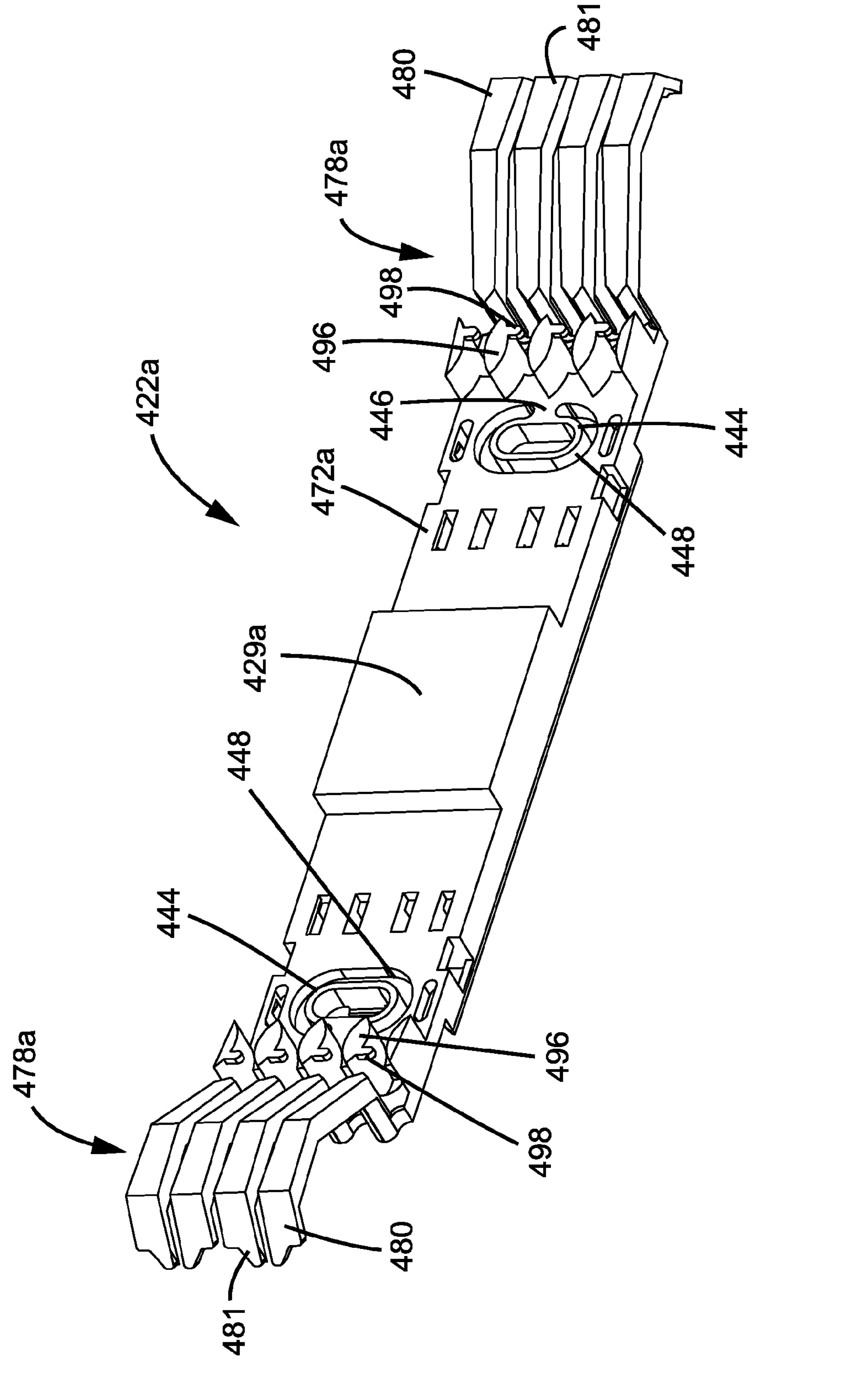
FIG. 44 is a perspective view of another of the tray support modules of the assembly of FIG. 35.
Figure 45:
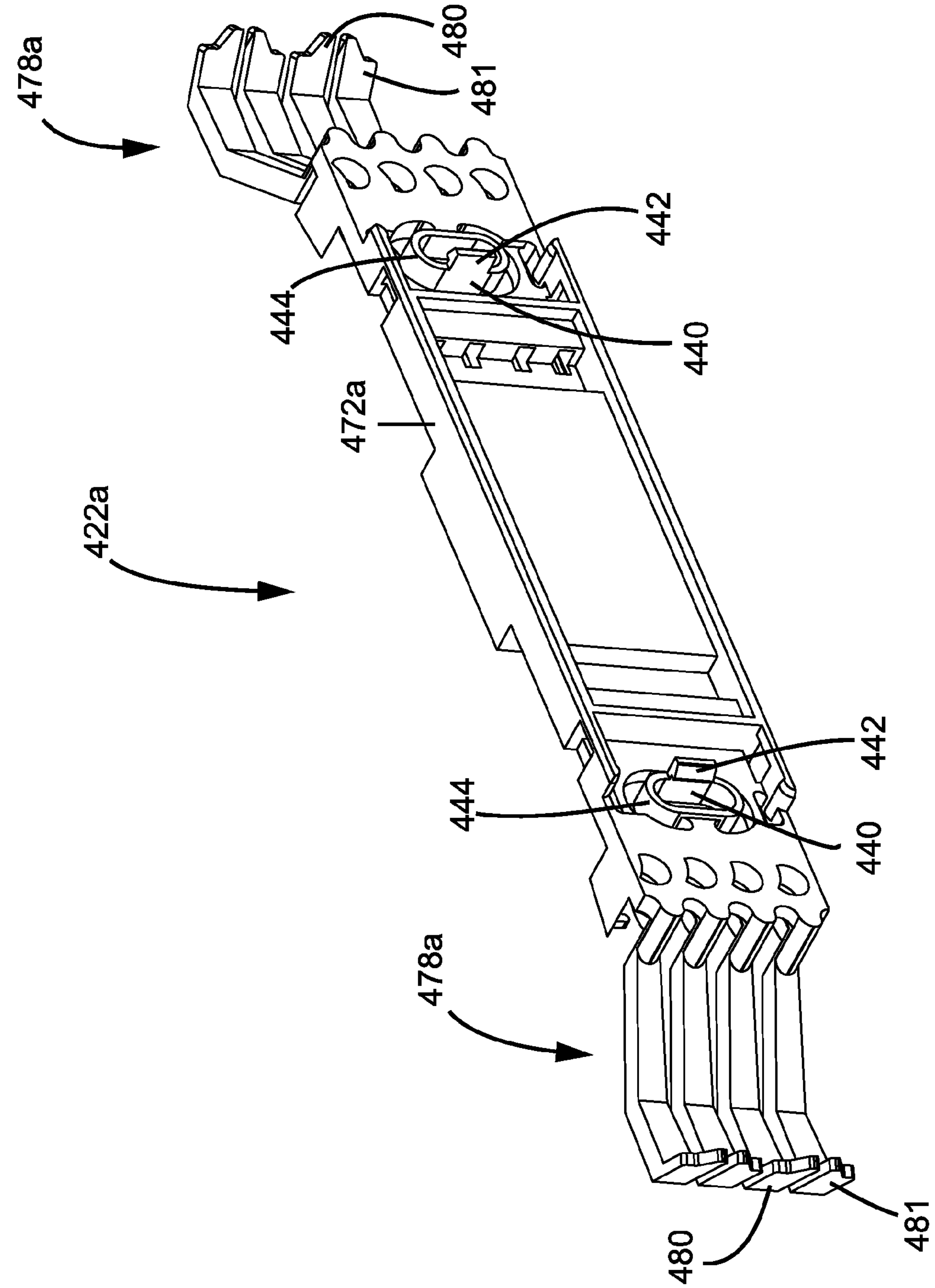
FIG. 45 is a further perspective view of the tray support module of FIG. 44.
Figure 46:
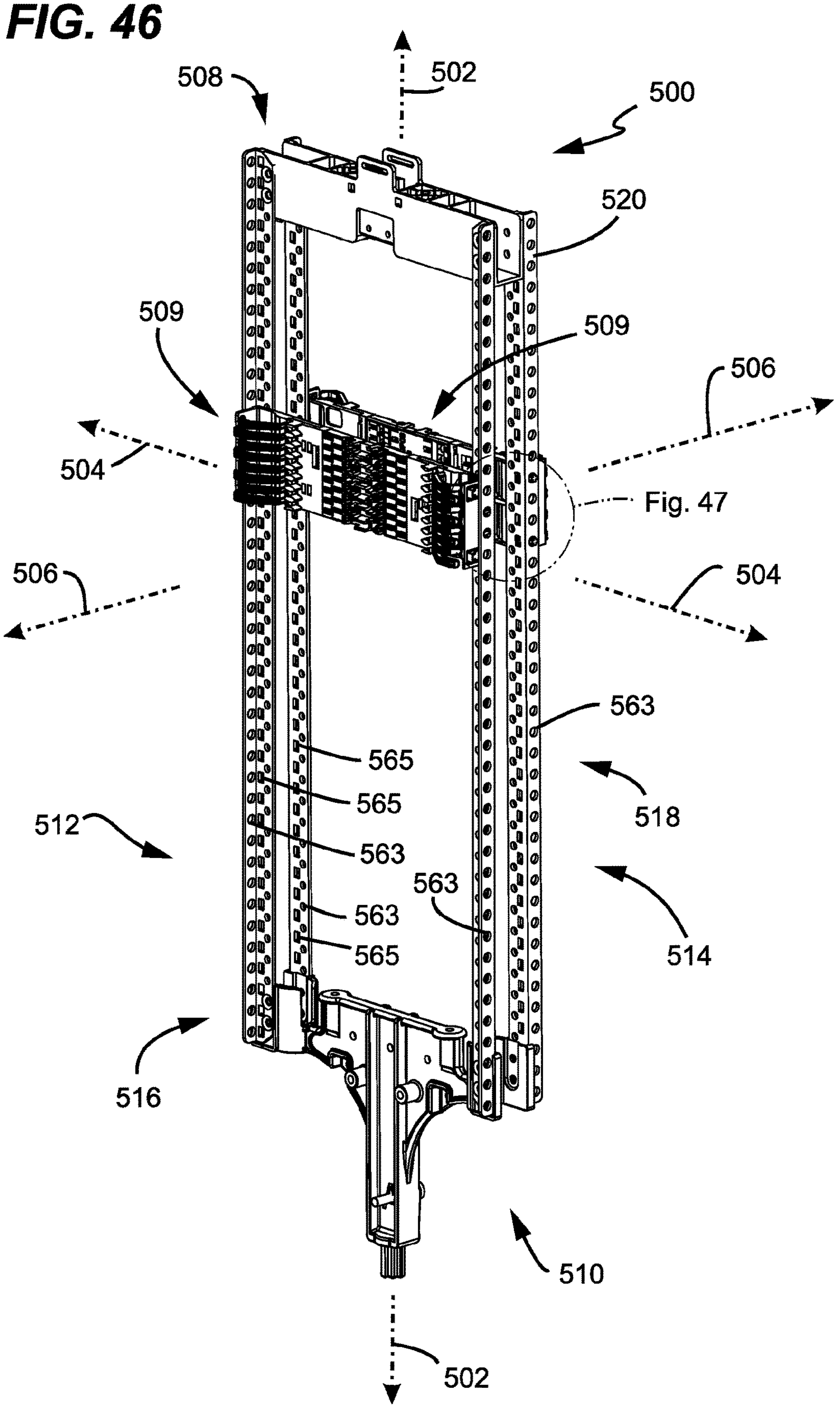
FIG. 46 is a perspective view of a further example fiber management assembly according to the present disclosure.
Figure 47:
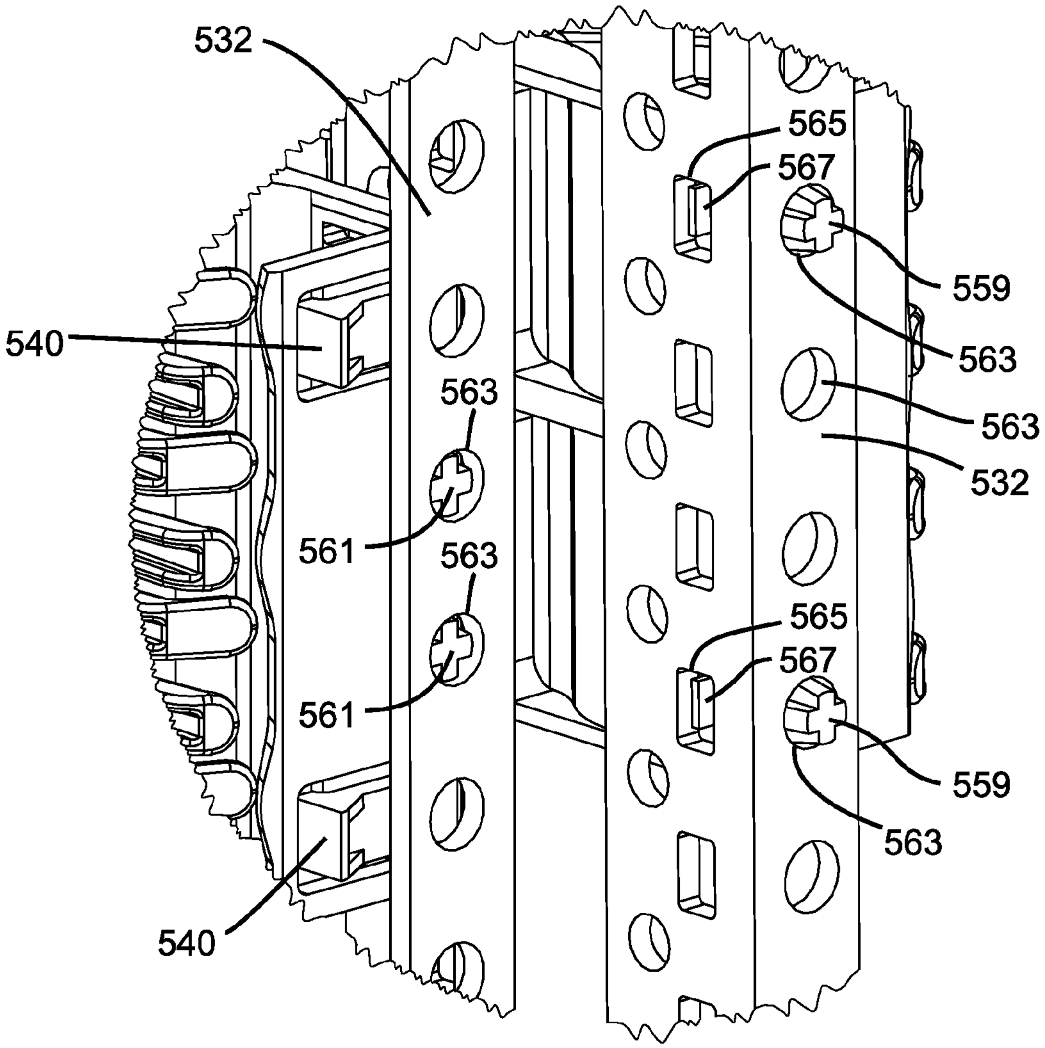
FIG. 47 is an enlarged view of the called-out portion in FIG. 46.
Figure 48:
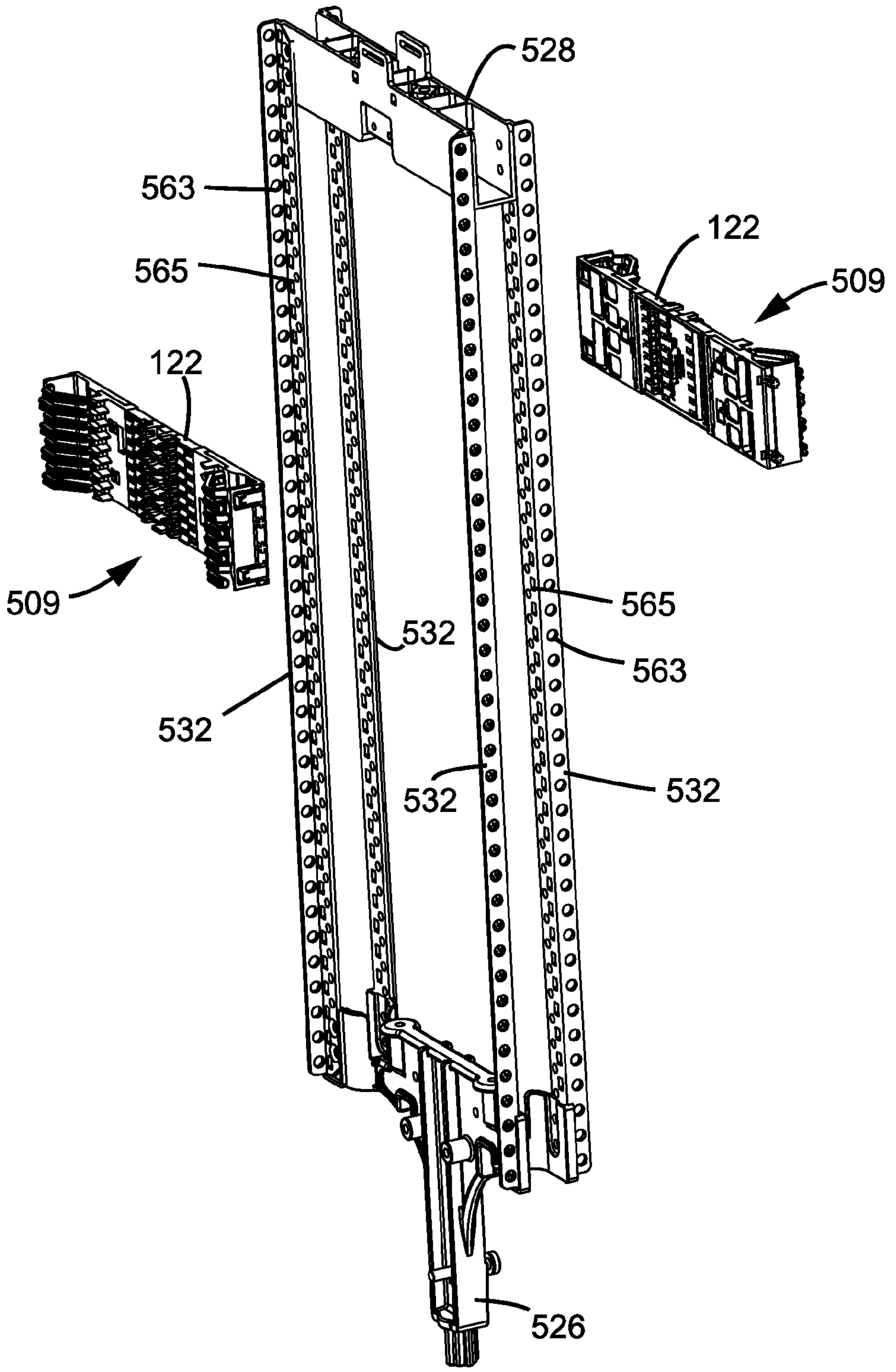
FIG. 48 is a partially exploded view of the assembly of FIG. 46.
Figure 49:
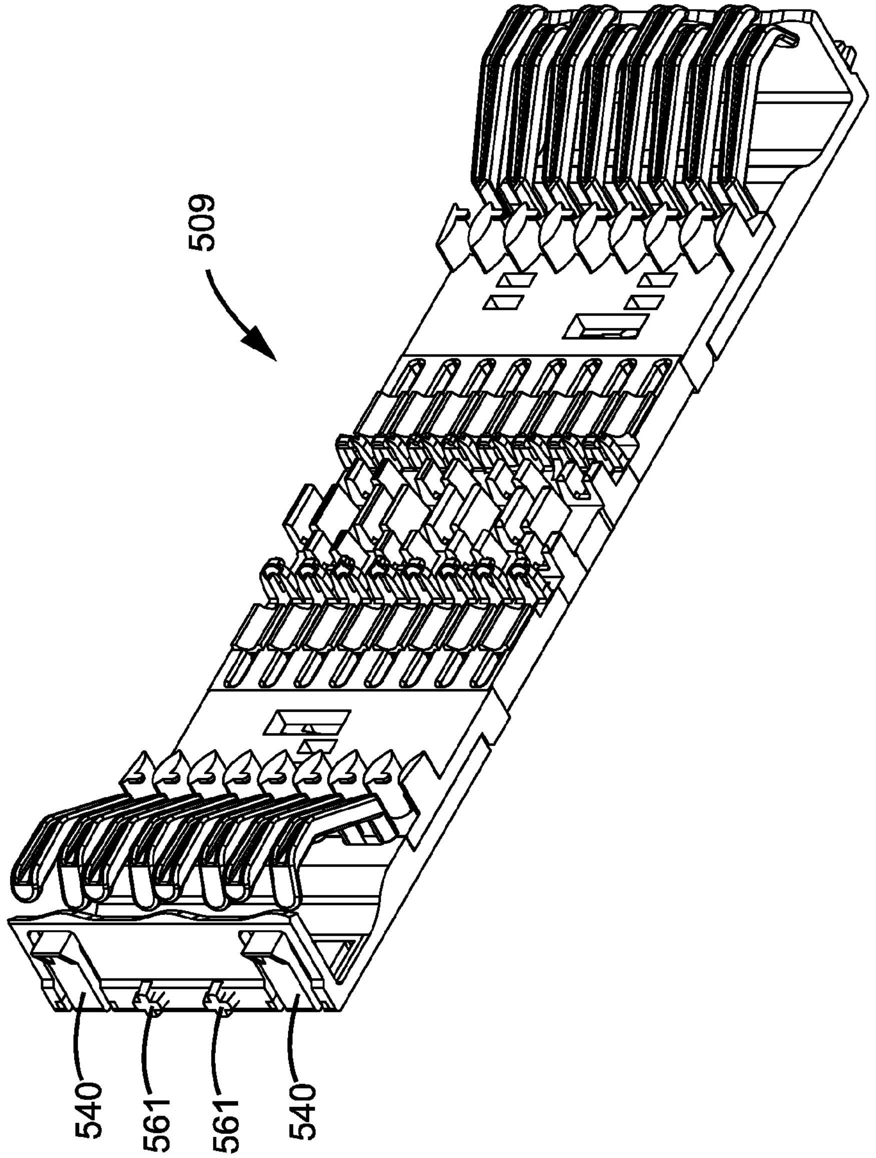
FIG. 49 is a perspective view of the tray support module of the assembly of FIG. 46.
Figure 50:
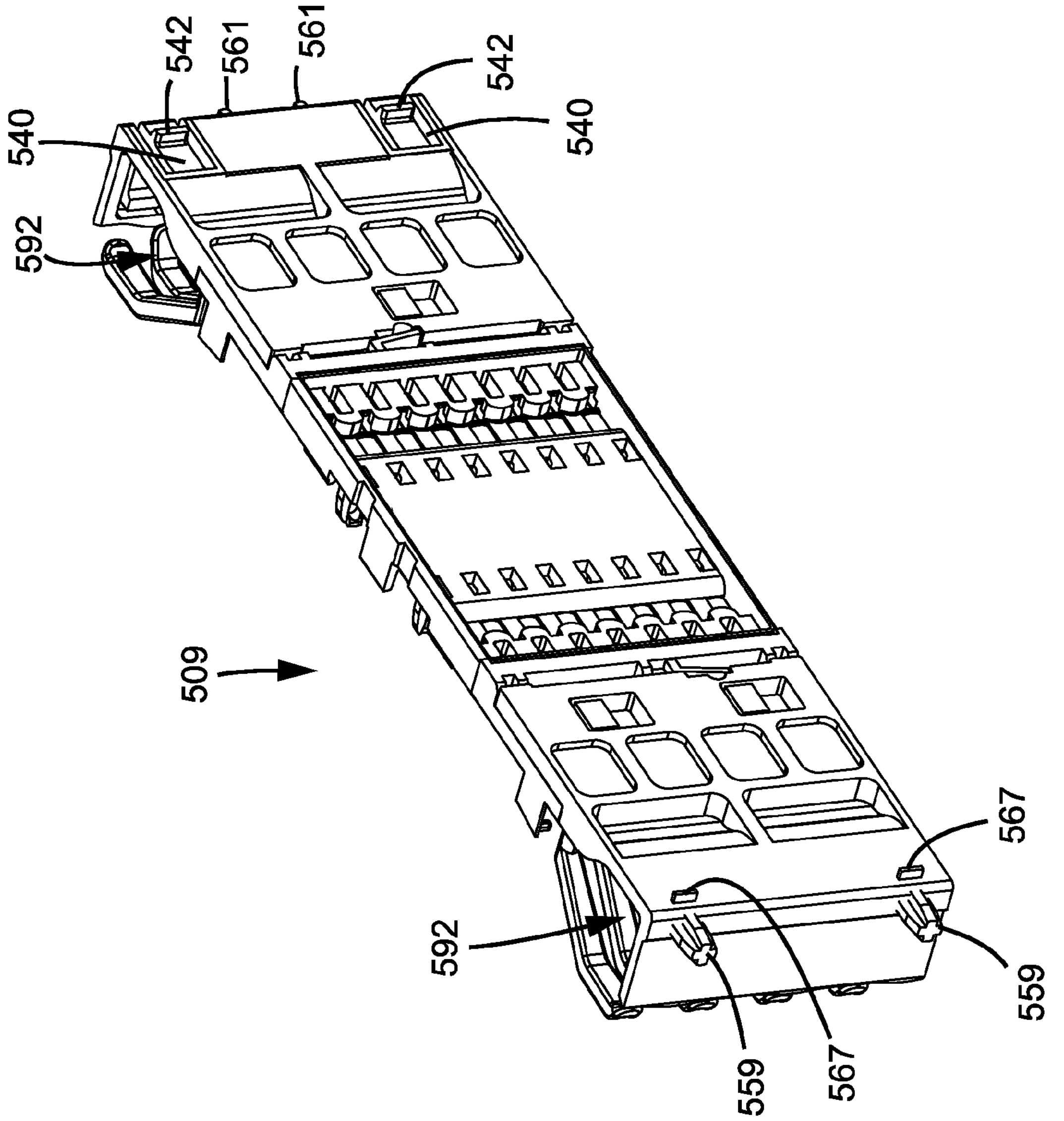
FIG. 50 is a further perspective view of the tray support module of FIG. 49.
Figure 51:
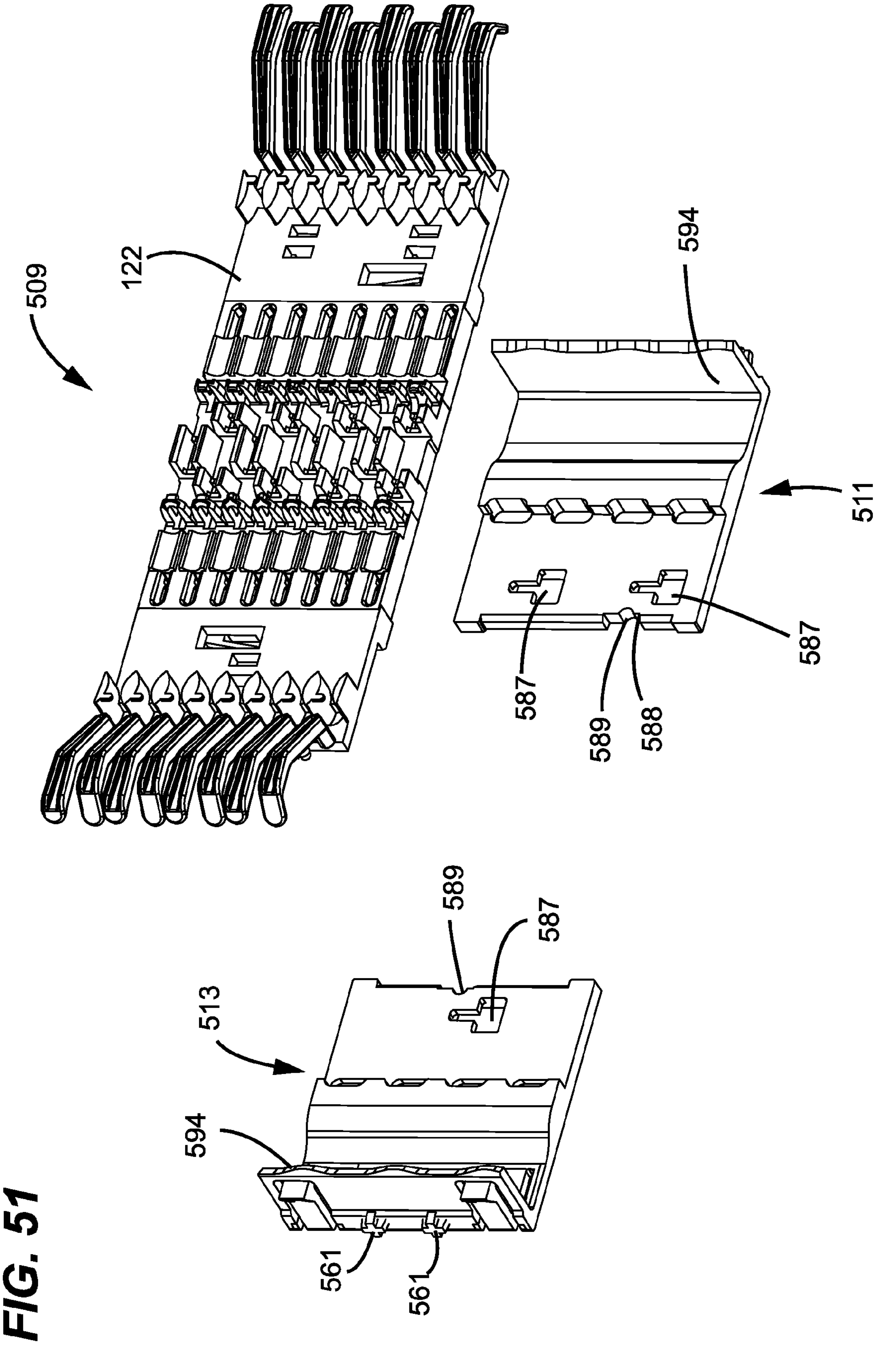
FIG. 51 is an exploded view of the tray support module of FIG. 49, showing the module pieces.
Figure 52:
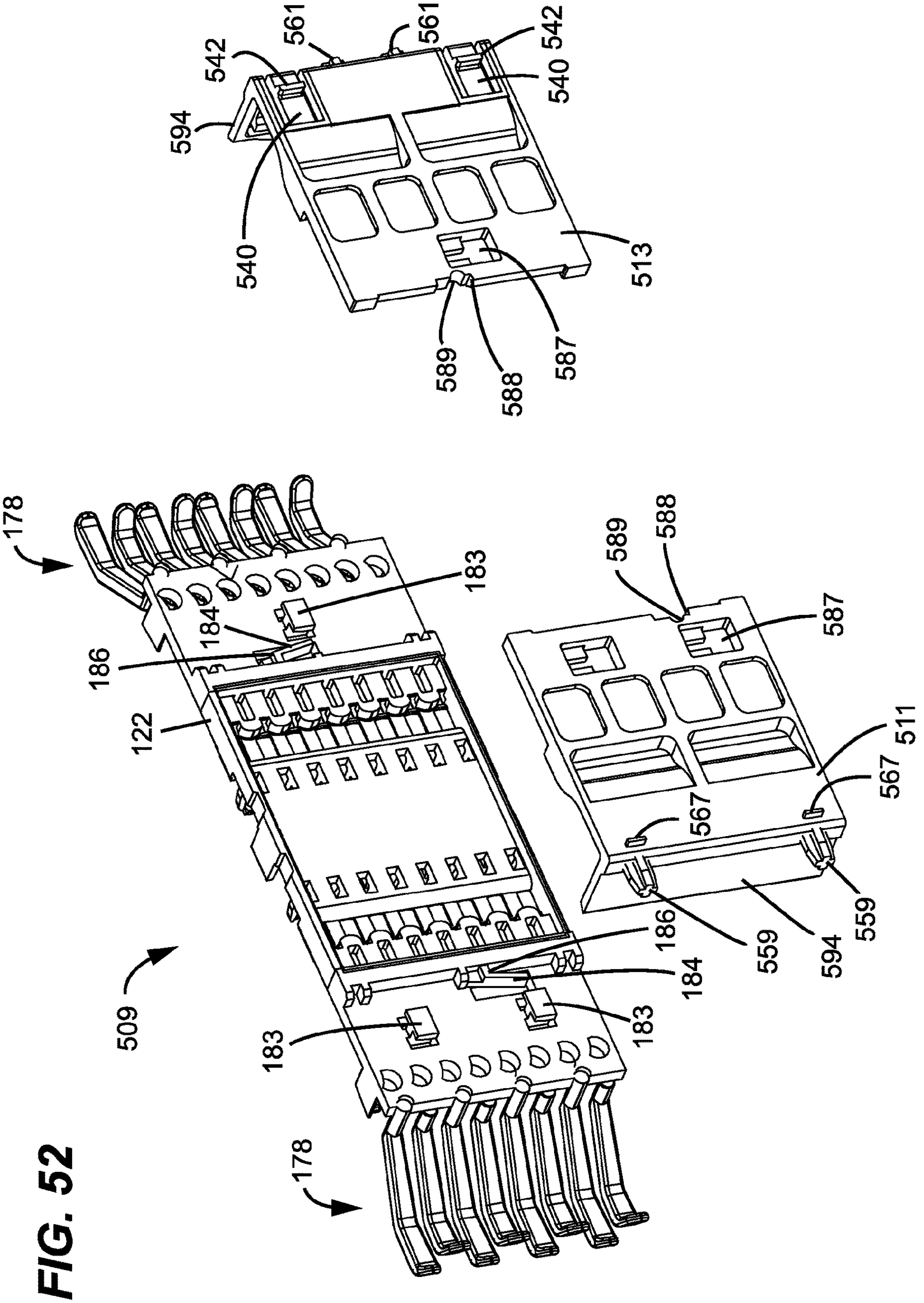
FIG. 52 is a further exploded view of the module of FIG. 49, showing the module pieces.
Figure 53:
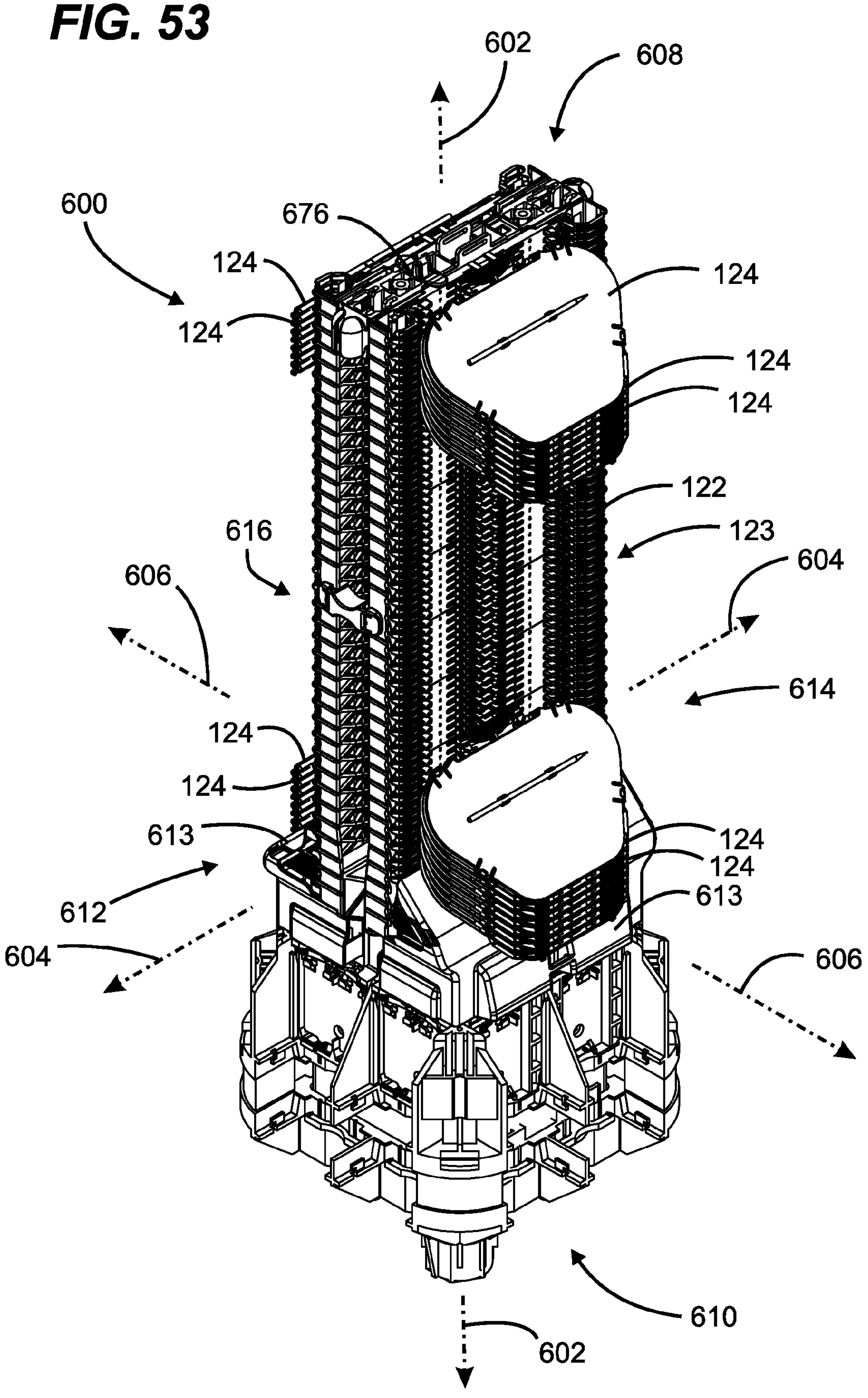
FIG. 53 is a perspective view of a further example optical fiber management assembly according to the present disclosure.
Figure 54:
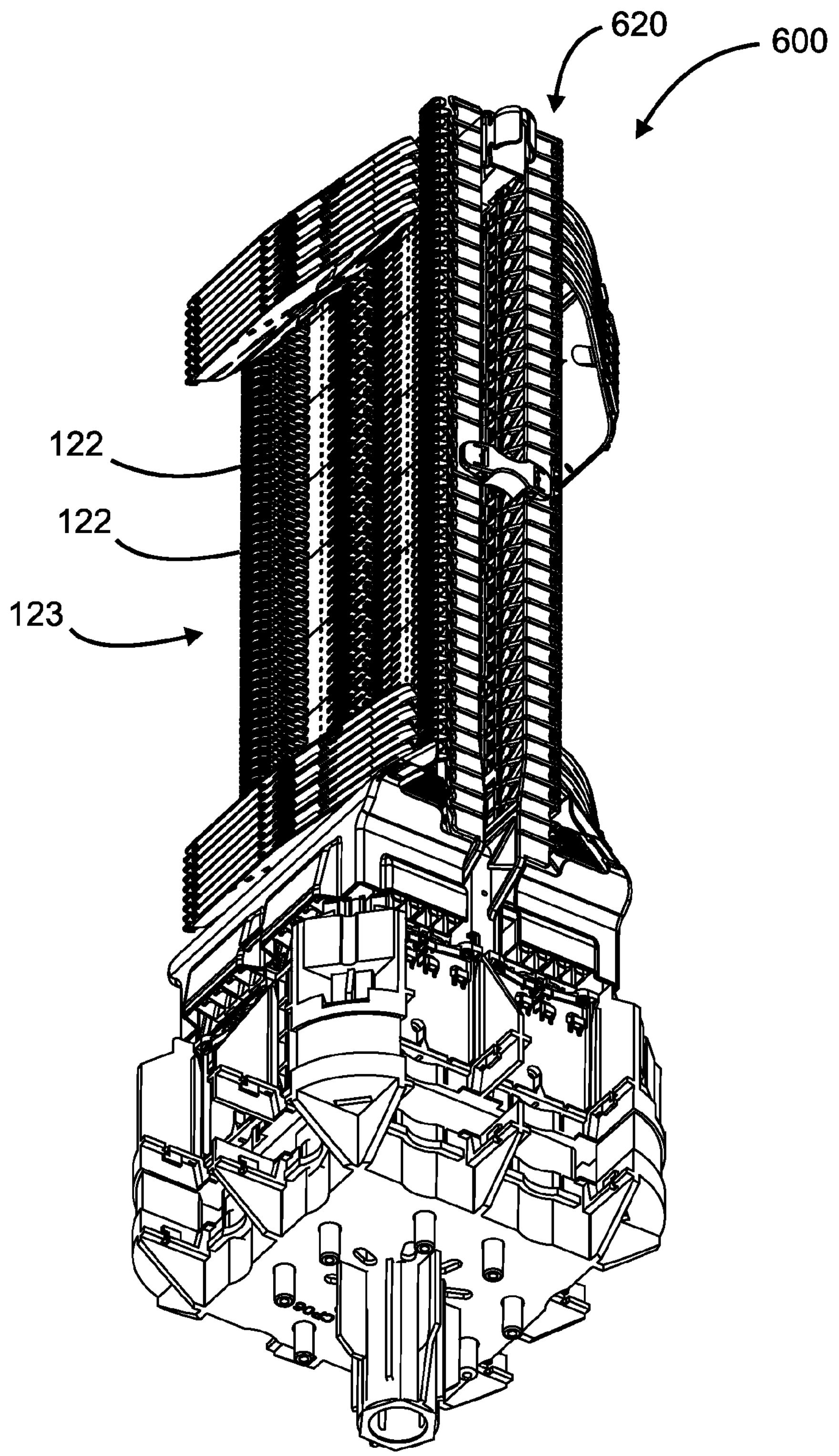
FIG. 54 is a further perspective view of the assembly of FIG. 53.
Figure 55:
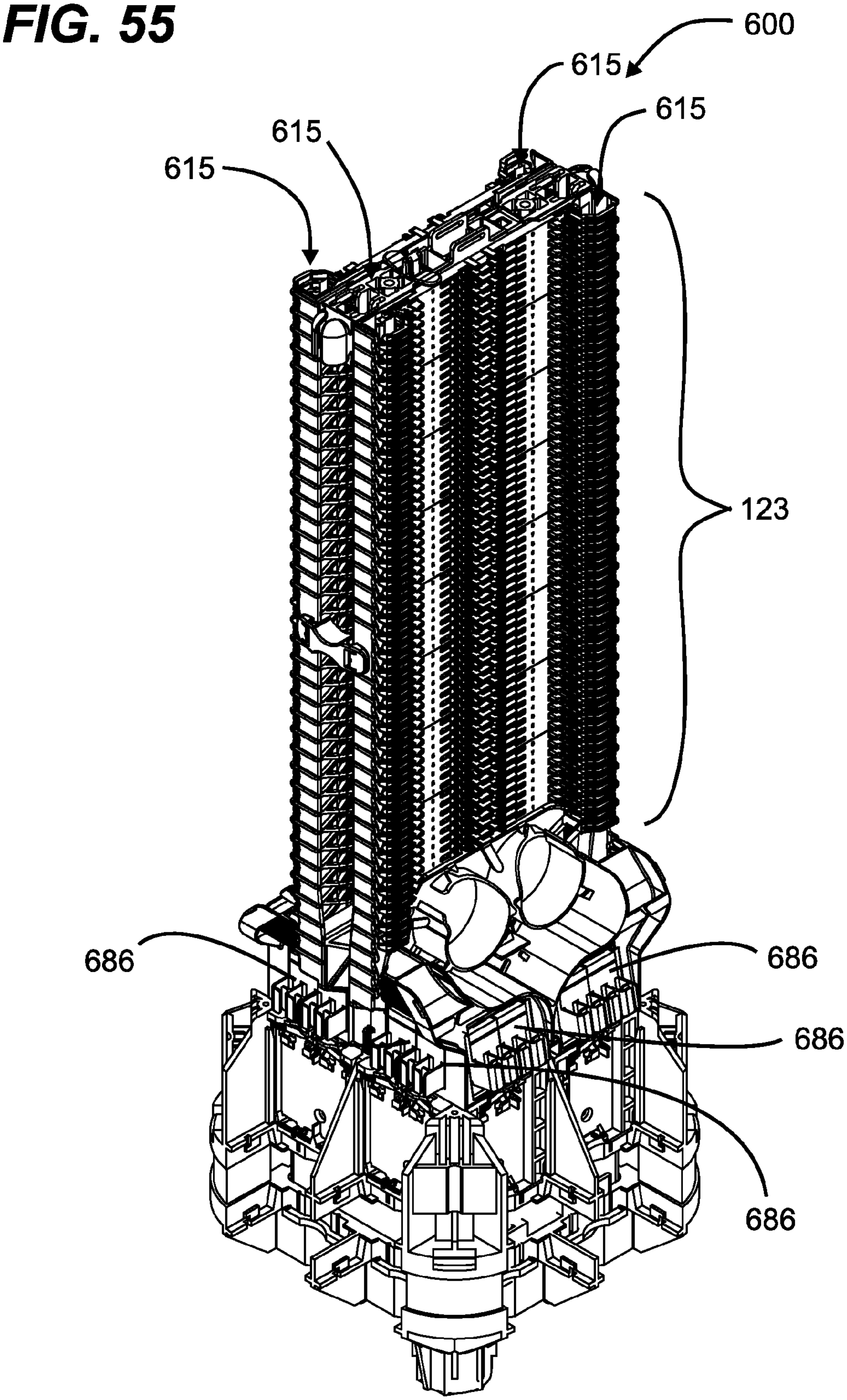
FIG. 55 is a perspective view of a portion of the assembly of FIG. 53.
Figure 56:
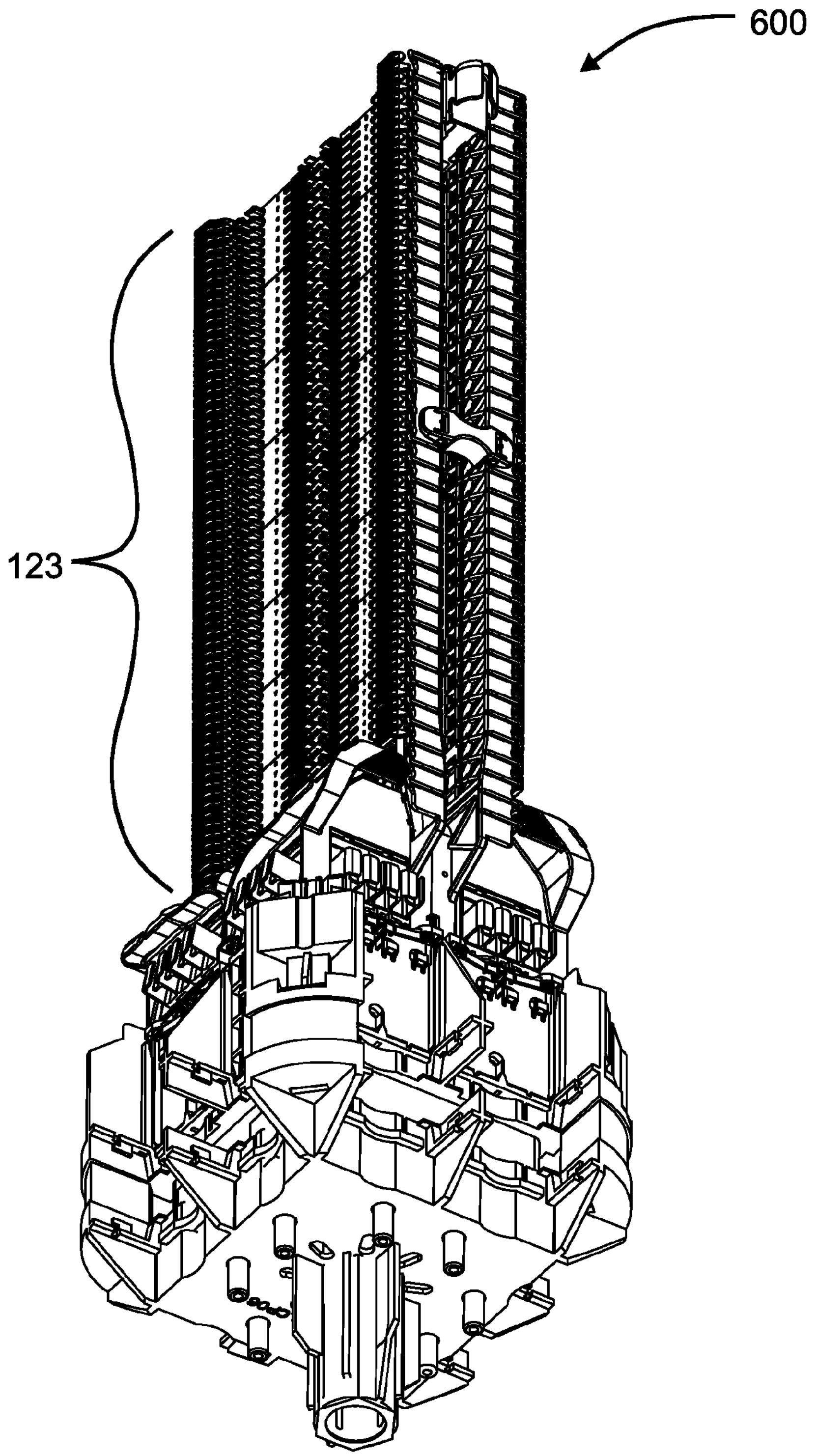
FIG. 56 is a further perspective view of the portion of the assembly of FIG. 55.
Figure 57:
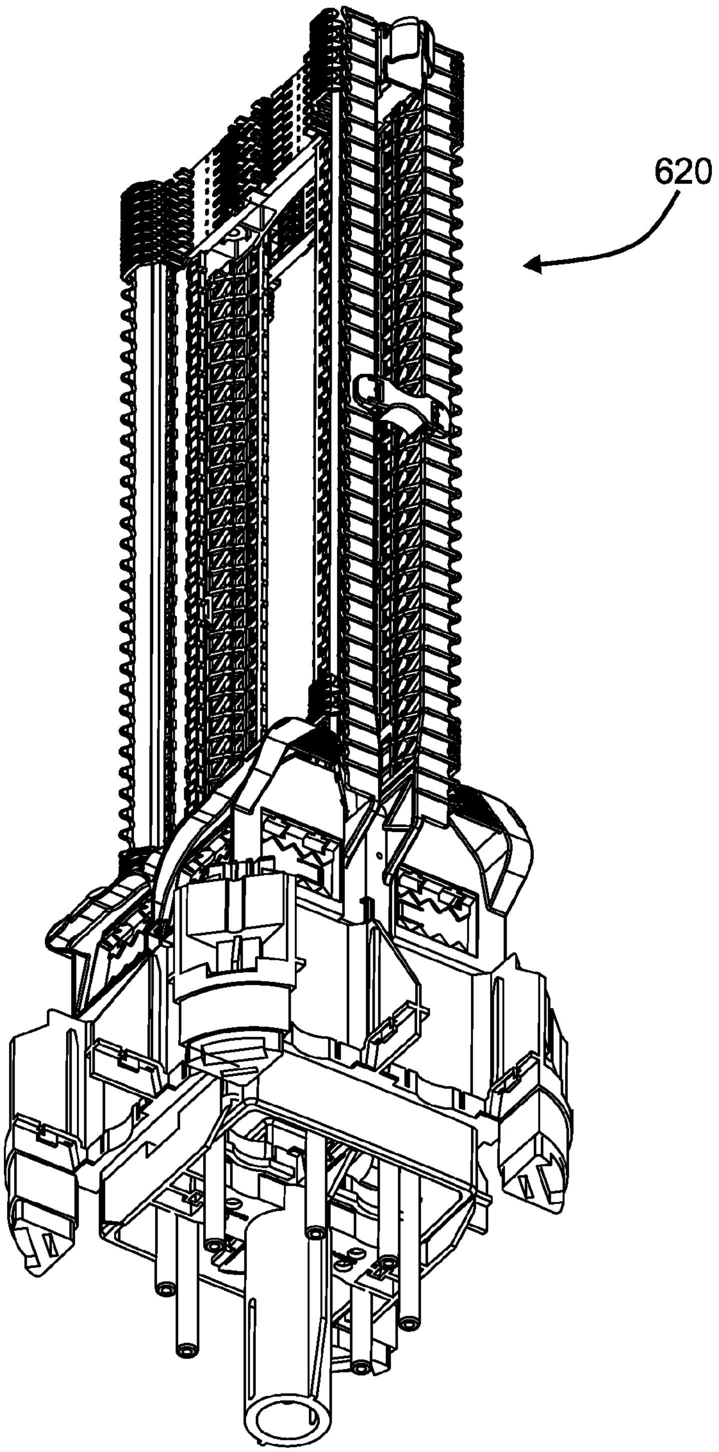
FIG. 57 is a perspective view of a further portion of the assembly of FIG. 53.
Figure 58:
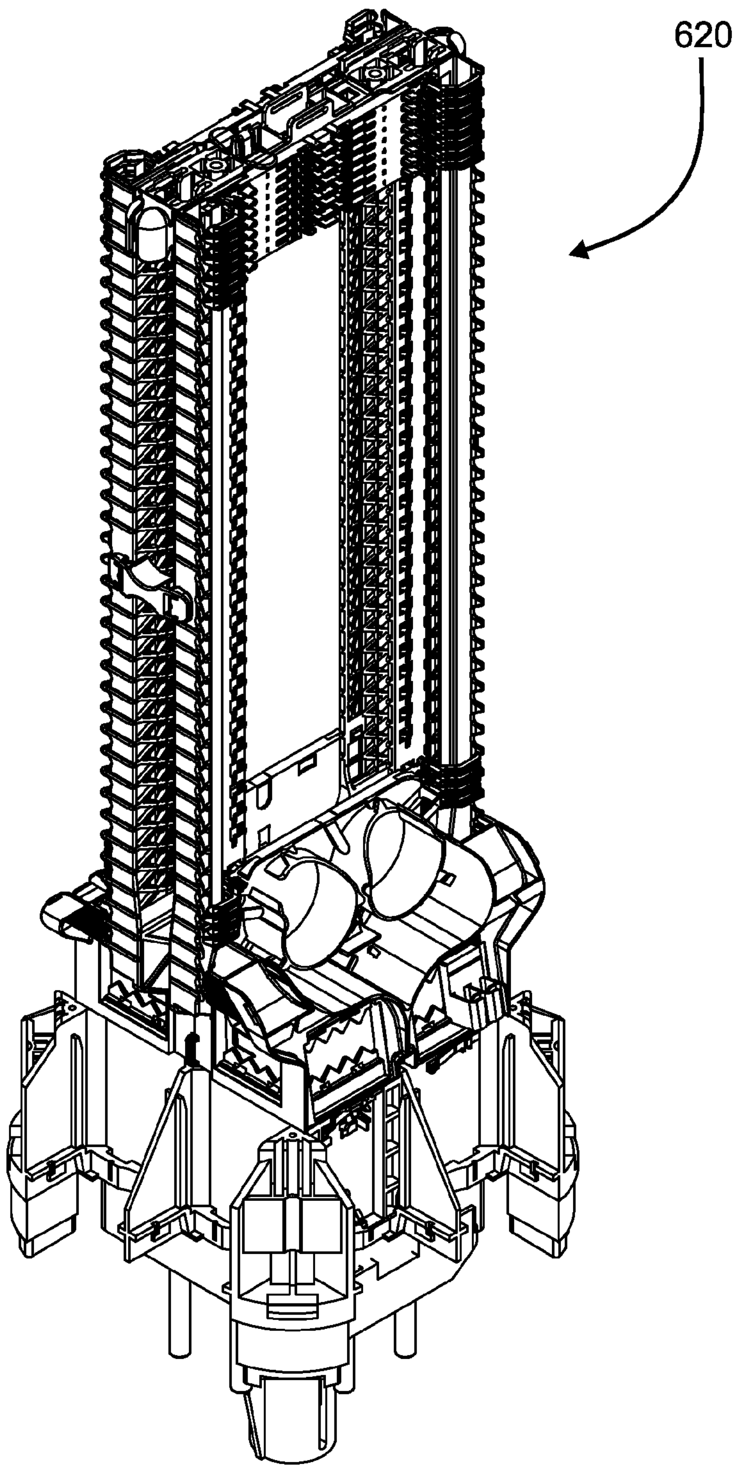
FIG. 58 is a further perspective view of the portion of the assembly of FIG. 57.
Figure 59:
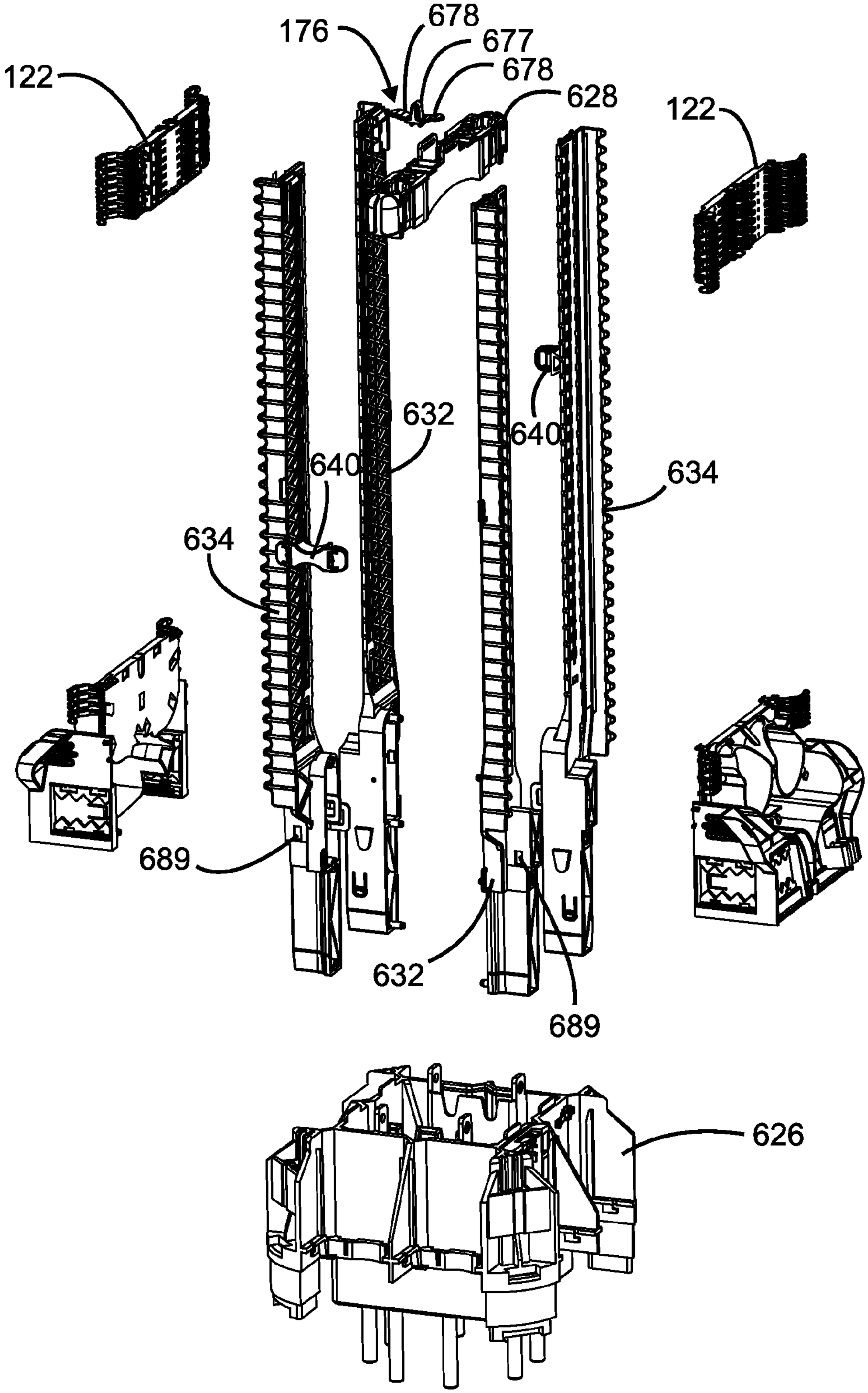
FIG. 59 is an exploded view of a portion of the assembly of FIG. 53.
Figure 60:
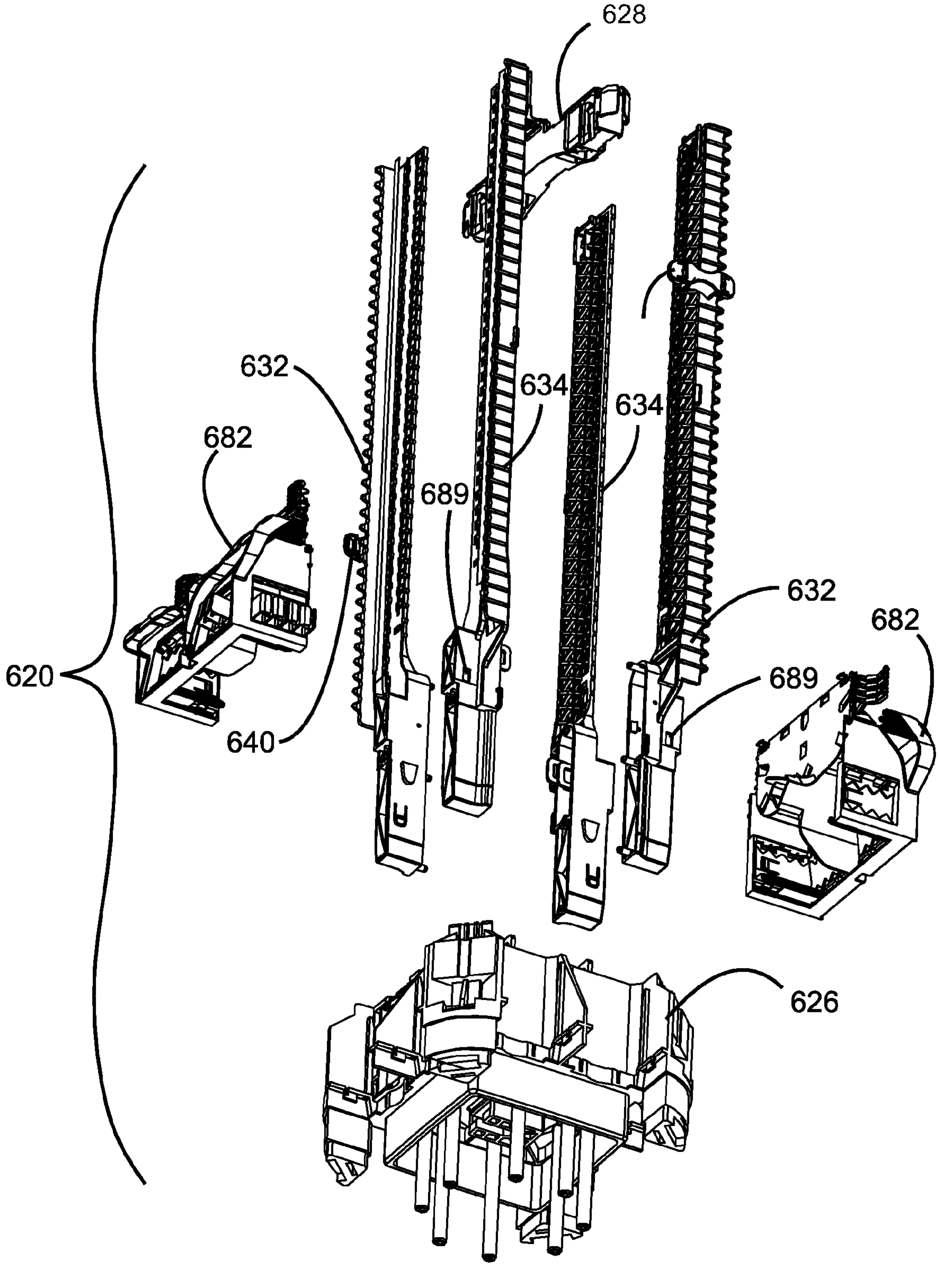
FIG. 60 is an exploded view of the framework of the assembly of FIG. 53.
Figure 71:
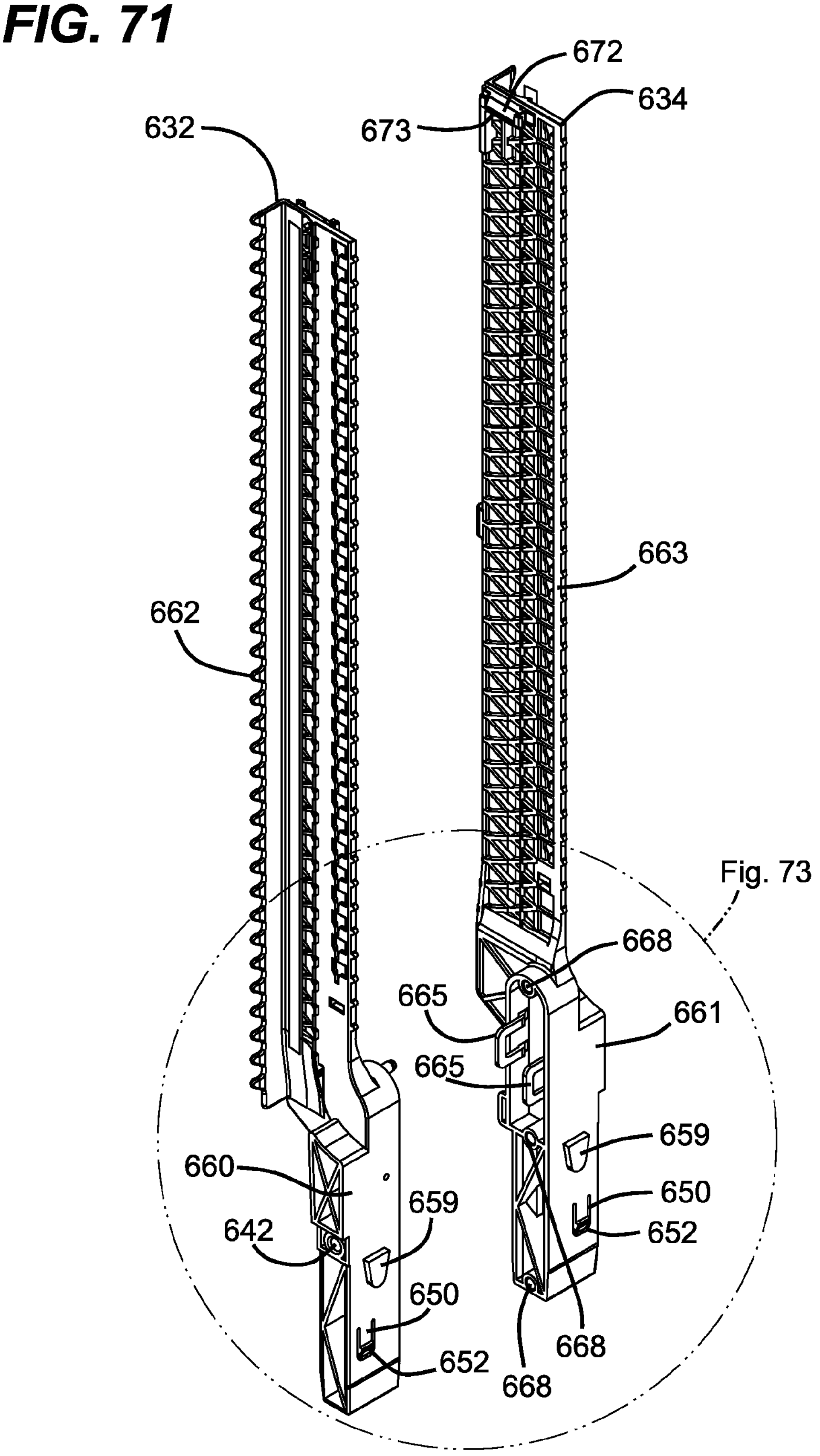
FIG. 71 is a perspective view of two of the frame members of the framework of FIG. 60.
Figure 72:
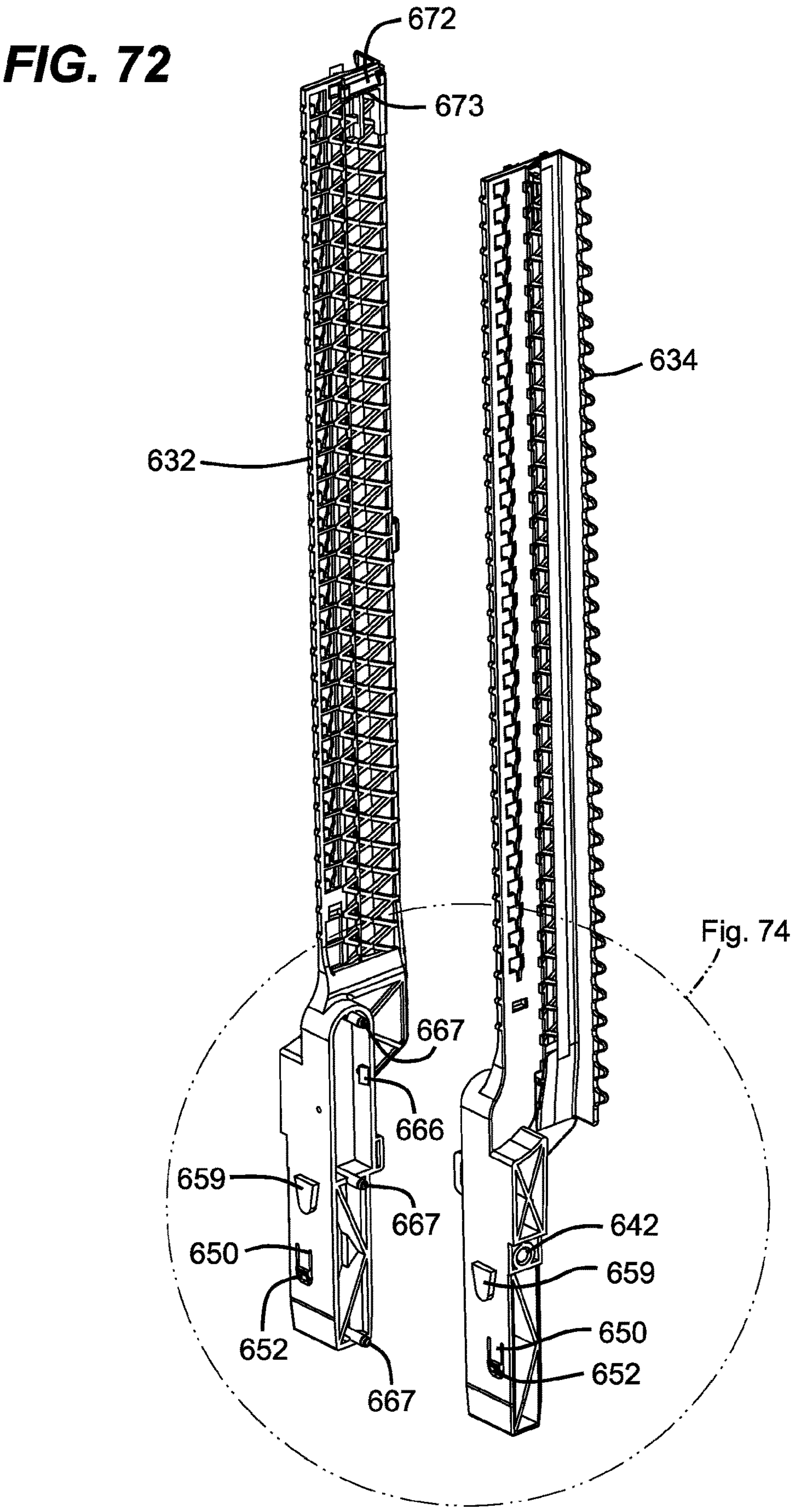
FIG. 72 is a further perspective view of the frame members of FIG. 71.
Figure 73:
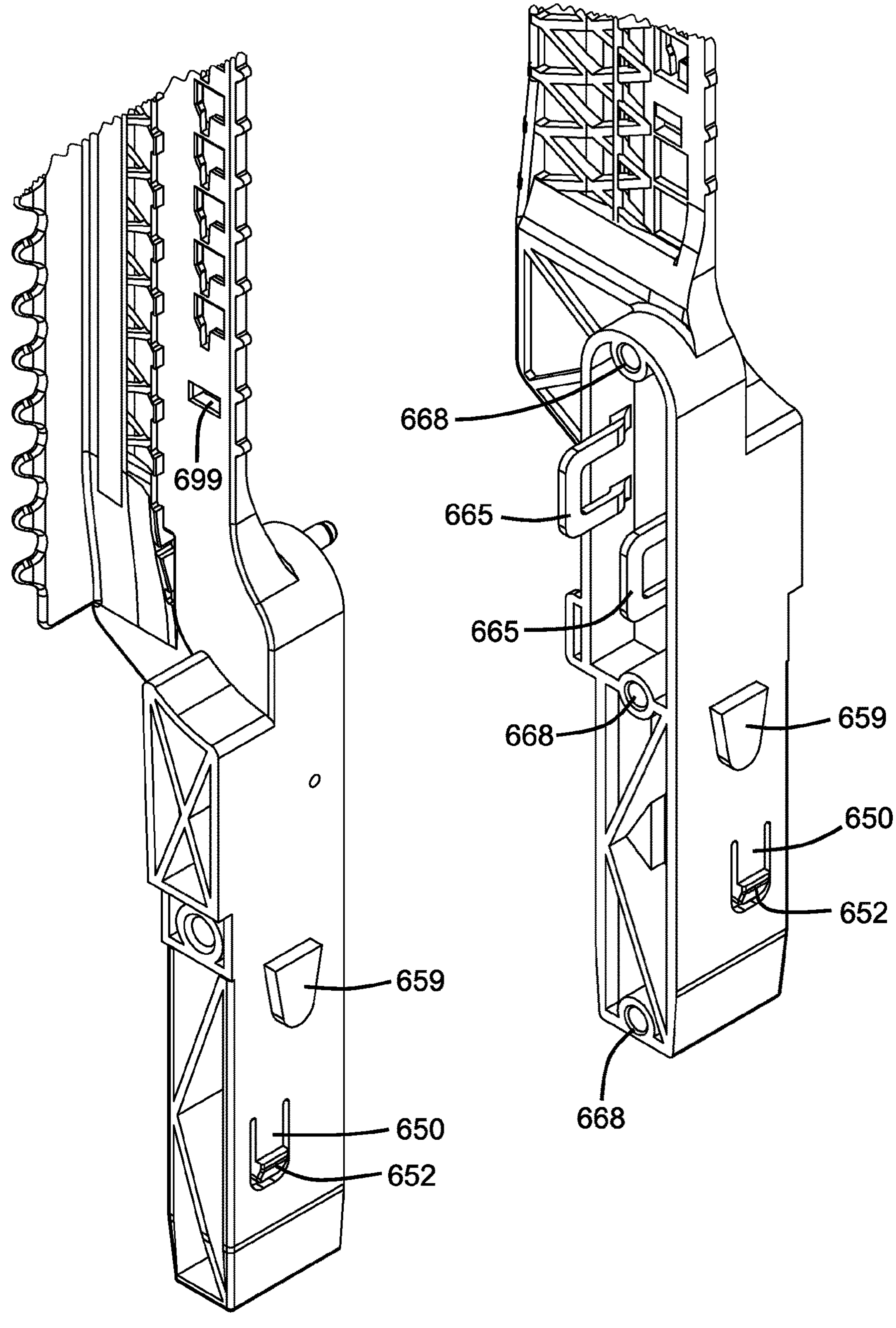
FIG. 73 is an enlarged view of the called-out portion in FIG. 71.
Figure 74:
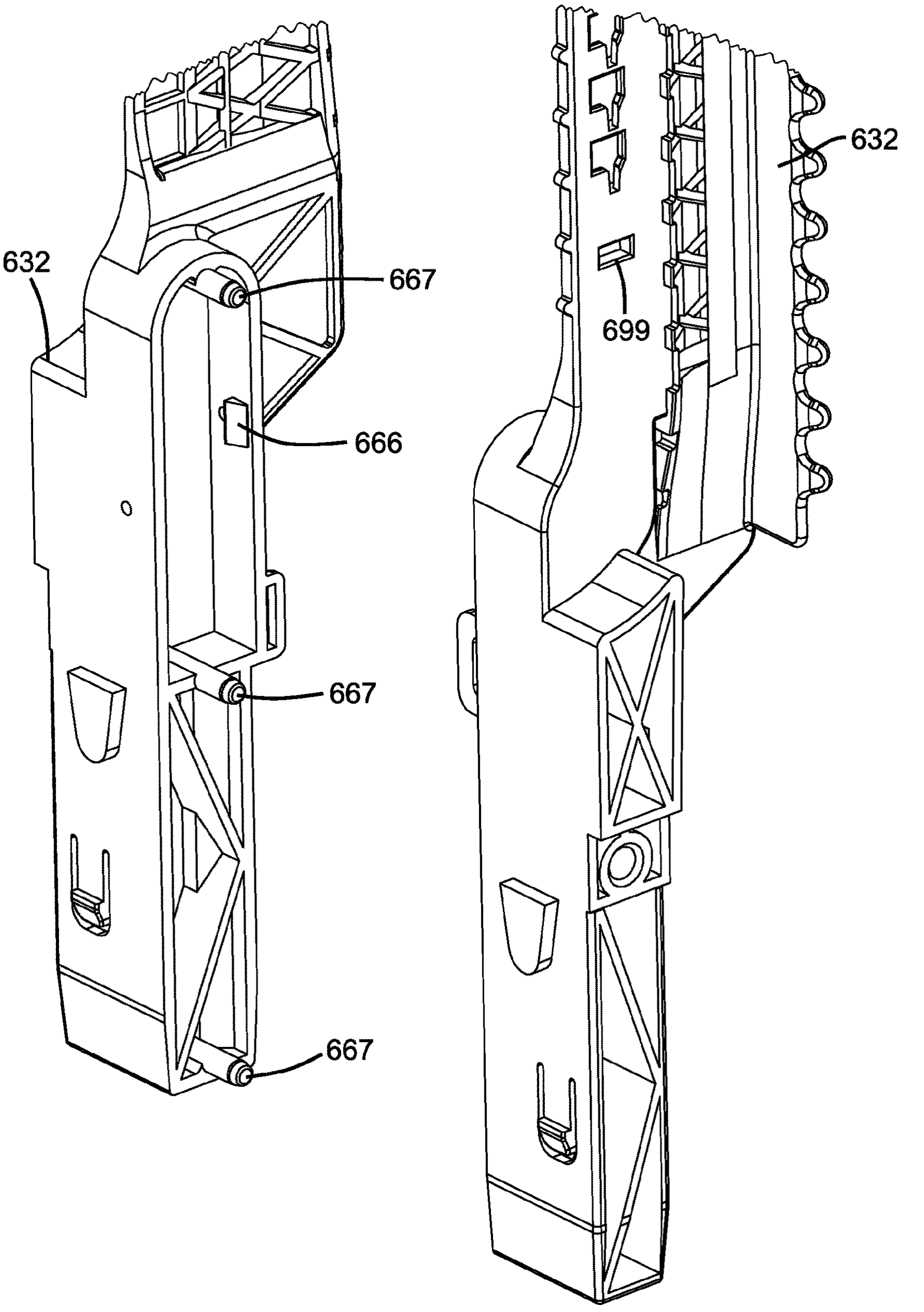
FIG. 74 is an enlarged view of the called-out portion in FIG. 73.
Figure 75:
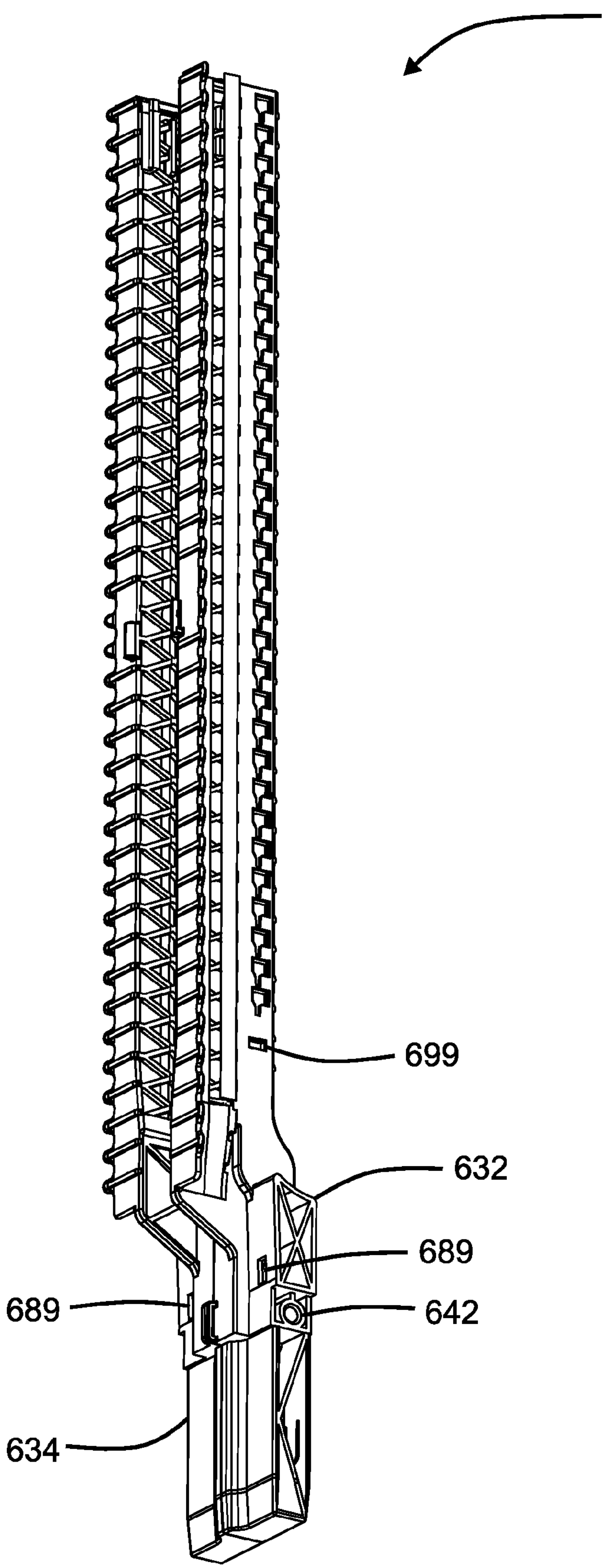
FIG. 75 is a perspective view of a subassembly of two of the frame members of the framework of FIG. 60 snappingly connected to each other.
Figure 76:
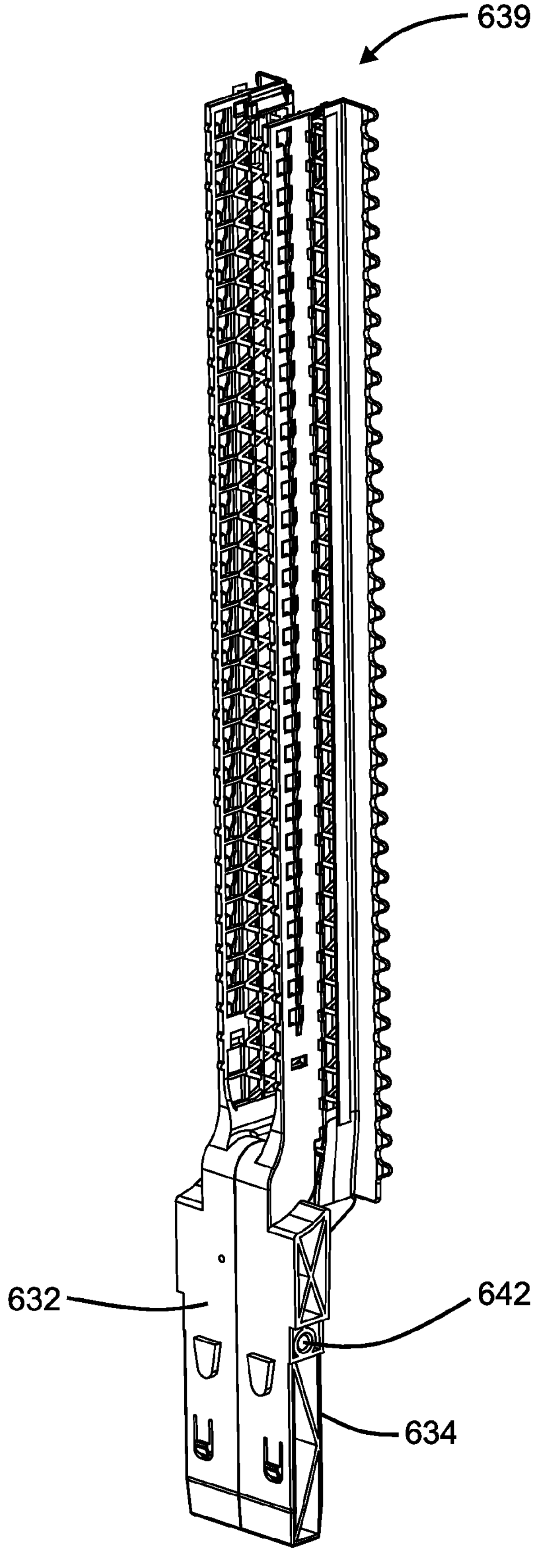
FIG. 76 is a further perspective view of the subassembly of FIG. 75.
Figure 77:
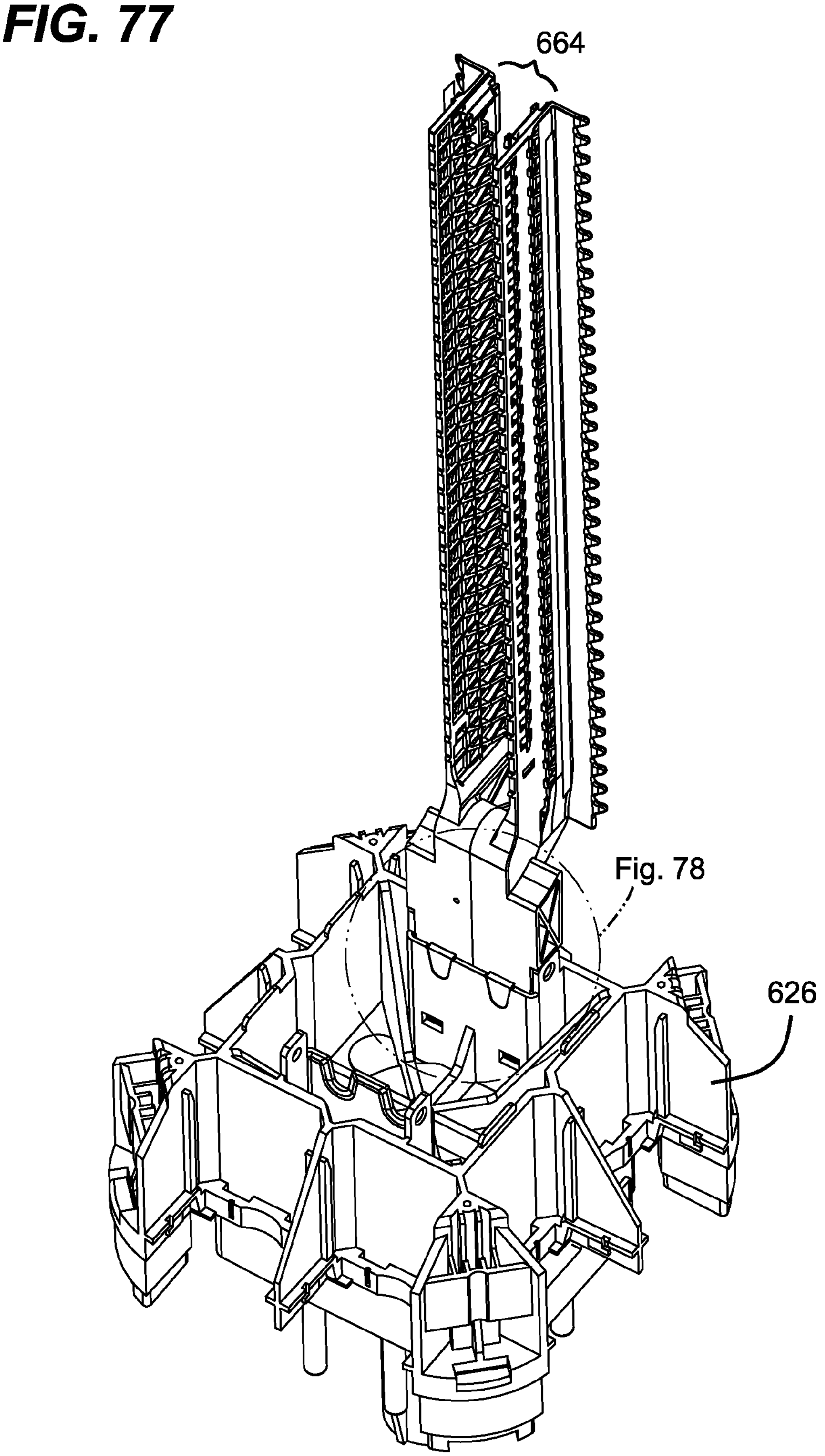
FIG. 77 is a perspective view of the subassembly of FIG. 75 snappingly connected to the base of the framework of FIG. 60.
Figure 78:
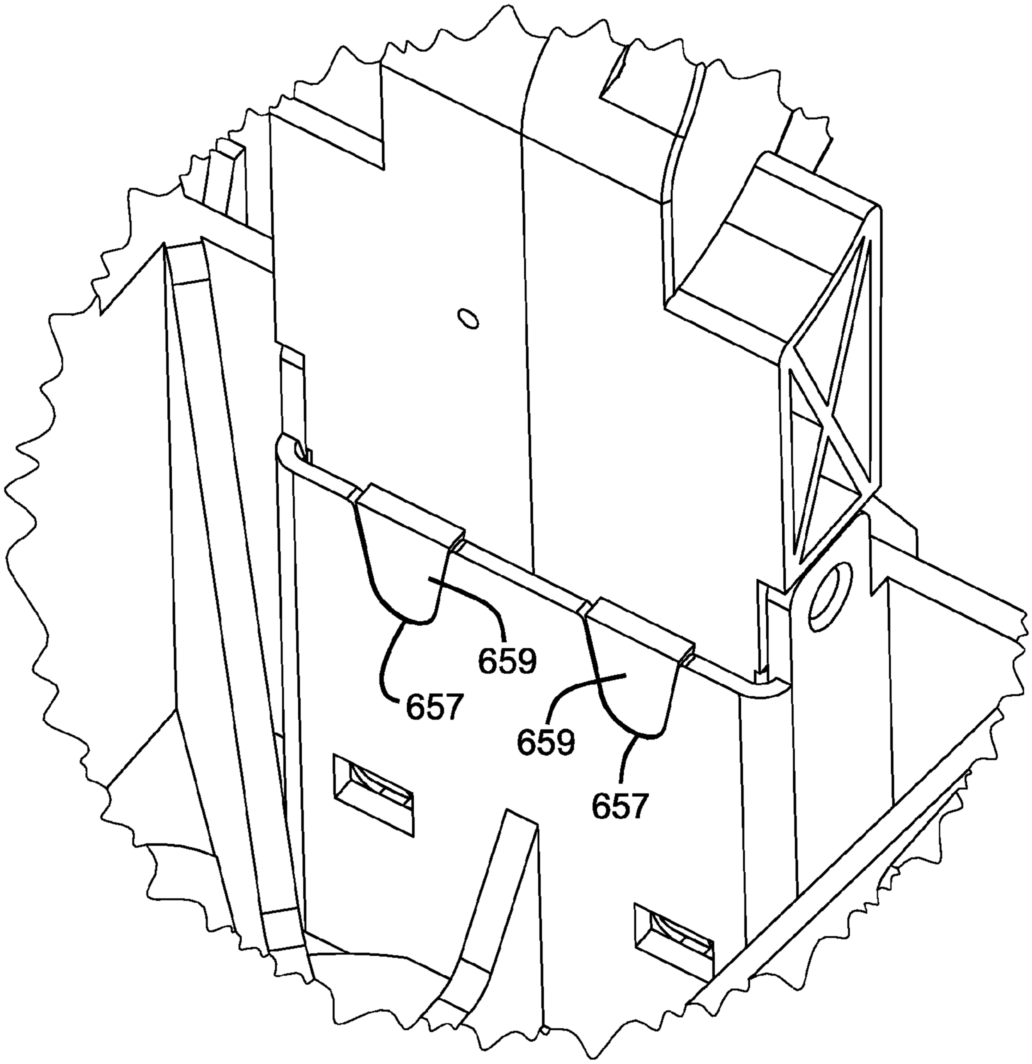
FIG. 78 is an enlarged view of the called-out portion of FIG. 77.
Figure 79:
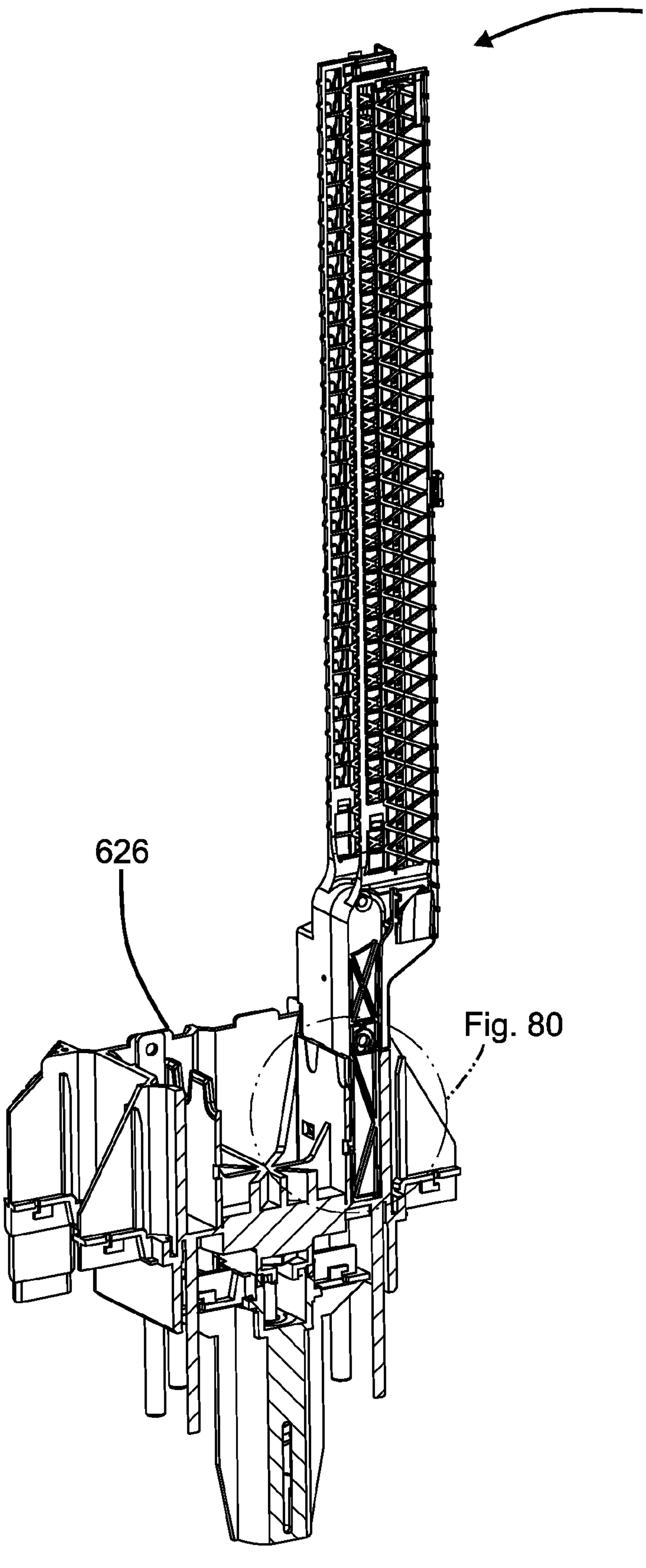
FIG. 79 is a perspective, cross-sectional view of what is shown in FIG. 77.
Figure 80:
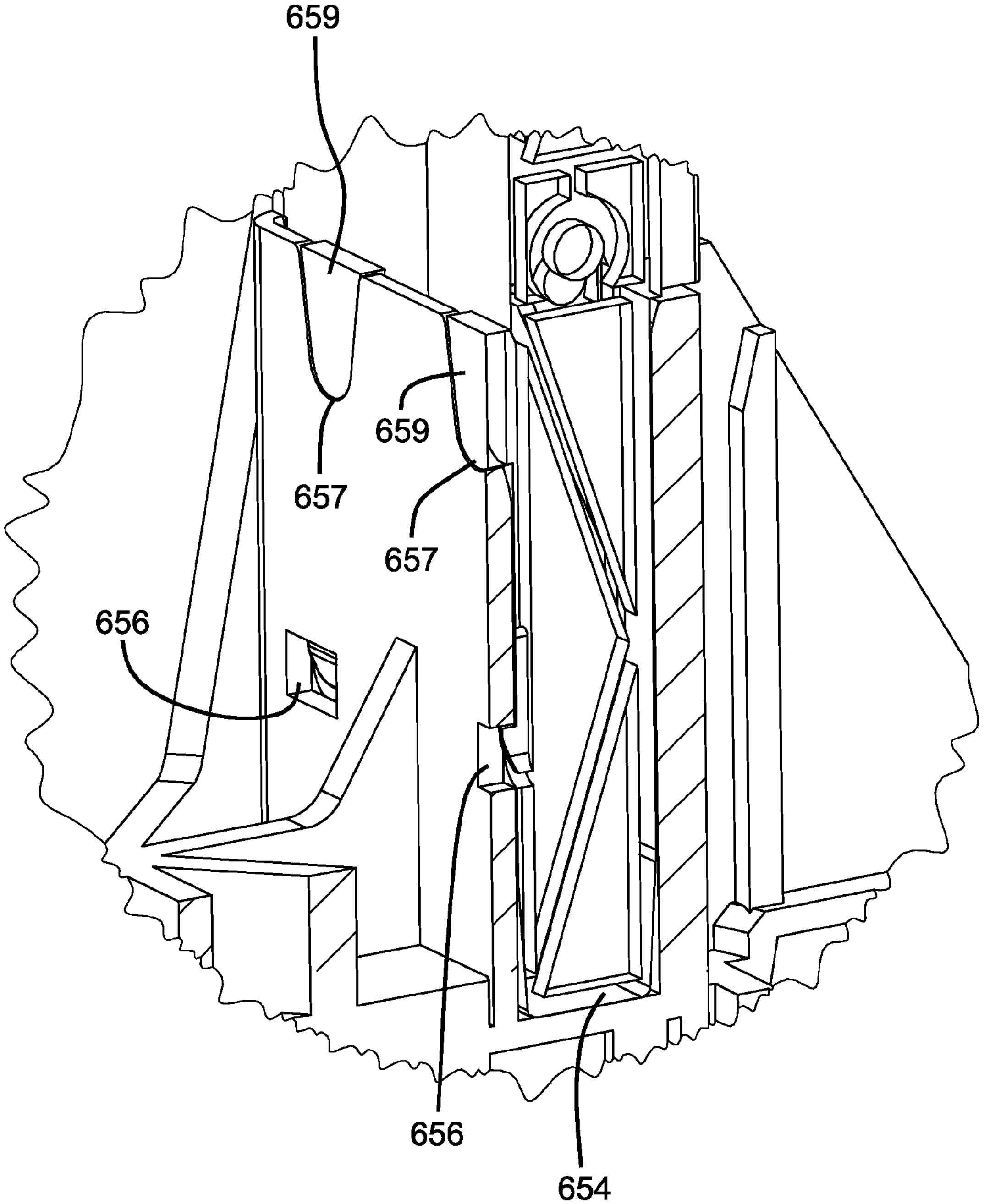
FIG. 80 is an enlarged view of the called out portion in FIG. 79.
Figure 81:
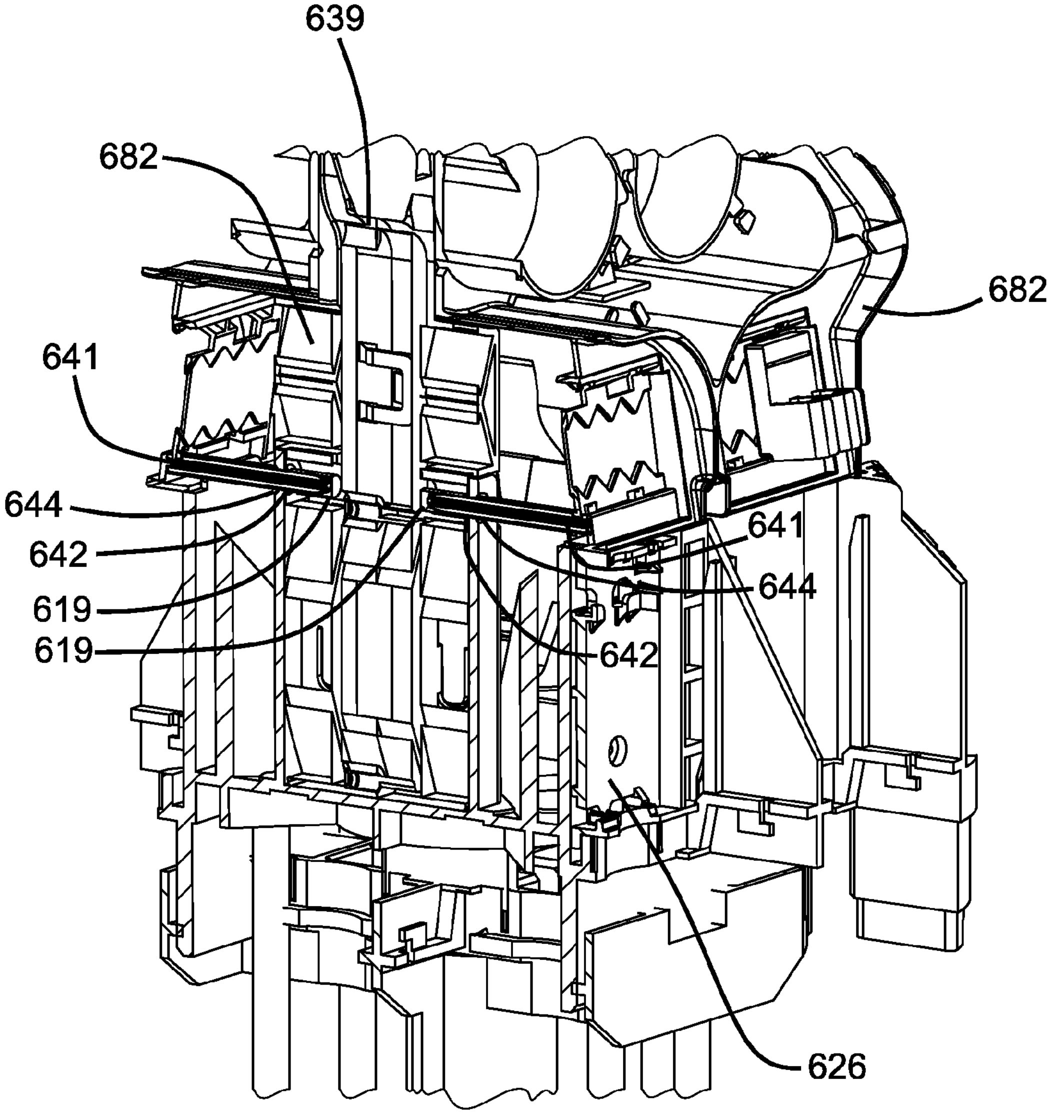
FIG. 81 is a perspective, cross-sectional view of a portion of the framework of FIG. 60 assembled together.
Figure 82:
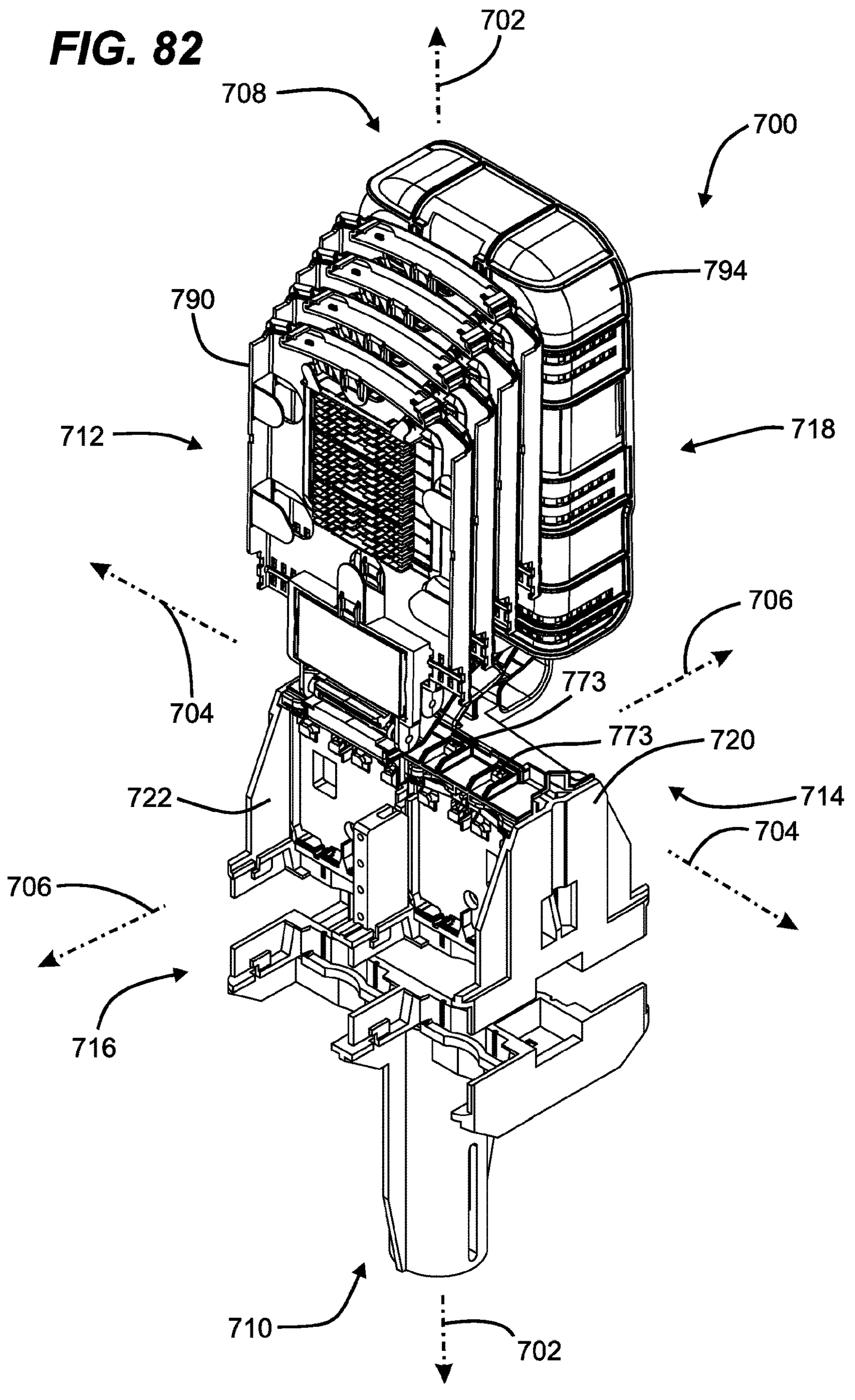
FIG. 82 is a perspective view of a further example optical fiber management assembly according to the present disclosure.
Figure 83:
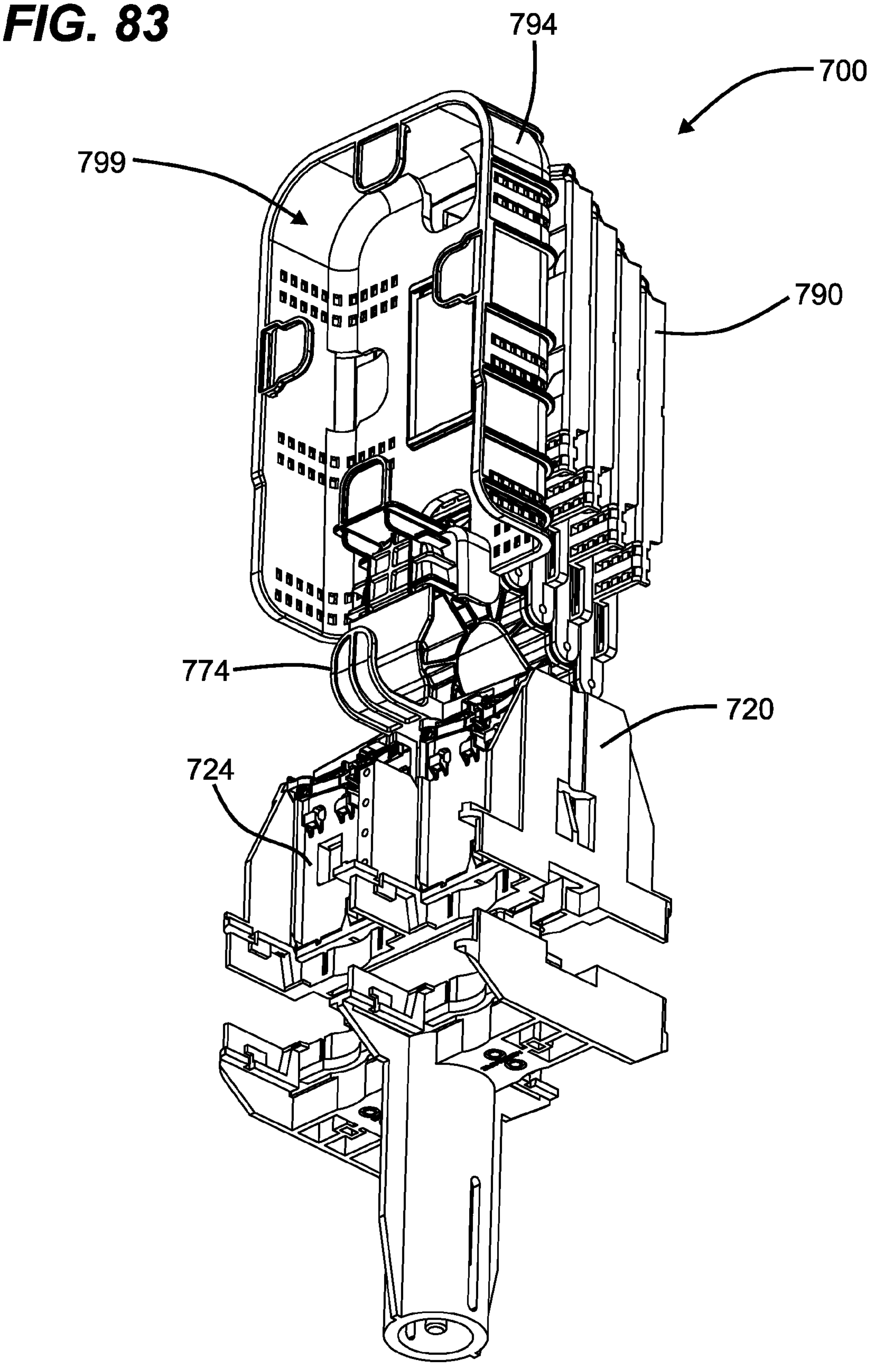
FIG. 83 is a further perspective view of the assembly of FIG. 82.
Figure 84:
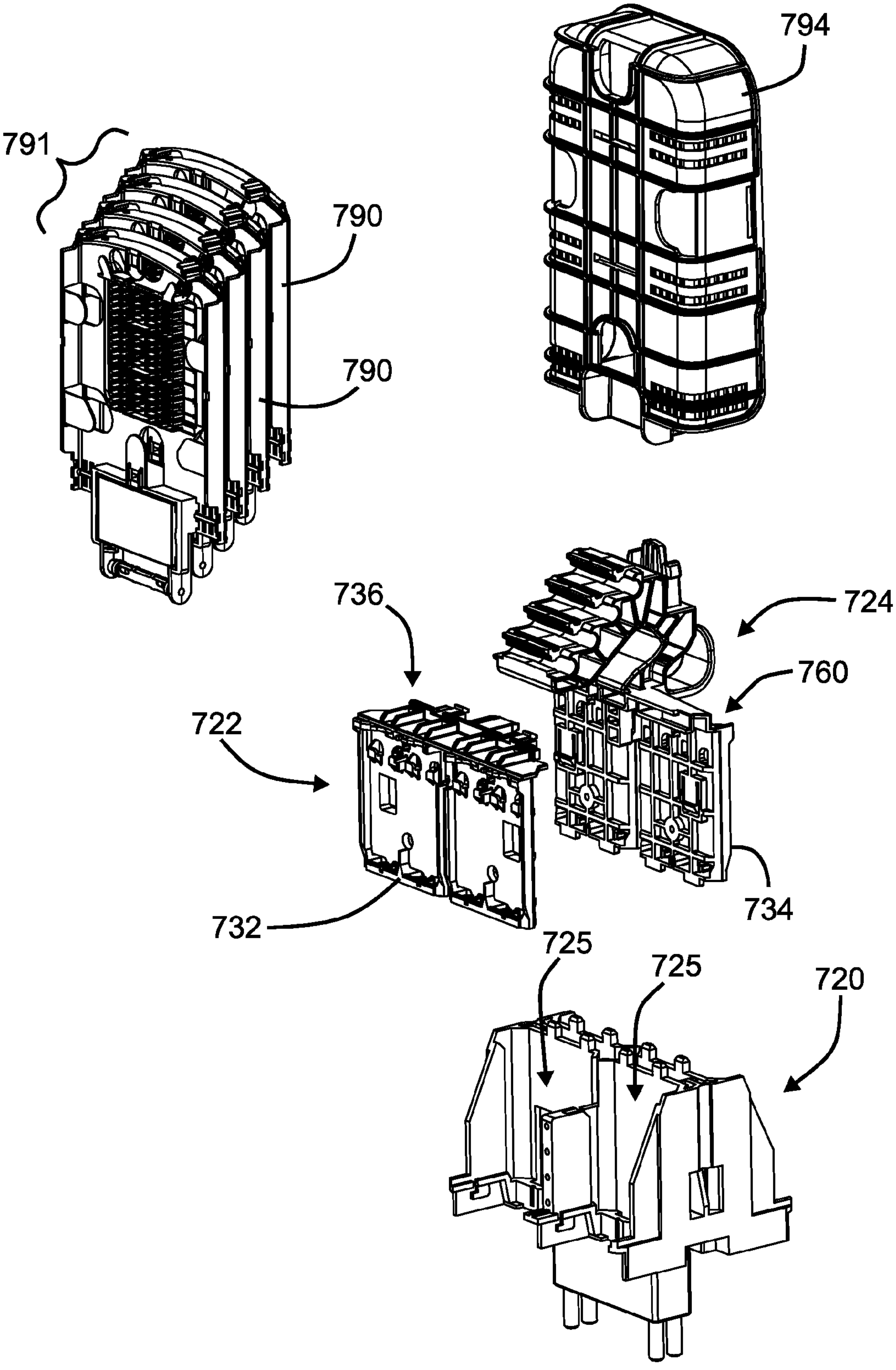
FIG. 84 is an exploded view of a portion of the assembly of FIG. 82.
Figure 85:
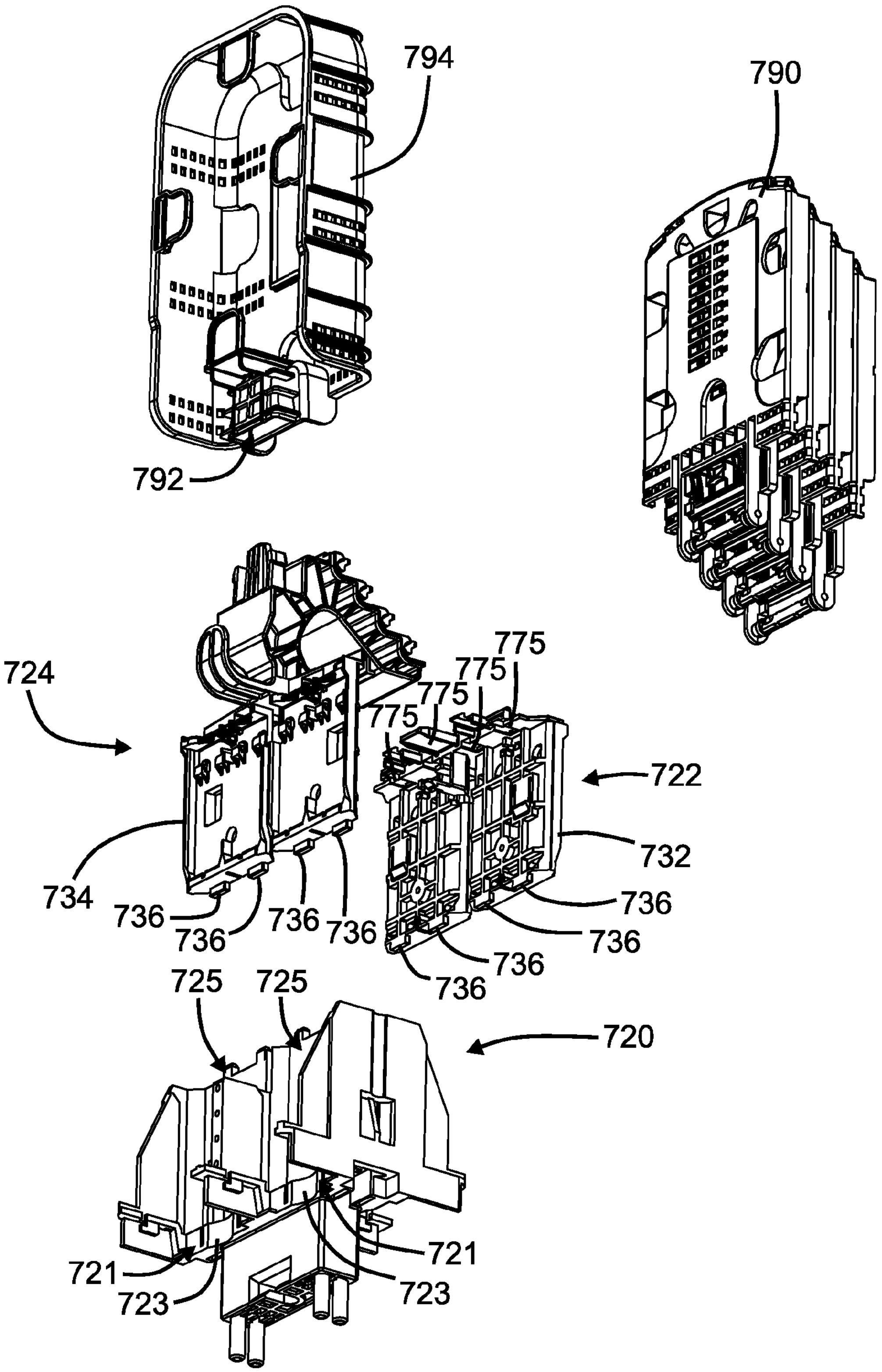
FIG. 85 is a further exploded view of the portion of the assembly of FIG. 84.
Figure 90:
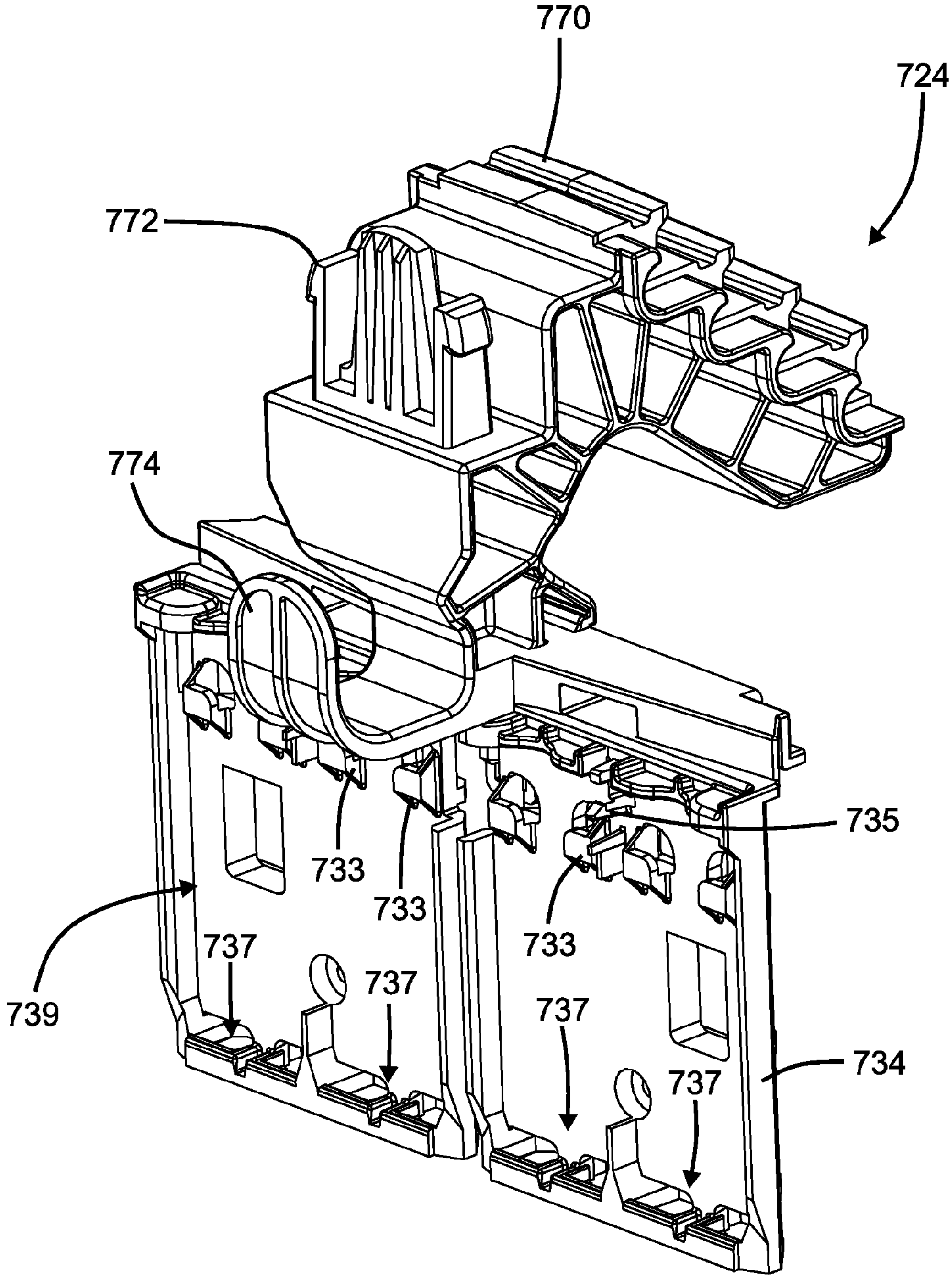
FIG. 90 is a perspective view of a further frame member of the portion of the assembly of FIG. 84.
Figure 91:
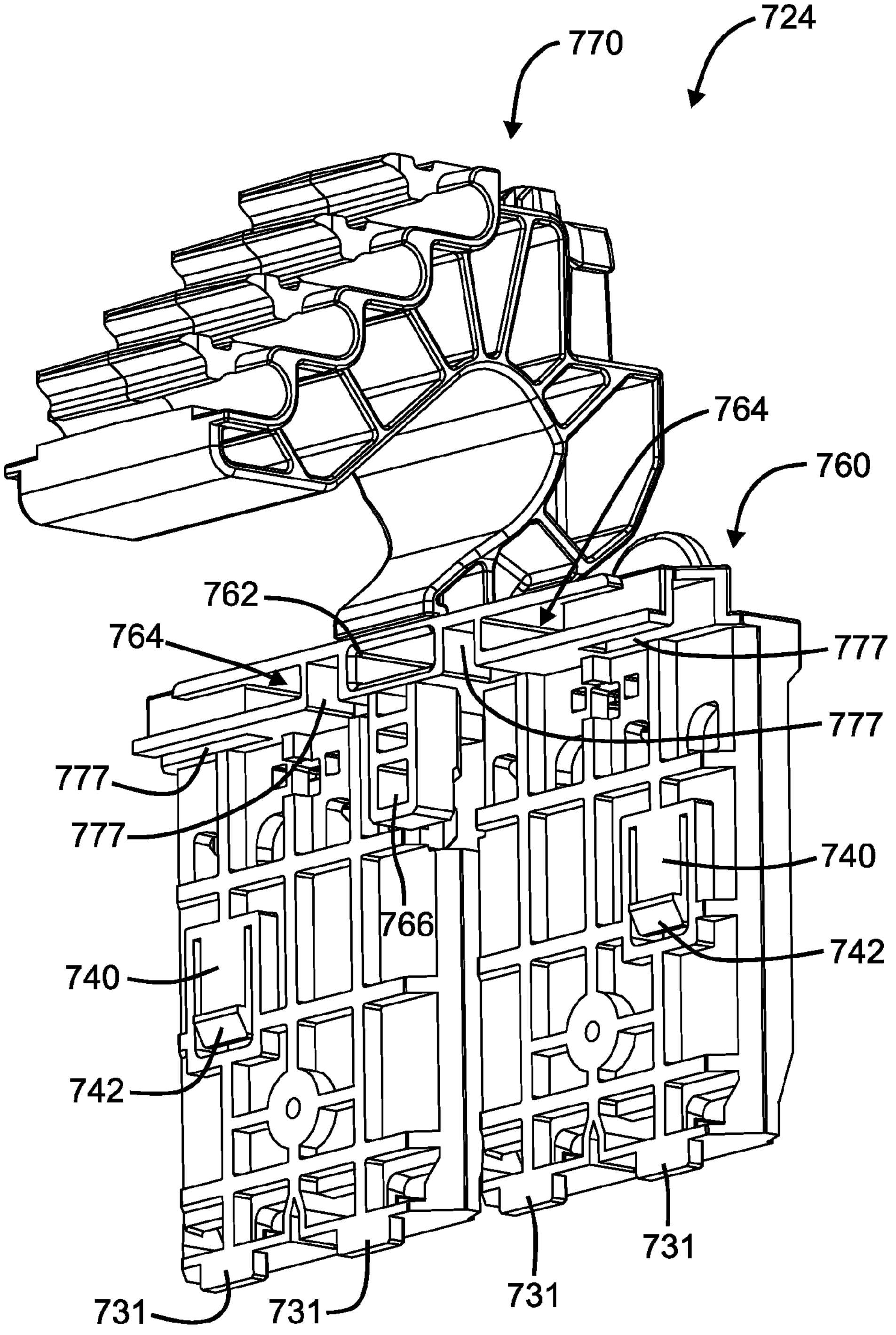
FIG. 91 is a further perspective view of the frame member of FIG. 90.
Figure 92:
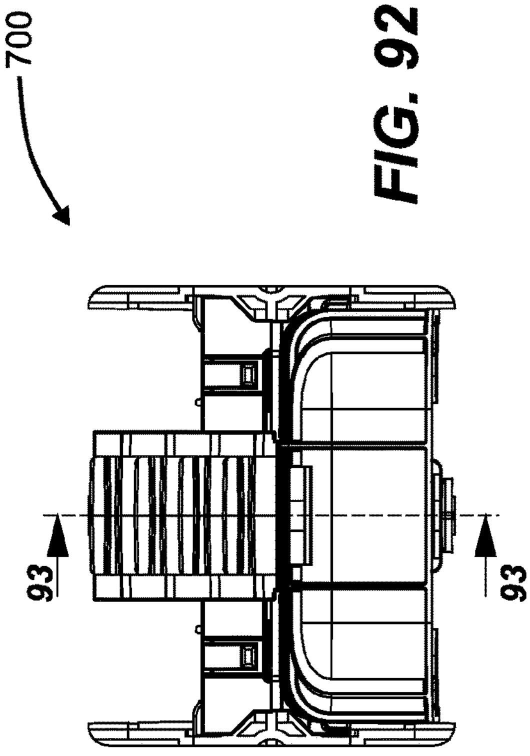
FIG. 92 is an end view of the assembly of FIG. 82.
Figure 93:
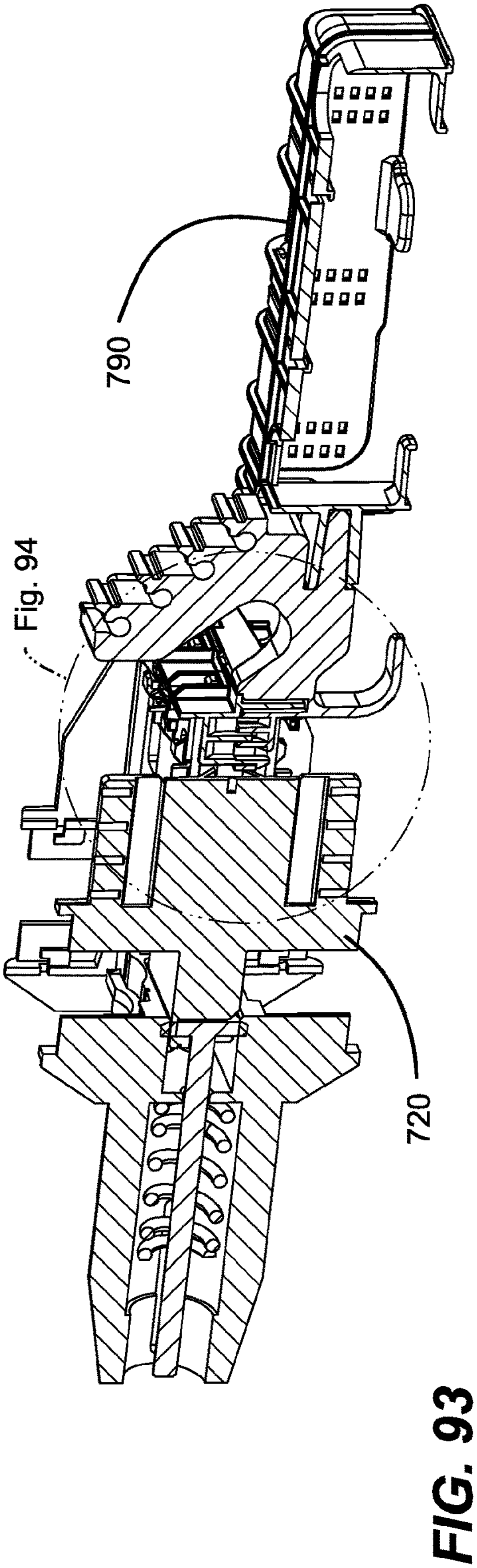
FIG. 93 is a perspective, cross-sectional view of the assembly of FIG. 82 taken along the line 93-93 in FIG. 92.
Figure 94:
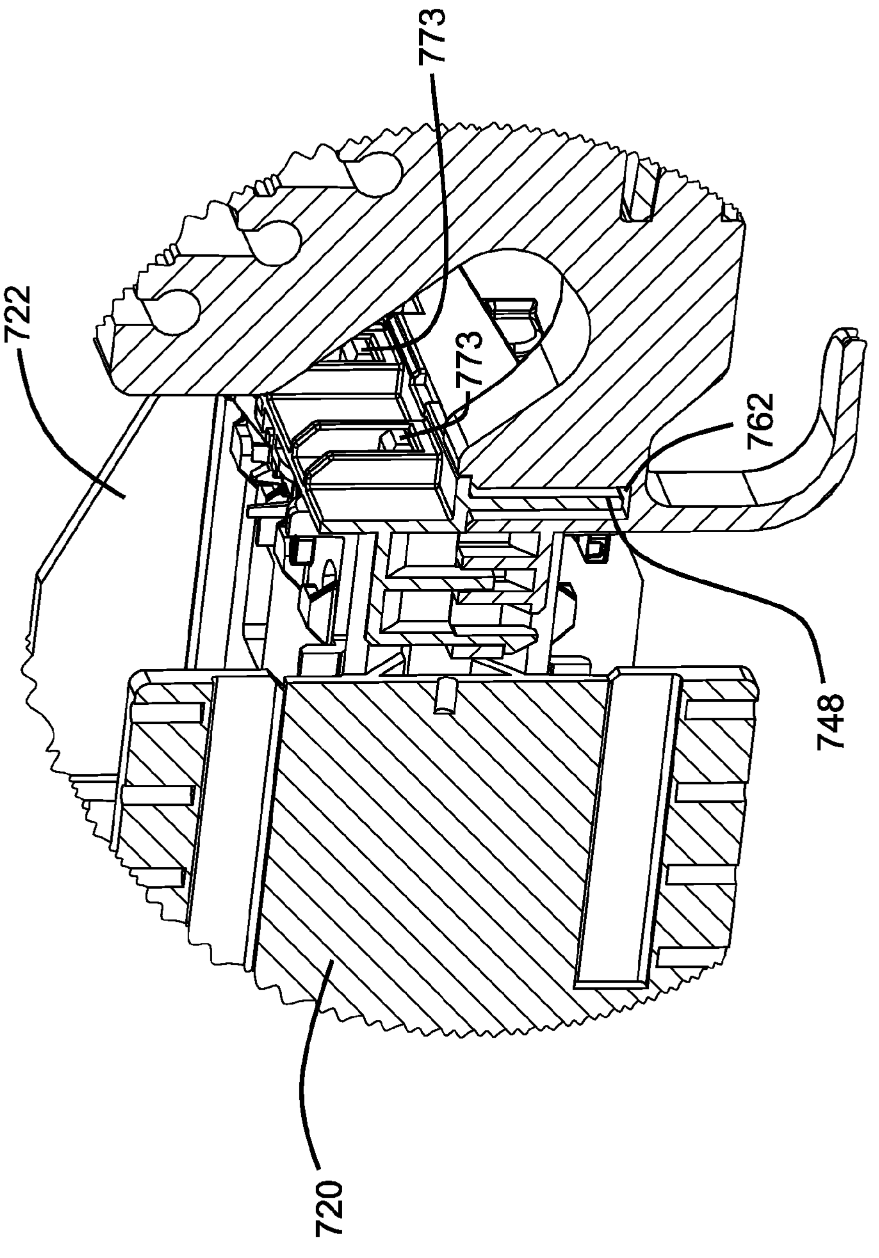
FIG. 94 is an enlarged view of the called-out portion in FIG. 93.
Figure 95:
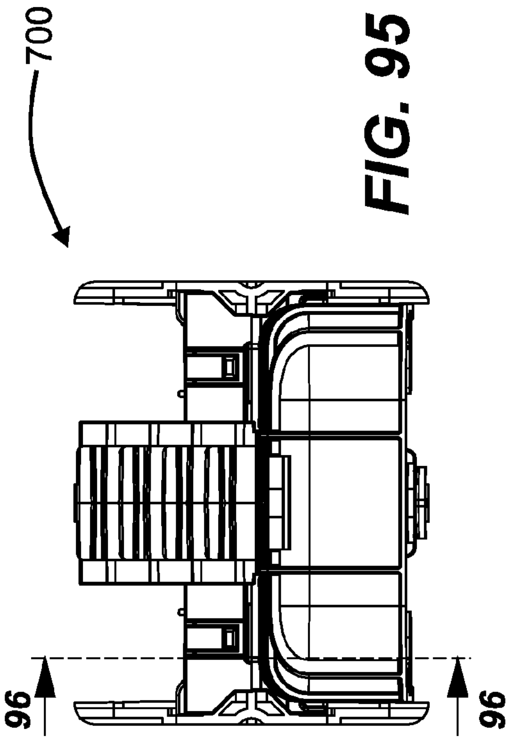
FIG. 95 is an end view of the assembly of FIG. 82.
Figure 96:
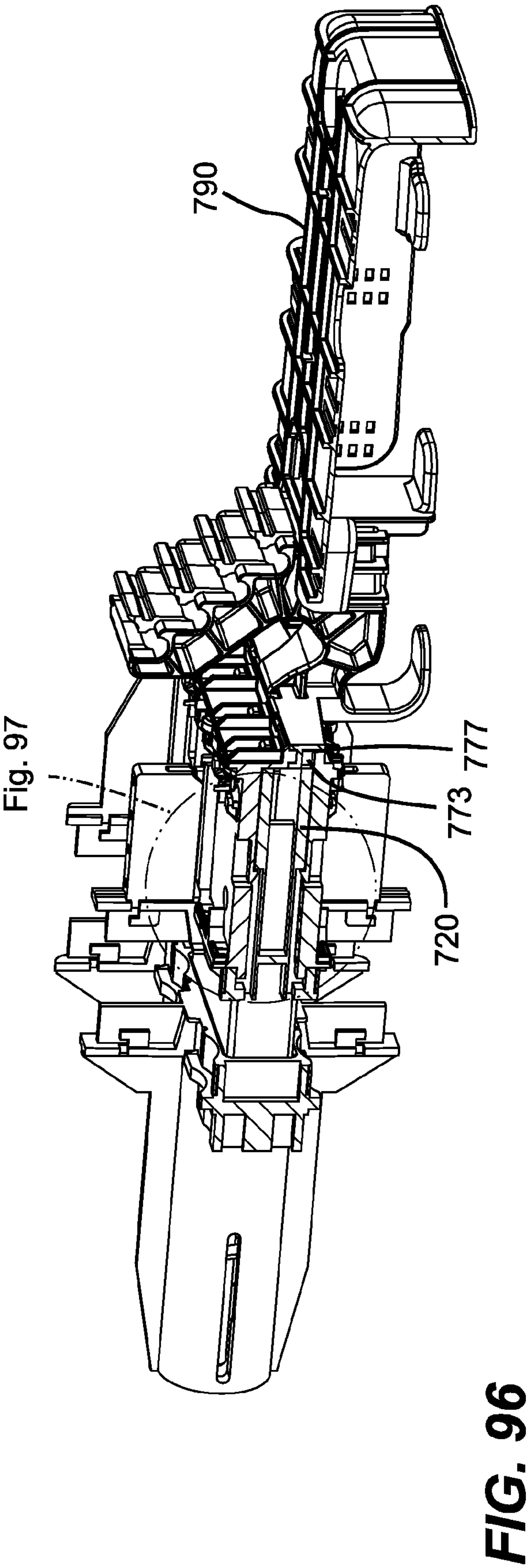
FIG. 96 is a perspective, cross-sectional view of the assembly of FIG. 82 taken along the line 96-96 in FIG. 95.
Figure 97:
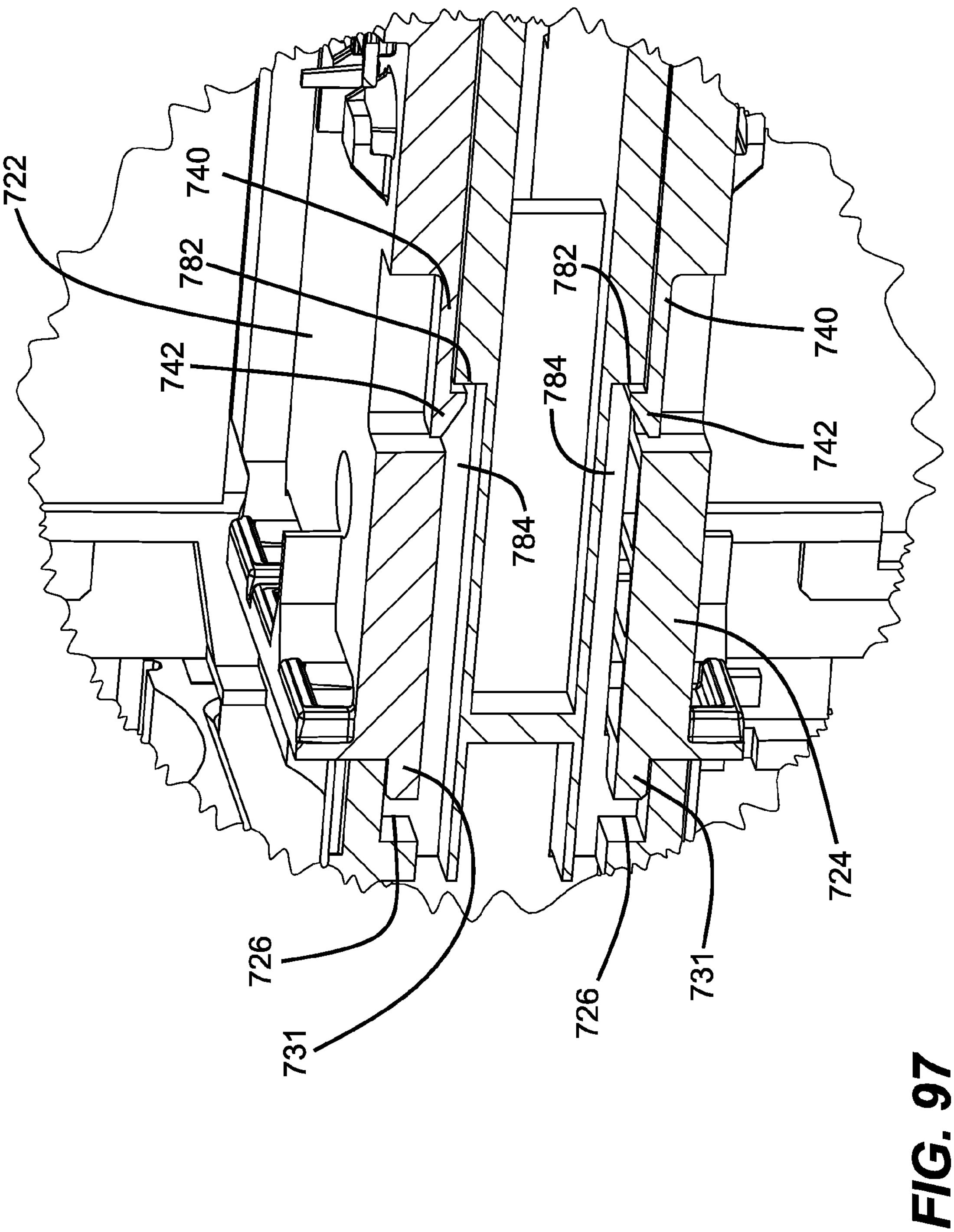
FIG. 97 is an enlarged view of the called-out portion of FIG. 96.

The module body 172 includes hinge pin receivers 174 arranged along the vertical axis. Each hinge pin receiver is configured to lockingly receive one or more pins 173 of a fiber management tray 124 to pivotally mount the tray 124 to the module body 172. When mounted to a hinge pin receiver 174, the hinge pin(s) 173 of the fiber management tray 124 and the hinge pin receiver 174 define a hinge, which defines a pivot axis 176 about which the tray 124 can pivot to provide access to another tray 124 mounted to the stack 123 of modules 122. Each pivot axis 176 is parallel to the axis 104 of the assembly 100 when the tray 124, framework 120, and module 122 are assembled together (e.g., as shown in FIG. 4).

Each tray 124 can include a fiber spooling and routing region 177 and a fiber management region 175. For example, a splitter, splices, fiber connectors and/or adapters for mating two connectors can be mounted in the fiber management region 175. Fiber slack can be stored in the region 177 and guided to the fiber management region 175.

The module 122 defines fiber routing channel structures 178 on opposite sides of the module body 172. Each fiber routing channel structure 178 includes a column of alternating projecting fingers 180 and 181. Due to the shape of the fingers, the fingers 180 and 181 of each channel structure 178 define a partial vertical routing channel 182 for fibers. That is, the partial channels 182 are configured to guide fibers vertically, perpendicular to the pivot axes 176. Gaps between the fingers 180 and 181 allow fibers to selectively enter and exit the partial channel 182, e.g., when being routed to or from a tray mounted to a module 122. Fiber guides 196 and fiber retaining lips 198 projecting from the fiber guides 196 can help guide and retain fibers laterally as they pass through a pair of fingers 180, 181 from the vertical guide channel toward a desired one of the trays 124 mounted to the module 122.

The body 172 includes engagement structures 183 and flexibly resilient catches 184. The engagement structures 183 are T-shaped projections projecting rearwardly from rear surfaces 185 of the module body 172. The catches 184 are configured to flex around fixed ends 186 in a vertical plane.

The module 122 is configured to lockingly, and releasably mount to a pair of uprights 132 and 134. In particular, the interlocking features of the module 122 and the uprights 132 and 134 are configured such that mounting a module to the uprights 132 and 134 can be accomplished without moving the module 122 relative to the uprights 132 and 134 parallel to the axis 104.

Installing modules that support fiber management trays onto a framework and removing such modules from the framework without requiring relative lateral movement parallel to the axis 104 can be advantageous, particularly, e.g., when optical fibers and/or other equipment around the assembly 100 impede or prevent such relative lateral movement.

To install a module 122 on uprights 132 and 134, the T-shaped projection 183 enter and pass through the wide portions of openings 187 defined by the uprights 132 by moving the module 122 parallel to the axis 106. Then, the module 122 is slid downward parallel to the axis 102, such that the T-shaped projections enter the narrow portions of the openings 187, creating a dovetailing effect that interlocks the module 122 and the uprights 132, 134 with respect to downward, side to side, and front-to back movement. The T-shaped projections are small enough to fit through the wide portions 190 of the openings 187 (parallel to the axis 106) and too large to fit through the narrow portions 191 of the openings 187 (parallel to the axis 106).

The downward sliding of the module 122 also causes the catches 184 to flex until they clear and lockingly engage shoulders 188 defined by the uprights 132, 134, thereby locking the module to the uprights 132, 134 with respect upward movement. In addition, due to the interlocking downward motion required to mount a module to uprights 132 and 134, the openings 187 must be oriented in the same direction in both uprights 132 and 134. Consequently, the uprights 132 and 134 are configured as mirror images of each other as described above.

To release and remove a module 122 from the uprights 132, 134, a tool, such as a fiber pick, can be inserted into a notch 189 defined by each upright 132, 134 corresponding to the engaged shoulder 188, and then the pick (or other tool) can be used to flex the catch 184 out of engagement with the shoulder 188. This operation can be performed in sequence, first with respect to one of the uprights 132, 134, and then the other, to fully unlock (to allow upward movement) the module 122 from the uprights 132 and 134. Then the module 122 can be slid upward so that the projections 183 can be removed through the wide portions of the openings 187.

As shown, the uprights 132 and 134 include vertical columns of many of the openings 187, shoulders 188, and corresponding notches 189, allowing for versatility in locations to which a module 122 or stack of modules 122 can be mounted to the uprights 132, 134.

When mounted to the uprights 132 and 134, the module 122, together with the uprights 132 and 134 define two complete vertical fiber routing channels 192. Each fiber routing channel 192 is defined by a fiber routing channel structures 178 and an L-shaped flange 194 of an upright 132, 134. The complete routing channels 192 defined between the structures 178 and the flanges 194 allow optical fibers to be retained in the channels while being routed vertically (up and down) to a desired tray 124 mounted to a desired module 122 in a stack 123 of modules. In addition, a fiber can be routed from one tray to another tray using the complete routing channel 192.

Thus, advantageously, the routing fiber routing channels of the assembly 100 are partially integrally formed with the framework 120 itself, and specifically, integrally formed with the uprights 132, 134.

This configuration for assembling complete modules in multiple components or pieces (e.g., the modules 122 and the uprights 132, 134) can advantageously provide for versatility and interchangeability with respect to the telecommunications equipment and applications that can support the module 122 which defines only partial fiber routing channels. For example, rather than mounting a module 122 to a framework, the module 122 can be mounted to a cabinet, a drawer, a shelf, a rack, a panel, etc., using the same dovetailing interconnectivity described above. In this manner, the module 122 can also be used to create a variety of different fiber routing channel configurations. For example, depending on what the module 122 is mounted to can determine the width of the channel (perpendicular to the vertical direction of the channel) and accessibility to the channel. Wider channels (e.g., provided by differently configured flanges than the L-shaped flanges 194) may be appropriate for routing fibers in certain applications. In other applications, it may be important to have complete side access to the channels (e.g., no blocking flange portion), such that only the partial channel defined by the structures 178 are desired, thereby allowing easy lateral access to fibers within the partial channel. Other applications and variations are possible.

Referring now to FIGS. 17-28, an assembly 200 in accordance with the present disclosure and that can be housed in the closure 10 of FIG. I will be described. In addition, components of the assembly 200 can be installed on or in other telecommunications equipment that are not sealable closures, such as cabinets, panels, drawers, shelves, racks, and so forth.

The assembly 200, as well as individual components of the assembly 200 and various combinations of the components of the assembly 200, can provide one or more advantages in manufacturing cost and efficiency, weight reduction, assembly cost and efficiency, and versatility in using the components of the assembly across different network applications. Additional advantages will be borne out by the present disclosure.

The assembly 200 includes several features and allows several functionalities that are the same as described for the assembly 100. In the interest of brevity, the description of the assembly 200 will focus largely on its differences from the assembly 100. However, it should be appreciated that any of the assemblies 100, 200, 300, 400, 500 can have one or more features that can be incorporated into one or more others of the assemblies.

The assembly 200 defines a first axis, or vertical axis 202, a second axis 204, and a third axis 206. The first axis 202, the second axis 204, and the third axis 206 are mutually perpendicular. The second axis 204 and the third axis 206 define a horizontal plane. The assembly 200 extends from a top 208 to a bottom 210 along the first axis 202. The assembly 200 extends from a first side 212 to a second side 214 along the second axis 204. The assembly 200 extends from a front 216 to a back 218 along the third axis 206.

The assembly 200 includes a framework 220 consisting of a number of frame members.

The assembly 200 also includes front and back stacks 123 of fiber management tray support modules 122. The stacks 123 are back-to-back mounted to the framework 220 as described with respect to the assembly 100.

In some examples, the framework 220 can be added to along the vertical axis 202 to accommodate additional modules 122.

The framework 220 includes a bottom member 226, a top assembly 227 including two outer top members 228 and an inner top member 229. The inner top member 229 can be dispensed with when a vertical slot (like the slot 199 described above) is desired to pass fibers through and into the storage volume 260 defined by the framework 220. Thus, for example, when the framework 220 is grown vertically, the inner top member 229 can be removed.

When the framework 220 has the proportions depicted, the inner top member 229 can be snappingly connected to the outer top members 228 to provide additional structural integrity and strength to the framework 220. To connect the inner top member 229 to the outer top members 228, the inner top member 229 is slid vertically downward between the outer top members 228 until downward and lateral motion stops 291 of the inner top member 229 engage blocks 249 positioned in slots 241 of the outer top members 228, additional downward and lateral motion stops 293 of the inner top member engage recessed blocks 243 of the outer top members 228, and the catches 295 of flexibly resilient latch arms 297 of the inner top member 229 snappingly enter openings 245 defined by the outer top members 228, causing the catches 295 to engage shoulders 261 defined by the outer top members 228, thereby locking the inner top member 229 relative to the outer top members 228 with respect the upward direction. The outer top members 228 include recessed ramps 263 to help guide the catches 295 and flex the latch arms 297 when inserting the inner top member 229 between the outer top members 228, until the catches 295 find the openings 245. To remove the inner top member 229, the latch arms 297 can be flexed to disengage the catches 295 from the shoulders 261, and then the inner top member 229 can be slid upward and removed from between the outer top members 228.

The framework 220 also includes two side members (or uprights) 232 having a first upright configuration, and two side members (or uprights) 234 having a second upright configuration.

The framework 220 does not include corner members in the depicted example.

When assembled in the framework 220, each stack 123 of modules 122 is mounted to a pair of uprights, including one of the uprights 232 and one of the uprights 234. In particular, there is a front pair of uprights 232 and 234, and a back pair of uprights 232 and 234. In the assembled framework configuration, in each such pair of uprights, the upright 232 is a mirror image of the upright 234 about a vertical plane defined by the axes 202 and 206.

The framework 220 includes spacer members 240. Each spacer member 240 is configured to couple to one of the uprights of the front pair of uprights and, on the same side of the assembly, to one of the uprights of the of the back pair. Thus, each spacer member 240 is configured to couple to an upright 232 and an upright 234, and thereby couple those two uprights to each other. The spacer members 240 can help to maintain a spacing between the pairs of uprights, while providing additional structural support to the framework 220.

Each of the components of the framework 220 just described can be constructed from a suitably strong and rigid material. For example, one or more of the components can be constructed from a polymeric material and/or one or more of the components can be constructed from a metal material, such as aluminum or steel.

In one example, the bottom member 226 is constructed of a metal material (e.g., aluminum), and the top members 228, 229, the uprights 232, 234 and the spacer members 240 are constructed (e.g., are molded parts) of a polymeric material. Constructing those components of a polymeric material can provide for a lighter weight framework that is easier to assemble and handle, while constructing the bottom member 226 can impart additional strength and structural integrity to the framework 220.

For example, plastic parts can be molded to include convenient snapping connector features, such as the snappability of the top members 228 and 229 described above. In addition, the spacer members 240, for instance, are configured to snappingly mount to the uprights 232 and 234.

Meanwhile, for improved structural integrity and strength, to attach the bottom member 226 and the outer top members 228 to the uprights 232, 234, in this example, a staking operation can be performed. Specifically, the uprights 232, 234 include posts 250. Pre-staking, each post projects from an upright 232, 234 in an elongate dimension of the post 250 parallel to the axis 204. The posts 250 are inserted in holes 248 of the outer top frame members 228 or holes 157 of the bottom frame member 226. The posts 250 are then staked to securely connect the uprights 232, 234 to the top frame members 228 and the bottom frame member 226. Staking can be performed, e.g., with heat (thermal staking), mechanical means (e.g., applying pressure with a tool or staking device), or with a combination of heat and mechanical pressure. An example of a stake post-staking operation is depicted as staked post 250*a*, in which a staking operation has caused deformation of the stake into a rounded head that is larger than the hole through which the stake had been inserted.

For additional strength at the connection between the outer top members 228 and the upright 232, 234, T-shaped projections 277 of the uprights 232, 234 are inserted (substantially parallel to the axis 206) into the wide portions of the openings 247 defined by the outer top frame members 228, and then laterally (substantially parallel to the axis 204) slid within the openings 247 in a dovetailing locking fashion similar to the dovetail interlocking described above. At this point, a staking operation can be performed as described above to fully connect the uprights 232, 234 to the outer top frame members 228.

For additional strength at the connection between the bottom frame member 226 and the uprights 232, 234, T-shaped projections 270 of the uprights 232, 234 are inserted (substantially parallel to the axis 206) into the wide portions of the openings 274 defined by the bottom frame member 226, and then laterally (substantially parallel to the axis 204) slid within the openings 274 in a dovetailing interlocking fashion similar to the dovetail interlocking described above. Once the T-shaped projections adequately enter the narrow regions of the openings 274 upon lateral sliding, flex arms 272 of the uprights 232, 234 snap into openings 276 defined by the bottom frame member 226, thereby laterally locking the uprights 232, 234 to the bottom frame member 226. At this point, a staking operation can be performed as described above to fully connect the uprights 232, 234 to the bottom frame member 226.

The spacer members 240 ensure that the shape and size of the storage volume 260 is maintained by providing additional connectivity at fixed spacing between front and back uprights. Each spacer member 240 connects one of the front uprights 232, 234 to the other of the back uprights 234, 232. Locking and unlocking a spacer member 240 to uprights 232, 234 is similar to the locking and unlocking of the corner members 230 described above.

The spacer member 240 functions similarly to the spacer member 140 described above, but has somewhat different configuration.

Each spacer member 240 includes two flexibly resilient latch arms 262. Each latch arm 262 includes front and back catches 264. Each catch 264 includes a ramp 266 to facilitate insertion of the spacer member 240 between an upright 232 and an upright 234, causing the latch arms 262 to flex inward (toward each other) until the catches 264 find the recesses 268 defined by the uprights 232, 234, at which point the latch arms 262 resiliently return to their unflexed configured and the catches 264 snap over shoulders 269 defined by the uprights 232, 234 and snappingly engage the recesses 268, thereby locking the spacer member 240 to the uprights 232 and 234. Each recess 268 includes a narrow neck region 265 defined by the shoulders 269, and a wider region 267 into which the catches 264 are snappingly released once they clear the neck region 265.

To unlock and remove a spacer member 240 from the uprights 232 and 234, the latch arms 262 can be flexed toward each other (e.g., with fingers or a tool) within a cavity 271 defined by a body of the spacer member 240, parallel to the axis 202, to allow the catches 264 to be extracted from the recesses 268 through the neck regions 265, and thereby allow the catches 264 to clear the shoulders 269.

Referring now to FIGS. 29-34, an assembly 300 in accordance with the present disclosure and that can be housed in the closure 10 of FIG. 1 will be described. In addition, components of the assembly 300 can be installed on or in other telecommunications equipment that are not sealable closures, such as cabinets, panels, drawers, shelves, racks and so forth.

The assembly 300, as well as individual components of the assembly 300 and various combinations of the components of the assembly 300, can provide one or more advantages in manufacturing cost and efficiency, weight reduction, assembly cost and efficiency, and versatility in using the components of the assembly across different network applications. Additional advantages will be borne out by the present disclosure.

The assembly 300 includes several features and allows several functionalities that are the same as described for the assembly 100 and/or the assembly 200. In the interest of brevity, the description of the assembly 300 will focus largely on its differences from the assembly 100 and the assembly 200. However, it should be appreciated that any of the assemblies 100, 200, 300, 400, 500 can have one or more features that can be incorporated into one or more others of the assemblies.

The assembly 300 defines a first axis, or vertical axis 302, a second axis 304, and a third axis 306. The first axis 302, the second axis 304, and the third axis 306 are mutually perpendicular. The second axis 304 and the third axis 306 define a horizontal plane. The assembly 300 extends from a top 308 to a bottom 310 along the first axis 302. The assembly 300 extends from a first side 312 to a second side 314 along the second axis 304. The assembly 300 extends from a front 316 to a back 318 along the third axis 306.

The assembly 300 includes a framework 320 consisting of a number of frame members.

The assembly 300 also includes front and back stacks 123 of fiber management tray support modules 122. The stacks 123 are back-to-back mounted to the framework 220 as described with respect to the assembly 100.

In some examples, the framework 320 can be added to along the vertical axis 302 to accommodate additional modules 122.

The framework 320 includes a bottom member 326 and a top assembly 327 including two outer top members 328 and an inner top member 329. The inner top member 329 can be dispensed with when a vertical slot (like the slot 199 described above) is desired to pass fibers through into the storage volume 360 defined by the framework 320. Thus, for instance, when the framework 320 is grown vertically, the inner top member 329 can be removed.

When the framework 320 is the size depicted, the inner top member 329 can be snappingly connected to the outer top members 328 to provide additional structural integrity and strength to the framework 320. Locking the inner top member 329 to the outer top members 328 can be performed in much the same manner as locking the inner top member 229 to the outer top members 228 as described above, in that the top members 328 and 329 include like interlocking features to those of the top members 228 and 229, as shown in, e.g., FIGS. 31 and 32.

The framework 320 also includes two side members (or uprights) 332 having a first upright configuration, and two side members (or uprights) 334 having a second upright configuration.

The framework 320 does not include corner members in the depicted example.

When assembled in the framework 320, each stack 123 of modules 122 is mounted to a pair of uprights, including one of the uprights 332 and one of the uprights 334. In particular, there is a front pair of uprights 332 and 334, and a back pair of uprights 332 and 334. In the assembled framework configuration, in each such pair of uprights, the upright 332 is a mirror image of the upright 334 about a vertical plane defined by the axes 302 and 306.

The framework 320 includes spacer members 340, which function the same way as the spacer members 140 of the assembly 100 described above.

Each of the components of the framework 320 just described can be constructed from a suitably strong and rigid material. For example, one or more of the components can be constructed from a polymeric material and/or one or more of the components can be constructed from a metal material, such as aluminum or steel.

In one example, the bottom member 326 is constructed of a metal material (e.g., aluminum), and the top members 328, 329, the uprights 332, 334 and the spacer members 340 are constructed (e.g., molded parts) of a polymeric material. Constructing those components of a polymeric material can provide for a lighter weight framework that is easier to assemble and handle, while constructing the bottom member 326 can impart additional strength and structural integrity to the framework 320.

For example, plastic parts can be molded to include convenient snapping connector features, such as the snappability of the top members 328 and 329 described above, as well as the spacer members 140 to the uprights 332, 334.

Meanwhile, for improved structural integrity and strength, to attach the bottom member 326 and the outer top members 328 to the uprights 332, 334, in this example a robust snapping connection can be accommodated. Multiple snapping engagement points between frame members provide a robust connection between the frame members. Meanwhile, the snappability provides a simple and convenient framework assembly method that does not require additional tools unlike, for example, riveting and staking. That is, the framework 320 advantageously can be assembled entirely by hand, without additional tools (such as a riveting tool or a staking tool). Furthermore, the snapping connections, unlike rivetted or staked connections, can be reversed without destroying the frame members. Thus, the framework 320 advantageously allows for dismantling and rebuilding of the framework 320 reusing the same frame members and without damaging the frame members.

Specifically, the uprights 332, 334 include openings 370, T-shaped projections (projecting parallel to the axis 306) 372, flex arms 374, and posts 376.

For a robust, reversable snapping connection between the bottom frame member 326 and the uprights 332, 334, T-shaped projections 372 of the uprights 332, 334 are inserted (substantially parallel to the axis 306) into the wide portions of the openings 378 defined by the bottom frame member 326, and then laterally (substantially parallel to the axis 304) slid within the openings 378 in a dovetailing locking fashion similar to the dovetail interlocking described above. Once the T-shaped projections adequately enter the narrow regions of the openings 378 upon lateral sliding, the flex arms 374 of the uprights 332, 334 snap into openings 380 defined by the bottom frame member 326, thereby laterally locking the uprights 332, 334 to the bottom frame member 326.

For additional stability, posts 376 of the uprights 332 334, are inserted in holes 382 of flanges 384 of the bottom frame member 326. The inclusion of the posts 376 and two dovetailing interlocks between each of the uprights 332, 334 and the bottom member 326 can provide a sufficiently strong connection, even without riveting, staking, or using other forms of permanent or semi-permanent fasteners.

For a robust, reversable snapping connection between the outer top members 328 and the uprights 332, 334, resiliently flexible latch arms 390 of the outer top members 328 snap into openings 370 of the uprights 332, 334, thereby locking outer top members 328 relative to the uprights 332, 334 with respect to the downward direction and side to side directions. Meanwhile, upper stops 393 of the outer top members 328 positioned above the latch arms 390 lock the outer top members 328 relative to the uprights 332, 334 with respect to the upward direction. In addition, edges of the uprights 332, 334 slide into grooves 399 positioned on opposite lateral sides of each latch arm 390. Interfacing between the uprights 332, 334 and the grooves 399 locks the outer top members 328 relative to the uprights 332, 334 with respect to front or back motion (parallel to the axis 306).

Referring now to FIGS. 35-45, an assembly 400 in accordance with the present disclosure and that can be housed in the closure 10 of FIG. I will be described. In addition, components of the assembly 400 can be installed on or in other telecommunications equipment that are not sealable closures, such as cabinets, panels, drawers, shelves, and so forth.

The assembly 400, as well as individual components of the assembly 400 and various combinations of the components of the assembly 400, can provide one or more advantages in manufacturing cost and efficiency, weight reduction, assembly cost and efficiency, and versatility in using the components of the assembly across different network applications. Additional advantages will be borne out by the following disclosure.

The assembly 400 defines a first axis, or vertical axis 402, a second axis 404, and a third axis 406. The first axis 402, the second axis 404, and the third axis 406 are mutually perpendicular. The second axis 404 and the third axis 406 define a horizontal plane. The assembly 400 extends from a top 408 to a bottom 410 along the first axis 402. The assembly 400 extends from a first side 412 to a second side 414 along the second axis 404. The assembly 400 extends from a front 416 to a back 418 along the third axis 406.

The assembly 400 includes a framework 420 consisting of a number of frame members.

The assembly 400 also includes a front stack (or both front and back stacks) 423 of fiber management tray support modules 422*a*, 422*b*, 422*c* (collectively 422). If a front stack and a back stack are used, the stacks are back-to-back mounted to the framework 420. Each stack 423 includes a selectable number of modules 422 stacked along a stacking axis 425 of the stack 423 when mounted to the framework 420. In the example shown, each stack 423 includes four modules 422, including two modules 422*c*, and one each of a module 422*a* and 422*b*. In other examples, 0, 1, 2, 3, or more than 4 modules can be in any stack 423, depending on the desired vertical height of the framework 420 and the number of fiber management trays desired to manage fibers at the assembly 400.

In some examples, the framework 420 can be added to along the vertical axis 402 to accommodate additional modules 422. For example, additional frame members can be added to the framework 420 to grow the framework 420 along the vertical axis 402.

The framework 420 includes a bottom member 426, a top member 428, and four side members (or uprights) 432 and 434, including two uprights 432 and two uprights 434. In some examples, the uprights can be of identical construction, though this is not a requirement. With respect to manufacturing the components of the framework 420, having identically constructed parts, such as the uprights, can advantageously reduce cost.

When assembled in the framework 420, each stack 423 of modules 422 is mounted to a pair of the uprights 432 and 434. In this example, the uprights 432 and 434 are mirror images of each other.

Each of the components of the framework 420 just described can be constructed from a suitably strong and rigid material. For example, one or more of the components can be constructed from a polymeric material and/or one or more of the components can be constructed from a metal material, such as aluminum or steel.

In one example, the bottom member 426 and the top member 428 are constructed of a metal material (e.g., aluminum), and the uprights 434 are constructed (e.g., molded parts) of a polymeric material. Constructing those components of a polymeric material can provide for a lighter weight framework that is easier to assemble and handle, while constructing the bottom member 426 and the top member 428 from metal can impart additional strength and structural integrity to the framework 420. Alternatively, the top member 428 can be constructed of a polymeric material, such that only the bottom member 426 is constructed from metal.

To attach the bottom member 426 and the top member 428 to the uprights 432 and 434, in this example, fasteners (such as rivets) can be used, in a manner similar to that described above with respect to the framework 120, with rivets or other fasteners being driven into corresponding holes of an upright 432, 434 and the top member 428 or bottom member 426.

A storage volume 460 defined by the framework 420 can be used to store loops of optical fibers and/or portions of such loops, as described above with respect to the storage volume 160.

The modules 422 and uprights 432, 434 are designed for simple and convenient reversable interconnectivity to mount the modules to the uprights 432, 434 of the framework 420. In some examples, advantageously the modules 422 can be fully lockingly mounted to the uprights 432 in a single motion that moves a module 422*a*, 422*b*, 422*c* parallel to the axis 406, without requiring movement parallel to the axis 404 or the axis 402.

Each module 422*a*, 422*b*, 422*c* includes a module body 472*a*, 472*b*, 472*c*. The module 422*a*, 422*b*, 422*c* can be described as a module piece of a larger module that consists of the module piece 422*a*, 422*b*, 422*c* and one or more other module pieces. For example, a complete module can be formed by mounting the module 422*a*, 422*b*, 422*c* to the front pair or the back pair of uprights 432, 434.

Though not shown, the module body 472*a*, 472*b*, 472*c* can include hinge pin receivers arranged along the vertical axis, such as the hinge pin receivers 174 described above. Each such hinge pin receiver can function as described above to pivotally mount a fiber management tray (such as the tray 124 described above) about a pivot axis that is parallel to the axis 404 of the assembly 400 when the tray, framework 420, and module 422*a*, 422*b*, 422*c* are assembled together.

The module 422*a*, 422*b*, 422*c* defines fiber routing channel structures 478*a*, 478*b*, 478*c* on opposite sides of the module body 472*a*, 472*b*, 472*c*. Each fiber routing channel structure includes a column of alternating projecting fingers 480 and 481. Due to the shape of the fingers, the fingers 480 and 481 of each channel structure 478*a*, 478*b*, 478*c* define a partial vertical routing channel for fibers. That is, the partial channels are configured to guide fibers vertically. Gaps between the fingers 480 and 481 allow fibers to selectively enter and exit the partial channel, e.g., when being routed to or from a tray mounted to a module 422*a*, 422*b*, 422*c*. Fiber guides 496 and fiber retaining lips 498 projecting from the fiber guides 496 can help guide and retain fibers laterally as they pass through a pair of fingers 480, 481 from the vertical guide channel toward a desired tray mounted to a module 422*a*, 422*b*, 422*c*.

The body 472*a*, 472*b*, 472*c* includes engagement structures. The engagement structures include flexibility resilient latch arms 440 with catches 442.

The latch arms 440 are integrally formed with round, rectangular or rounded oblong (e.g., oval, racetrack shape) vertical stabilizing members 444 that can pivot forward and backward about a fixed end 446. Each stabilizing member 444 projects into an opening 448 defined by the body 472*a*, 472*b*, 472*c* that is sized to accommodate the stabilizing members 444. The body 472*a*, 472*b*, 472*c* defines additional openings 450, 452 that are aligned parallel to the axis 406 with the openings 448. The openings 450, 452 are configured to accommodate engagement tabs of the uprights 432, 434 that are not used to lock to the stabilizing members 444, depending on the selected mounted position of the module 422*a*, 422*b*, 422*c* to the uprights 432, 434.

Each upright 432, 434 includes engagement structures that complement the engagement structures of the modules 422*a*, 422*b*, 422*c*. The engagement structures of each upright 432, 434 includes tabs 454. The tabs 454 are arranged in a vertical column of vertically opposing pairs 456. In some examples, a single tab 454 (without a vertically opposing pair) is positioned at the top of the column and the bottom of the column. The large number of tabs and pairs of tabs allows for versatility in mounting modules at different vertical positions to the uprights 432 and 434.

In each pair 456 of tabs 454, a finger 458 projects parallel to the axis 404 from one of the tabs 454.

To mount the modules 422*a*, 422*b*, 422*c* to a pair of uprights 432, 434 (as shown mounted in FIG. 35) a single motion of a module 422*a*, 422*b*, 422*c* parallel to the axis 406 causes the stabilizing members 444 to flex about their fixed ends 446, which allows the catches 442 to clear and then snappingly engage the fingers 458 of the pair 456 of tabs 454 that have been received in the stabilizing member 444. The additional openings 450, 452 accommodate other tabs 454 to allow the stabilizing members 444 to fully engage the uprights 432, 434. Thus, the additional openings 450, 452 are spaced in a corresponding manner to the spacing of the tabs 454 in a column of tabs. The additional openings (or holes) 452 are configured to each accommodate a single tab 454, while the additional openings (or holes) 450 are configured to accommodate a pair 456 of tabs 454.

The three modules 422*a*, 422*b*, 422*c* differ in their vertical sizes, and thereby the number of fiber management trays that can pivotally mount to them. The different size modules can be selected in any desired combination for the assembly 400 depending on the fiber management needs. Each module 422*a*, 422*b*, 422*c* includes at least one stabilizing member 444 on each side so that the module can mount to a pair of uprights 432 and 434. The stabilizing members 444 can be vertically staggered on the opposing sides to maximize connection stability to the uprights while minimizing the number of stabilizing members 444 required for each module. Thus, the two sides of a module 422*a*, 422*b*, 422*c* can have different numbers of stabilizing members, and they can either be aligned or not aligned (e.g., staggered) relative to the axis 404. For example, the module 422*b* is larger than the module 422*a*, and includes a single stabilizing member 444 on each side in a staggered arrangement. The module 422*c* is larger still than the module 422*b*, and includes two stabilizing members 444 on one side and one on the other side, in a staggered arrangement.

As described, the modules 422 are configured to lockingly, and releasably mount to a pair of uprights 432 and 434 with interlocking features without moving the modules 422 relative to the uprights 432 and 434 parallel to the axis 404. Installing modules that support fiber management trays onto a framework and removing such modules from the framework without requiring relative lateral movement parallel to the axis 404 can be advantageous, particularly when optical fibers and/or other equipment around the assembly 400 impede or prevent such relative lateral movement.

In addition, the modules 422 are configured to lockingly, and releasably mount to a pair of uprights 432 and 434 with interlocking features without moving the modules 422 relative to the uprights 432 and 434 parallel to the axis 402. Installing modules that support fiber management trays onto a framework and removing such modules from the framework without requiring relative vertical movement parallel to the axis 402 can be advantageous, in that a module can be removed and replaced without disturbing modules above and/or below it that are already mounted to the framework 420.

When mounted to the uprights 432 and 434, the modules 422, together with the uprights 432 and 434 define two complete vertical fiber routing channels 492. Each fiber routing channel 492 is defined by a fiber routing channel structures 478 and an L-shaped flange 494 of an upright 432, 434. The complete routing channels 492 defined between the structures 478 and the flanges 494 allow optical fibers to be retained in the channels while being routed vertically (up and down) to a desired tray mounted to a desired module 422*a*, 422*b*, 422*c* in a stack 423 of modules. In addition, a fiber can be routed from one tray to another tray via the complete routing channel 492.

Thus, advantageously, the routing fiber routing channels of the assembly 400 are partially integrally formed with the framework 420 itself, and specifically, integrally formed with the uprights 432, 434.

This configuration for assembling complete modules in multiple components or pieces (e.g., the modules 422 and the uprights 432, 434) can advantageously provide for versatility and interchangeability with respect to the telecommunications equipment and applications that can support the module 422*a*, 422*b*, 422*c* which defines only partial fiber routing channels. For example, rather than mounting a module 422*a*, 422*b*, 422*c* to a framework, the module can be mounted to a cabinet, a drawer, a shelf, a rack, a panel, etc., using the same snapping interconnectivity described above. In this manner, the module 422 can also be used to create a variety of different fiber routing channel configurations. For example, depending on what the module 422*a*, 422*b*, 422*c* is mounted to can determine the width of the channel (perpendicular to the vertical direction of the channel) and accessibility to the channel. Wider channels (e.g., provided by differently configured flanges than the L-shaped flanges 494) may be appropriate for routing fibers in certain applications. In other applications, it may be important to have complete side access to the channels (e.g., no blocking flange portion), such that only the partial channel defined by the structures 478 are desired, thereby allowing easy lateral access to fibers within the partial channel. Other applications and variations are possible.

Referring now to FIGS. 46-52, an assembly 500 in accordance with the present disclosure and that can be housed in the closure 10 of FIG. 1 will be described. The assembly 500 includes module pieces 511 and 513 that allow the module 122 described above to be mounted to traditional uprights 532 of a traditional framework 520 of the fiber management assembly 500. Thus, the module pieces 511 and 513 can serve as adapters that allow the framework 520 to be retrofitted with module pieces 122.

The assembly 500 defines a first axis, or vertical axis 502, a second axis 504, and a third axis 506. The first axis 502, the second axis 504, and the third axis 506 are mutually perpendicular. The second axis 504 and the third axis 506 define a horizontal plane. The assembly 500 extends from a top 508 to a bottom 510 along the first axis 502. The assembly 500 extends from a first side 512 to a second side 514 along the second axis 504. The assembly 500 extends from a front 516 to a back 518 along the third axis 506.

The assembly 500 includes a framework 520 consisting of a number of frame members. The framework 520 can mount stacks of modules that can pivotally support one or more fiber management trays in a back to back arrangement.

The framework 520 includes a bottom member 526, a top member 528, and four side members (or uprights) 532. In this example, the uprights 532 are all of identical construction to one another.

When assembled in the framework 520, each complete module 509 (consisting of a module piece 122 and two module pieces 511 and 513) is mounted to a pair of the uprights 532.

Each of the frame members of the framework 520 just described can be constructed from a suitably strong and rigid material. In one example, all of the frame members can be constructed from a metal material, such as aluminum or steel.

To build a complete module 509, a module piece 122 is interlocked with two module pieces 511. Specifically, the T-shaped projections 183 enter and pass through the wide portions of openings 587 defined by the module pieces 511, 513. Then, the module 122 is slid such that the T-shaped projections 183 enter the narrow portions of the openings 587, creating a dovetailing effect that interlocks the module 122 and the modules 511, 513 with respect to most directions of movement. The T-shaped projections are small enough to fit through the wide portions of the openings 587 and too large to fit through the narrow portions of the openings 587.

The sliding of the module 122 also causes the catches 184 to flex until they clear and lockingly engage shoulders 588 defined by the module pieces 511, 513, thereby locking the module 122 to the module pieces 511, 513 with respect to the reverse sliding direction. It can be appreciated the module 122 can be mounted separately (e.g., sequentially) to each module piece 511, 513.

To release and remove a module piece 122 from each module piece 511, 513, a tool, such as a fiber pick, can be inserted into a notch 589 defined by each module piece 511, 513 corresponding to the engaged shoulder 588, and then the pick (or other tool) can be used to flex the catch 184 out of engagement with the shoulder 588. This operation can be performed in sequence first with respect to one of the module pieces 511, 513, and then the other, allowing the module 122 to be removed from the module pieces 511, 513. Thus, the interlocking and releasing of a module 122 and module pieces 511 and 513 are accomplished in similar fashion to the interlocking and releasing of modules 122 and uprights 132 and 134 described above.

As shown, the uprights 532 include vertical columns of many of the openings 563 567, allowing for versatility in locations to which a complete module 509 can be mounted to the uprights 532.

To mount a complete module 509 to a pair of uprights 532, the posts 559 are inserted into openings 563 of one upright 532. The shorter posts 561 are inserted into the holes 563 in the other upright 532 and the module 509 is pressed parallel to the axis 506 to flex the latch arms 540 of the module pieces 511, 513 until the catches 542 snappingly engage shoulders defined by the openings 565 in the uprights 532, thereby locking the module 509 to the uprights 532. At this point, stabilizing fins 567 of the module piece 511 are also received in openings 565 of the other upright 532. To remove the module 509 from the framework 520, the latch arms 540 are pressed inwardly to disengage the catches 542 from the shoulders defined by the openings 565, allowing the posts 561 to be extracted from the openings 563, and from there, allowing the entire module 509 to be removed from the framework 520.

The complete module 509 defines two complete vertical fiber routing channels 592. Each fiber routing channel 592 is defined by a fiber routing channel structure 178 and an L-shaped flange 594 of a module piece 511, 513. The complete routing channels 592 defined between the structures 178 and the flanges 594 allow optical fibers to be retained in the channels while being routed vertically (up and down) to a desired tray (e.g., a tray 124) mounted to a desired module 122 that is itself mounted to the framework 520. In addition, a fiber can be routed from one tray to another tray using a complete routing channel 592.

Referring now to FIGS. 53-81 an assembly 600 in accordance with the present disclosure and that can be housed in the closure 10 of FIG. 1 or another closure configuration, will be described. In addition, components of the assembly 600 can be installed on or in other telecommunications equipment that are not sealable closures, such as cabinets, panels, drawers, shelves, racks and so forth.

The assembly 600, as well as individual components of the assembly 600 and various combinations of the components of the assembly 600, can provide one or more advantages in manufacturing cost and efficiency, weight reduction, assembly cost and efficiency, and versatility in using the components of the assembly across different network applications. Additional advantages will be borne out by the present disclosure. For example, the components of the assembly 600 are configured to be all snappingly connected to one another, which can dramatically shorten assembly times as compared with, e.g., using staking, rivets, or other fasteners.

The assembly 600 includes several features and allows several functionalities that are the same as described for the assembly 100 and/or the assembly 200, and/or the assembly 300. In the interest of brevity, the description of the assembly 600 will focus largely on its differences from the assemblies 100, 200, and 300. However, it should be appreciated that any of the assemblies 100, 200, 300, 400, 500, 600 can have one or more features that can be incorporated into one or more others of the assemblies.

The assembly 600 defines a first axis, or vertical axis 602, a second axis 604, and a third axis 606. The first axis 602, the second axis 604, and the third axis 606 are mutually perpendicular. The second axis 604 and the third axis 606 define a horizontal plane. The assembly 600 extends from a top 608 to a bottom 610 along the first axis 602. The assembly 600 extends from a first side 612 to a second side 614 along the second axis 604. The assembly 600 extends from a front 616 to a back 618 along the third axis 606.

The assembly 600 includes a framework 620 consisting of a number of frame members.

The assembly 600 also includes front and back stacks 123 of fiber management tray support modules 122. The stacks 123 are back-to-back mounted to the framework 220 as described with respect to the assembly 100. However, in other examples, only one stack of tray support modules is provided on either the front or the back of the framework. In such examples, a fiber loop storage basket can be provided on the other side of the framework.

In some examples, the framework 620 can be added to along the vertical axis 602 to accommodate additional modules 122.

The framework 620 includes a base 626 and a top member 628. The framework 620 also includes two side members (also referred to as uprights or module support members) 632 having a first upright configuration, and two side members (also referred to as uprights or module support members) 634 having a second upright configuration.

When assembled in the framework 620, each stack 123 of modules 122 is mounted to a pair of the uprights. In the assembled framework configuration pairs of the uprights are snappingly connected to each other.

The framework 620 includes spacer members 640, which function the same way as the spacer members 140 of the assembly 100 described above.

Each of the components of the framework 620 just described can be constructed from a suitably strong and rigid material that can readily accommodate snappable couplers. For example, all of the components can be constructed from a polymeric material.

The snappability of all of the members of the framework 620 to one another provides a simple and convenient framework assembly method that does not require additional tools unlike, for example, riveting or staking. That is, the framework 620 advantageously can be assembled entirely by hand, without additional tools (such as a riveting tool or a staking tool). Furthermore, the snapping connections, unlike rivetted or staked connections, can be reversed without destroying the frame members. Thus, the framework 620 advantageously allows for dismantling and rebuilding of the framework 620, as well as reusing the same frame members without damaging the frame members.

The uprights 632, 634 include leg portions 660, 661 and module support portions 662, 663 which extend generally upwardly from the leg portions 660, 661. The leg portions 660 and 661 are configured to snappingly connect to each other to form a pair of uprights that can then be snappingly connected to the base 626. The leg portions 660 and 661 are dimensioned such that when they are connected to each other there is a spacing 664 between the module support portions 662 and 663 along the axis 606. The spacing 664 can be spanned by one or more spacer members 640 as described above, which snappingly connect to the uprights 632, 634 to connect the uprights 632, 634 to each other at multiple locations parallel to the axis 602, while maintaining the spacing 664. The spacing 664 can be used, for example, for storing loops of optical fibers between stacks of tray support modules.

The uprights 632, 634 include complementary couplers for snappingly connecting a pair of the uprights 632 and 634 to each other, as well as to the base 626 and to the top member 628. To snappingly couple the leg portions 660 and 661 to each other, flexibly resilient loop tabs 665 of the leg portion 661 flex in order to snappingly receive catches 666 of the leg portion 660. In addition, receivers 668 can receive guides (e.g., posts) 667 in an interference fit. Receipt of the guides 667 by the guide receivers 668 can improve the robustness of the overall assembly by providing additional points of nesting engagement between frame members.

Once a pair of uprights 632 and 634 has been snapped together, the pair can be inserted as a subassembly 639 into snap-connect engagement with the base 626. The couplers include flexibly resilient tabs 650 that have protruding catches 652. When sliding a subassembly of a pair of uprights 632, 634 downward into a pocket 654 defined by the base 626, the resilient tabs 650 flex until the catches 652 snap into corresponding complementary openings 656 defined by the base 626. When sliding a pair of uprights 632, 634 downward into a pocket 654, projecting tapered guides 659 can find correspondingly shaped guide receivers 657. Engagement of the guides 659 by the guide receivers 657 can facilitate proper alignment of uprights 623, 634 when connecting them to the base 626. In addition, receipt of the guides 659 by the guide receivers 657 can improve the robustness of the overall assembly by providing additional points of nesting engagement between frame members.

The guides and guide receivers can facilitate engagement of the catches 652 with shoulders 658 at the edges of the openings 656. Snapping of the catches 652 into the openings 656 connects the pair of uprights 632, 634 to the base 626. The same procedure can be performed with the other pair of uprights 632 and 634.

Once the uprights 632, 634 have been snap-connected to the base 626, or before doing so, two sets of uprights pairs

632 and 634 can be snap-connected to the same top member 628. The top member includes flexibly resilient tabs 670 having projecting catches 671. To connect the top member 628 to the four uprights (two sets upright pairs each including an upright 632 and an upright 634), the tabs 670 slide downward along ramps 672 of the uprights 632, 634, causing the tabs 670 to flex until the catches 671 snappingly connect under shoulders 673 at the bottoms of the ramps 672.

The top member 628 includes unitarily integrated therewith curved extensions 674 that define, at each side (relative to the axis 604) of the top member 628 guide channels 675 for guiding optical fibers externally to the framework and externally to the interior loops storage volume positioned along the axis 606 between stacks of tray support modules. In addition, one or more snap-on fiber guides 676 can be snap-connected to the top of the top member 628 to provide additional fiber routing guidance for fibers or portions of fibers that are being supported by the framework while being routed outside of the framework. The snap-on fiber guide 676 has a body that defines a handle 677 and fiber routing channels 678 on either side of the handle 677.

In addition to the pockets 654 that have the receivers 657 configured to receive the guides 659 and the openings 656 that snappingly receive the catches 652, the base 626 defines pockets 680 positioned on four sides about the axis 602. The pockets 680 are configured differently from the pockets 654. The pockets 680 are configured to receive seal blocks (e.g., blocks of gel) for sealing around cables entering the closure. Such seal blocks can be pressurized (e.g., with a spring mechanism) against the walls 681 of the pockets 680 to form seals around cables entering the enclosure. For example, an actuator can operatively couple directly with the base 626 at an actuator coupling interface 611 to actuate a pressurizing mechanism that pressurizes the seal blocks in the pockets 680. Thus, for a telecommunications closure, the base 626 serves both as part of a cable sealing assembly and as part of a fiber management assembly for the fibers of the cables.

In addition to the pockets 654 and 680, the base 626 includes pockets 679, which are configured differently from the pockets 654 and the pockets 680. The pockets 679 are generally aligned with the pockets 680 parallel to the axis 602. The pockets 679 are configured to slidably receive baseplates 690 for mounting cable jacket fixation units. More specifically, the body of a baseplate 690 is slid downward between a pair of retaining ribs 692 of a pocket 679 and a surface 693 of a pocket 679 until feet projections 694 of the baseplate 690 enter slots 691 defined by the pockets 629. Engagement of the baseplate with the slots 691, the retaining ribs 692 and the surface 693 constrains the baseplate 690 with respect to the base 626 in all directions except upward. Once a fiber routing module 682 is mounted to the framework 620, however, the fiber routing module 682 acts as an upward stop inhibiting upward movement of the baseplate 690 relative to the base 626.

Thus, cables can pass through seal blocks in pockets 680, with end portions of the jackets of the cables fixed to cable jacket fixation units mounted to baseplates 690, which are themselves mounted in pockets 679. Optical fibers from the cables then extend from the fixed end portions of the cables onto a fiber routing module 682 or to another part of the fiber management assembly, such as the loop storage volume between stacks of management tray support modules. In some examples, the fibers extending from the fixed end portions are protected in sheaths or tubes.

The assembly 600 includes two of the fiber routing modules 682. Optionally, if the assembly includes just one vertical stack of fiber management tray supporting modules, then the assembly can include just one fiber routing module 682.

Optionally, covers 613 can be provided to cover and protect the fiber routing modules 682 (and thereby the fibers routed on the fiber routing module). The covers 613 can be configured to snap-connect to the fiber routing modules 682.

Optionally, each fiber routing module 682 includes a body 683 that defines fiber spooling structures 684 and structures 685 for mounting sheath holders 686. Such sheath holders 686 can hold protective sheaths or tubes containing optical fibers extending from cables passing through the seal blocks supported in pockets 680 of the base 626 and fixed to the baseplates 690 as the fibers enter the fiber routing module 682.

Once on the fiber routing module 682, the fibers can emerge from ends of the sheaths and be routed along pathways defined by the routing module 682, including, optionally, about the spooling structures 684, and then up routing channels 615 defined by the uprights 632, 634 and the tray support modules 122 (as described with respect to other assemblies herein) to a specific tray supported by a tray support module, on which the fiber is managed as needed (e.g., with a splice to a fiber of another cable entering the closure, with the splice being held on the tray). In addition, some fibers can remain in the protective sheaths and are routed to the interior loop storage volume between the stacks of the tray support modules. In addition, some fibers can have portions routed exteriorly to the framework 620 through guidance features of the top member 628 as described above.

Each fiber routing module 682 is configured to snappingly connect to both pairs of uprights 632 and 634. In some examples, the fiber routing module 682 is snappingly connected to the framework 620 after the uprights 632, 634 have been snappingly connected to each other and the pairs of uprights have been snappingly connected to the base 626.

To snappingly connect a fiber routing module 682 to a framework 620, the fiber routing module 682 engages the framework 620 by moving it towards the framework 620 horizontally, e.g., parallel to the axis 606, until complementary coupling features of the fiber routing module 682 and the framework 620 engage one another. These coupling features include flexibly resilient tabs 687 and 688 having catches 697 and 698, respectively. The tabs 687 and 688 flex until the catches 697 and 698 snap into notches 689 and openings 699, respectively defined by the uprights 632 and 634 to which the fiber routing module 682 is being connected.

In addition, the fiber routing module 682 includes reinforcement posts 641. The reinforcement posts 641 are positioned to extend into blind cavities 619 through fully enclosed openings 642 defined by the uprights 632 and 634 to which the fiber routing module is being connected. Before entering the blind cavities 619, the reinforcement posts 641 pass through fully enclosed openings 644 defined by the base 626. In some examples, the reinforcement posts 641 can form an interference fit with the uprights 632 and 634 within the openings 642, and an interference fit with the base 626 within the opening 644. In this manner, the routing modules 682 can enhance the stability of the framework 620 by further coupling the uprights 632, 634 to the base 626 via the reinforcement posts 641.

Referring now to FIGS. 82-97, another example of an optical fiber management assembly 700 for a telecommunications closure is shown. The fiber management assembly 700 can be positioned in the interior volume defined by housing pieces of a telecommunications closure in a similar manner to that described with respect to other embodiments of fiber management assemblies described herein. Like other assemblies described herein, the assembly 700 includes several components that conveniently snappingly connect to one another to provide a simply assembled (and disassembled), lightweight, and robust assembly. In some examples, all components of the assembly 700 are constructed of polymeric material that allows for snap-connecting of one component to another.

The assembly 700 defines a first axis, or vertical axis 702, a second axis 704, and a third axis 706. The first axis 702, the second axis 704, and the third axis 706 are mutually perpendicular. The second axis 704 and the third axis 706 define a horizontal plane. The assembly 700 extends from a top 708 to a bottom 710 along the first axis 702. The assembly 700 extends from a first side 712 to a second side 714 along the second axis 704. The assembly 700 extends from a front 716 to a back 718 along the third axis 706.

The assembly includes a base 720 that defines different pockets having different configurations. The base 720 includes pockets 721 that are configured to receive seal blocks for sealing around cables entering the closure. In some examples, the seal blocks can be pressurized against the surfaces 723 of the pockets 721 to form seals around the cables.

The base 720 also includes pockets 725. The pockets 725 are configured to slidably receive baseplate portions 732, 734 of frame members 722, 724. The frame members 722, 724 can be slid downwards until foot projections 731 of the baseplate portions 732, 734 insert into slots 726 at the bottom ends of the pockets 725.

The assembly 700 includes frame members 722 and 724 that snappingly connect to each other, and then snappingly connect to the base 720.

The frame member 722 includes a baseplate portion 732 and a connector portion 736. The baseplate portion 732 includes structures 733, 735, 737 in a cable jacket fixation unit area 739 configured to lockingly mount cable jacket fixation units for fixing the ends of the jackets of cables entering the closure through seal blocks positioned in the pockets 721. Optical fibers extend from the ends of the cable jackets fixed to the baseplate portion 732 and can be managed using other parts of the assembly 700.

On a side of the frame member 722 opposite the cable jacket fixation unit area 739, the frame member 722 includes flexibly resilient tabs 740 having projecting catches 742.

The connector portion 736 includes flexibly resilient tabs 744 having projecting catches 746. The connector portion 736 also includes a projecting guide 748 positioned between the tabs 744. The connector portion 736 also includes pairs of additional reinforcement projections 750 positioned such that each tab 744 is located between one of the pairs of projections 750. The connector portion 736 includes another flexibly resilient tab 752 having a projecting catch 754.

The frame member 724 includes a baseplate portion 734 and a connector portion 760. The baseplate portion 734 includes structures 733, 735, 737 in a cable jacket fixation unit area 739 configured to lockingly mount cable jacket fixation units for fixing the ends of the jackets of cables entering the closure through seal blocks positioned in the pockets 721. Optical fibers extend from the ends of the cable jackets fixed to the baseplate portion 734 and can be managed using other parts of the assembly 700.

On a side of the frame member 724 opposite the cable jacket fixation unit area 739, the frame member 724 includes flexibly resilient tabs 740 having projecting catches 742.

The connector portion 760 includes flexibly resilient tabs 744 having projecting catches 746. The connector portion 760 also includes receivers 762, 764, 766. The receiver 762 can receive (e.g., in an interference fit) the projecting guide 748 of the frame member 724. The receivers 764 can receive the guides 750 and snappingly receive the catches 746 of the tabs 744. The receiver 766 can snappingly receive the catch 754 of the tab 752.

The frame member 724 also includes unitarily integrated therewith a tower 770, a clipping interface 772 (e.g., in the form of a strap buckle) and a fiber loop retainer 774. By unitarily integrated is meant, for instance, that all features of the component (in this case the frame member 724) are of seamless construction, e.g., formed in a single molding operation. Advantages of unitary construction of components such as the frame member 724 and the frame member 722 include fewer numbers of parts, easier assembly, and improved structural integrity of the components and, by extension, the overall assembly.

The tower 770 is configured to pivotally support a stack 791 of fiber management trays 780.

The clipping interface 772 is configured to snappingly lock to a complementary clipping interface 792 of a basket 794. The basket 794 can store loops of optical fibers entering the closure via cables having jackets fixed at the cable jacket fixation unit areas 739 of the frame members 722 and 724. Such stored fibers can later be routed to the trays 790 for further fiber management, e.g., splice management. The fiber loop retainer 774 is positioned relative to the basket 794 to retain fiber loops within the basket holding volume 799.

To assemble the assembly 700, the frame members 722 and 724 engage each other horizontally (e.g., parallel to the axis 706) such that features described above for the connector portion 736 engage complementary features described above of the connector portion 760, forming a robust, snap-connection. The subassembly of connected frame members 722 and 724 can then be slid vertically (e.g., downward parallel to the axis 702) into the front and back pockets 725 of the base 720 until the foot projections 731 enter the slots 726, the upward projections 773 of the base 720 enter (e.g., with an interference fit) receivers 775 and 777 of frame members 722 and 724, and the catches 742 of the tabs 740 of the frame members 722 and 724 snappingly engage shoulders 782 positioned at upper edges of back-to-back recesses 784 of the base 720, with the catches 742 entering the recesses 784, thereby securing the subassembly to the base 720 in all directions. The basket 794 can then be snap-connected to the frame member 724, and the trays 790 can be pivotally connected to the tower 770 of the frame member 724. Thus, the entire process of assembling the assembly 700 advantageously includes a relatively small number of snap-connections of components.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. An assembly for a telecommunications closure, comprising:

frame members fastenable to one another to form a framework defining a first axis, a second axis, and a third axis that are mutually perpendicular to one another, the framework being configured to mount a stack of modules extending along a stacking axis that is parallel to the first axis, each module including a module body configured to pivotally mount optical fiber management trays at hinge locations defined by the module body, the hinge locations defining pivot axes when the trays are pivotally mounted thereto, the pivot axes being parallel to the second axis, the framework including first engagement structures allowing each module to be fully mounted and locked to the framework without movably engaging the framework and the module body parallel to the second axis.

2. The assembly of claim 1, wherein the first engagement structures are configured to allow each module to be fully mounted and locked to the framework by movably engaging the framework and the module body parallel to the first axis only.

3. The assembly of claim 1, wherein each module includes second engagement structures that lockingly engage the first engagement structures; and wherein the first engagement structures and the second engagement structures are configured to snappingly interlock.

4. The assembly of claim 1, wherein the first engagement structures include a shoulder and the second engagement structures include a flexibly resilient catch for engaging the shoulder.

5. The assembly of claim 4, wherein the framework defines a notch adjacent the shoulder configured to receive a tool to flex the flexibly resilient catch out of engagement with the shoulder.

6. The assembly of claim 1, wherein the framework includes frame members;

wherein at least one of the frame members is constructed from a polymeric material; and wherein at least one of the frame members is constructed of metal.

7. The assembly of claim 6, wherein the frame members are configured to be connected to each other by riveting.

8. The assembly of claim 6, wherein the frame members are configured to be snappingly connected to each other with a catch of a flexibly resilient arm.

9. The assembly of claim 6, wherein the frame members include a first frame member and a second frame member both of which are configured to lockingly engage the modules.

10. The assembly of claim 9, wherein the first frame member and the second frame member are of identical construction.

11. The assembly of claim 9, wherein the first frame member and the second frame member are not of identical construction.

12. The assembly of claim 11, wherein the first frame member is a mirror image of the second frame member when the first frame member and the second frame member are positioned to lockingly engage one of the modules.

13. The assembly of claim 6, wherein the framework is configured to mount two stacks of the modules in a back-to-back configuration.

14. The assembly of claim 13, wherein the framework defines a storage volume for storing loops of optical fiber, the storage volume being positioned between the stacks.

15. The assembly of claim 14, wherein the framework includes a corner member, the corner member configured to be selectively snappingly engaged with other frame members of the framework, and selectively disengaged therefrom to provide access to the storage volume at a corner of the framework.

16. The assembly of claim 13, wherein the framework includes spacer members configured to snappingly engage a front frame and a back frame of the framework to each other, the front frame being configured to mount one of the stacks, the back frame being configured to mount the other of the stacks.

17. The assembly of claim 6, wherein the frame members include a base member, a top member, and side members, the side members being configured to lockingly mount the modules, the top member and the side members being configured to lockingly connect additional side members to grow a dimension of the framework parallel to the stacking axis.

18. The assembly of claim 1, wherein at least one of the modules is mounted to the framework, the assembly further comprising fiber management trays pivotally mounted to the at least one of the modules.

19. A telecommunications closure, comprising:

housing pieces configured to cooperate to define a sealed and re-enterable closure volume; and the assembly of claim 18 positioned within the closure volume.

20. A method, comprising:

providing a framework configured to mount a stack of modules extending along a stacking axis, each module being configured to pivotally mount optical fiber management trays, each module including a module body;

engaging the module body of one of the modules to the framework; and while the module body and the framework are engaged to each other, sliding the module body along the stacking axis to lock the module body to the framework.

* * * * *